United States Patent [19]

Ooka et al.

[11] Patent Number: 5,784,253
[45] Date of Patent: Jul. 21, 1998

[54] DOCKING STATION INCLUDING EJECTION LEVER LOCATED UNDER COMPUTER MOUNTED ON DOCKING STATION AND COVER HELD CLOSED BY PORTION EXTENDING UNDER COMPUTER

[75] Inventors: Satoshi Ooka; Kazuyuki Matsuda; Kazuaki Kawabata, all of Tokyo, Japan

[73] Assignee: Kabushiki Kaisha Toshiba, Kawasaki, Japan

[21] Appl. No.: 893,016

[22] Filed: Jul. 15, 1997

Related U.S. Application Data

[63] Continuation of Ser. No. 713,256, Sep. 12, 1996, abandoned.

[30] Foreign Application Priority Data

Oct. 20, 1995 [JP] Japan ................................. 7-272349

[51] Int. Cl.<sup>6</sup> .............................. G06F 1/16; G06F 1/20; H01R 13/62; H05K 7/10
[52] U.S. Cl. .......................... 361/686; 361/687; 439/159
[58] Field of Search ...................... 364/708.1; 439/152, 439/153, 155, 159, 160; 312/223.2; 361/683, 686, 687

[56] References Cited

U.S. PATENT DOCUMENTS 4,659,159 4/1987 Takahashi ........................... 361/686
4,769,764 9/1988 Levanon ......................... 364/708.1 X
5,313,596 5/1994 Swindler et al. ..................... 361/686
5,323,291 6/1994 Boyle et al. ......................... 361/686
5,393,241 2/1995 Honda et al. ......................... 439/248
5,450,271 9/1995 Fukushima et al. .................. 361/686
5,477,415 12/1995 Mitcham et al. ..................... 361/686

FOREIGN PATENT DOCUMENTS 6-149409  5/1994  Japan .

*Primary Examiner*—Michael W. Phillips
*Attorney, Agent, or Firm*—Cushman Darby & Cushman IP Group of Pillsbury Madison & Sutro LLP

[57] ABSTRACT

An electronic apparatus system comprises an electronic apparatus body such as a portable computer, and an extension station for use in extending the functions of the electronic apparatus body. The extension station has a mount portion on which the electronic apparatus body is detachably mounted, a device storage section in which an extension device for extending the functions of the electronic apparatus body is removably stored, and an ejector for discharging the extension device from the device storage section. The ejector has an eject lever manually operable at the time of discharging the extension device. The eject lever has an operation section exposed to the mount portion. The extension station includes a rotatable cover which is held in a closed position by an extension portion of the cover which extends toward the mount portion of the extension body. The extension portion of the cover is located under the portable computer when the portable computer is mounted on the mounting portion.

34 Claims, 34 Drawing Sheets

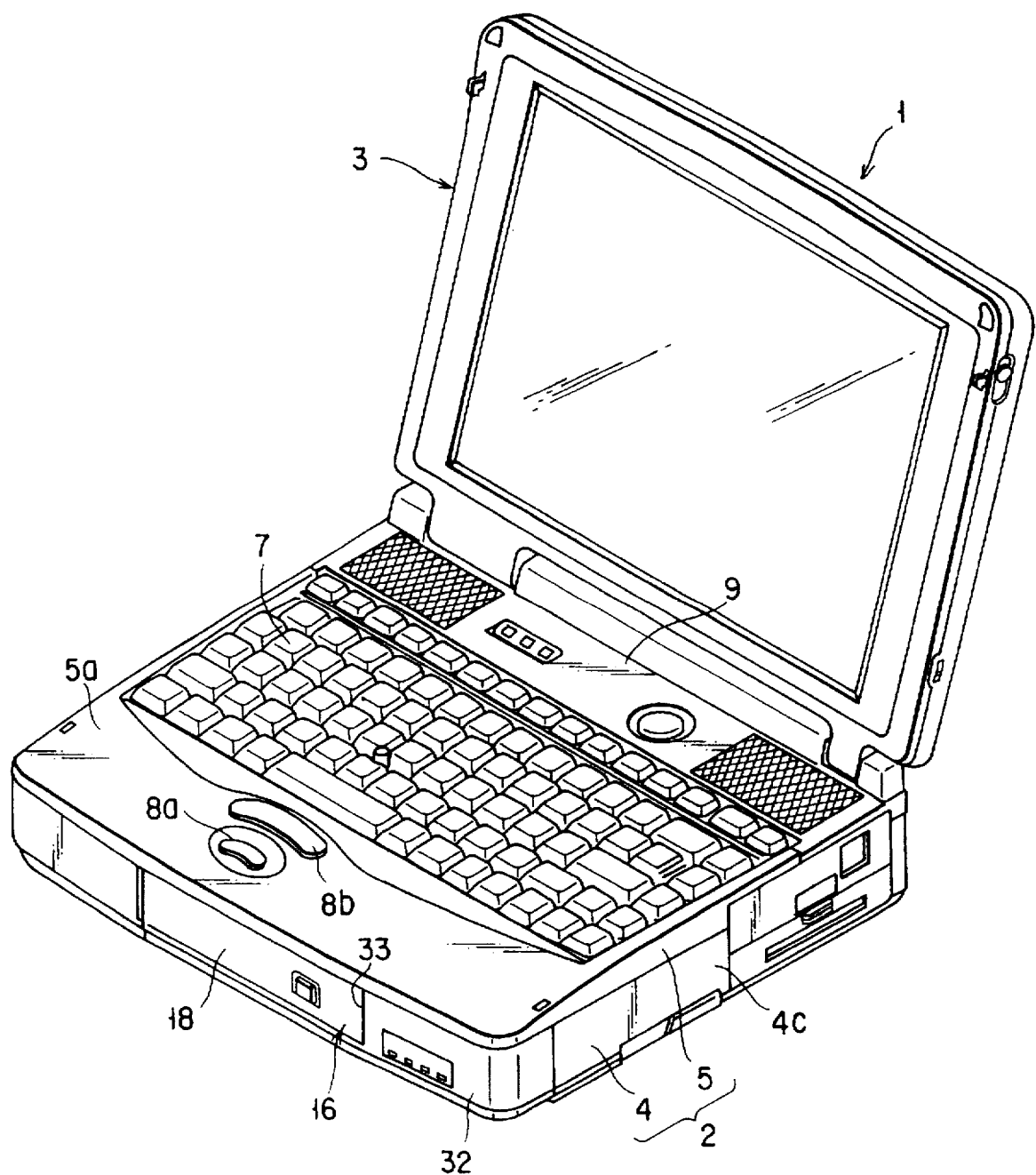
F I G. 1

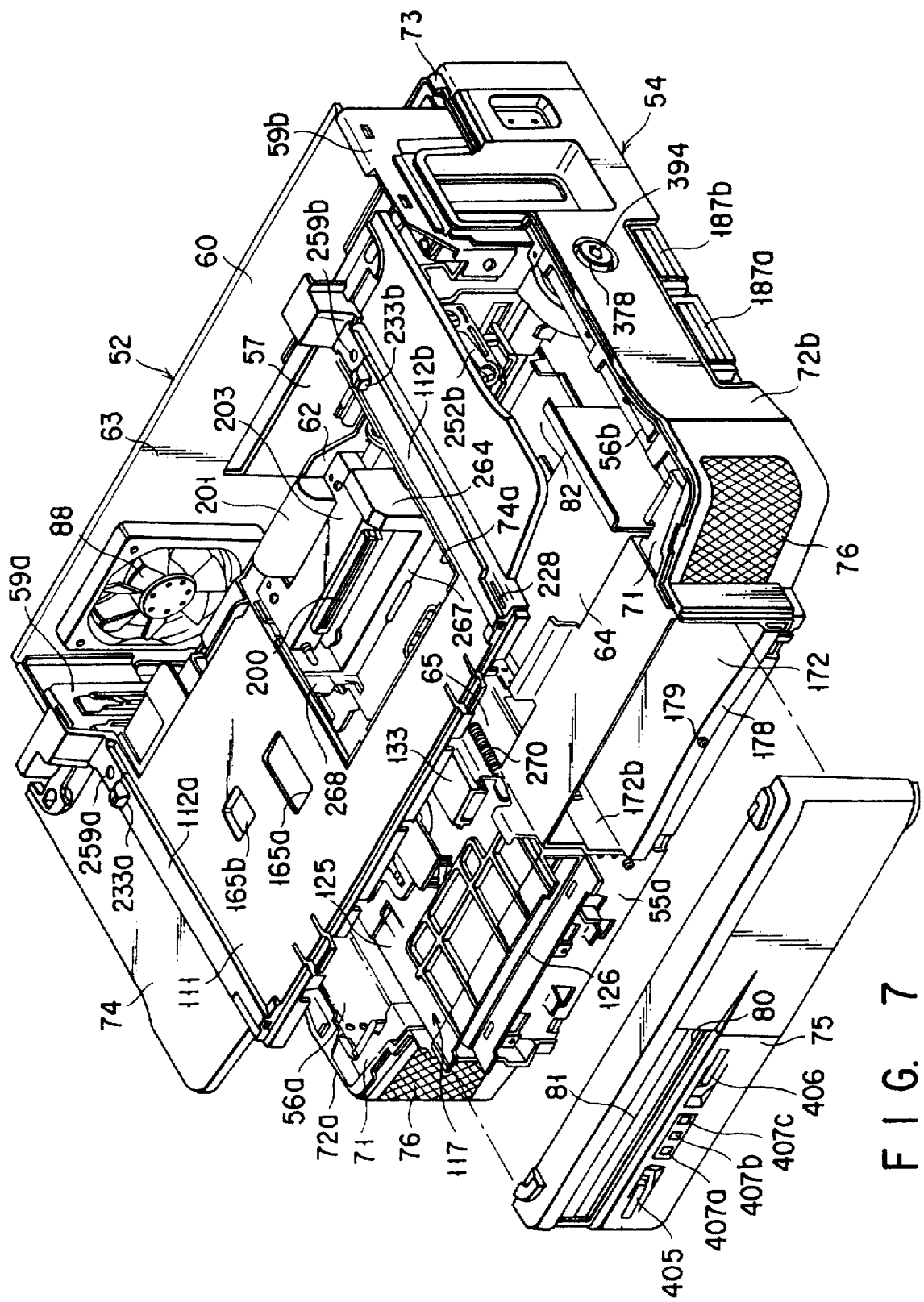
F I G. 7

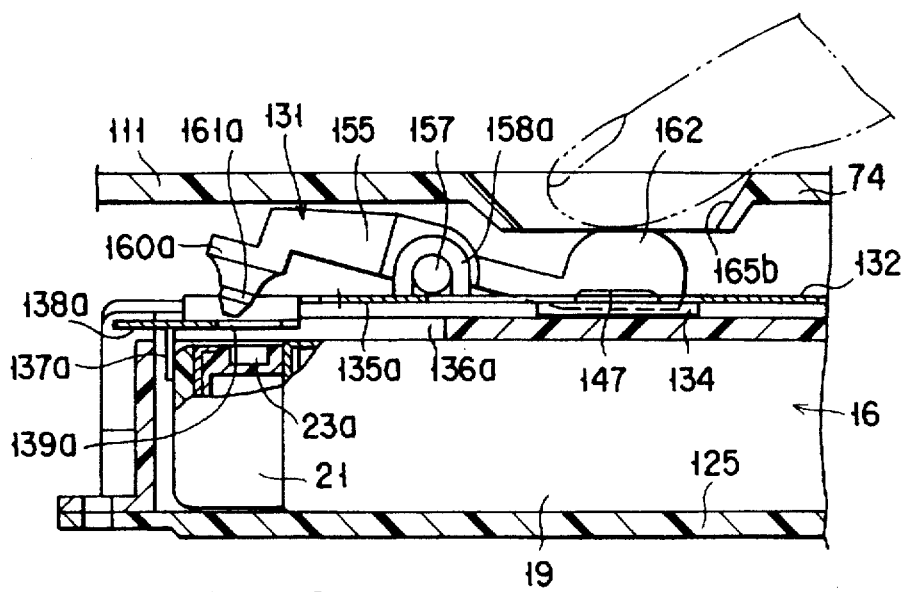
F I G. 20
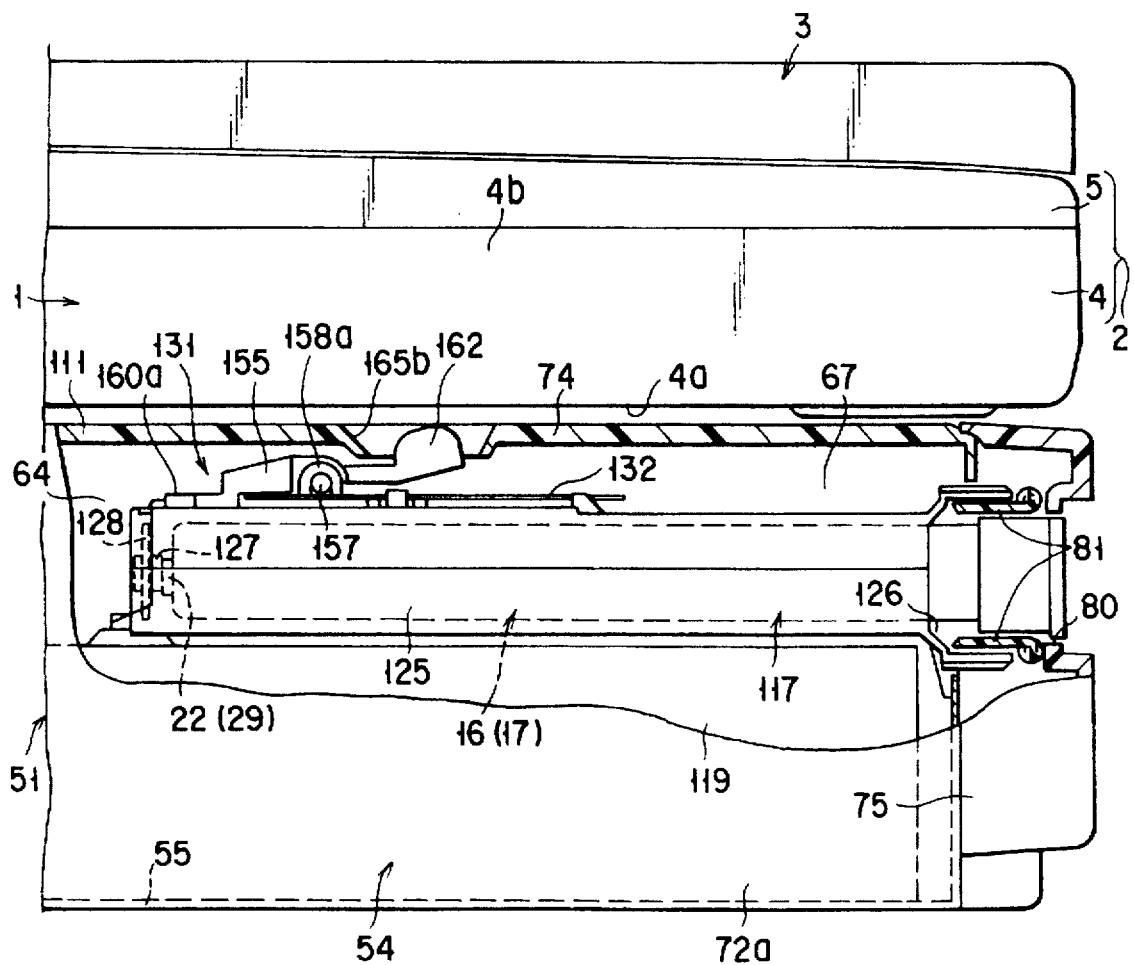
F I G. 21

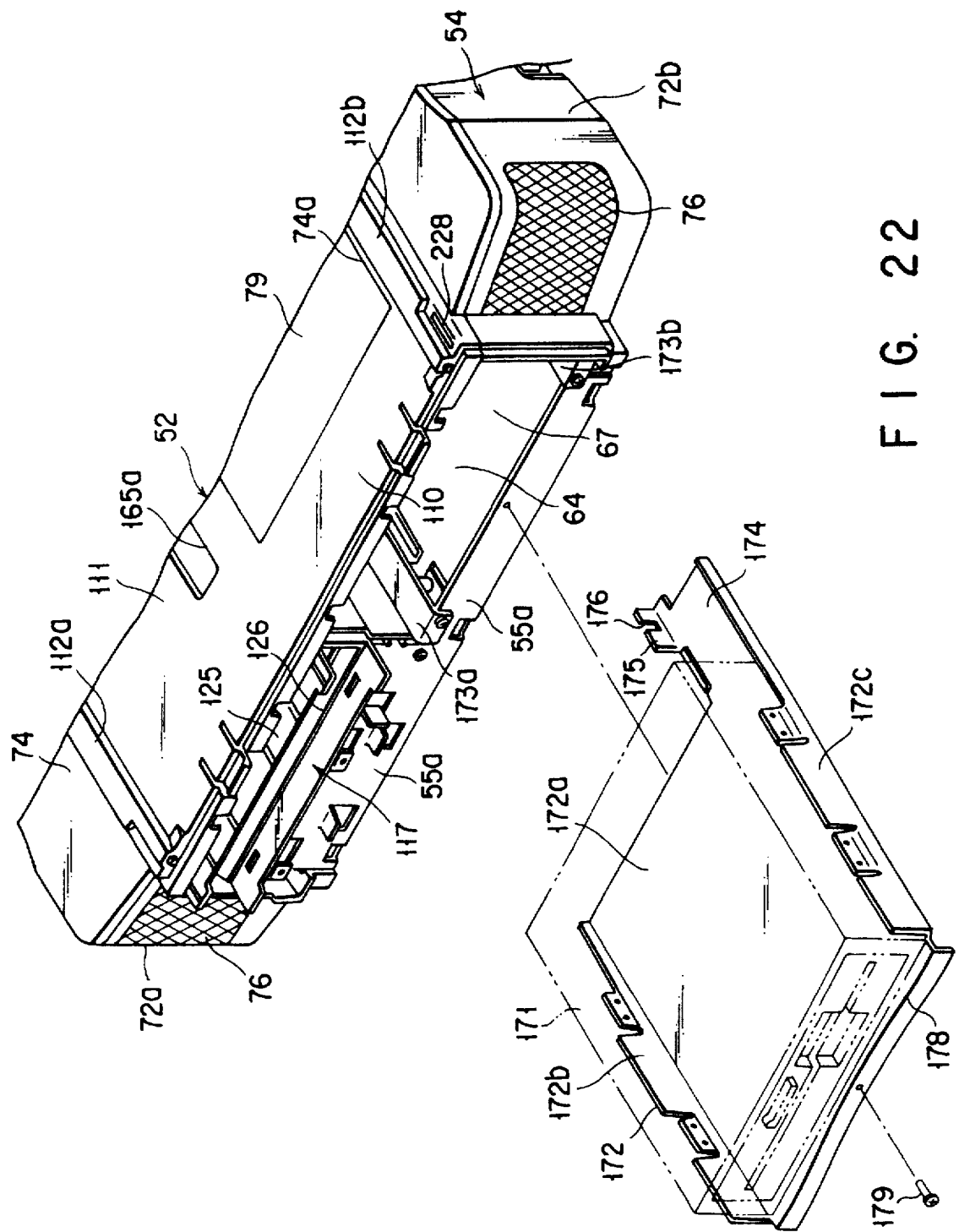
F I G. 22

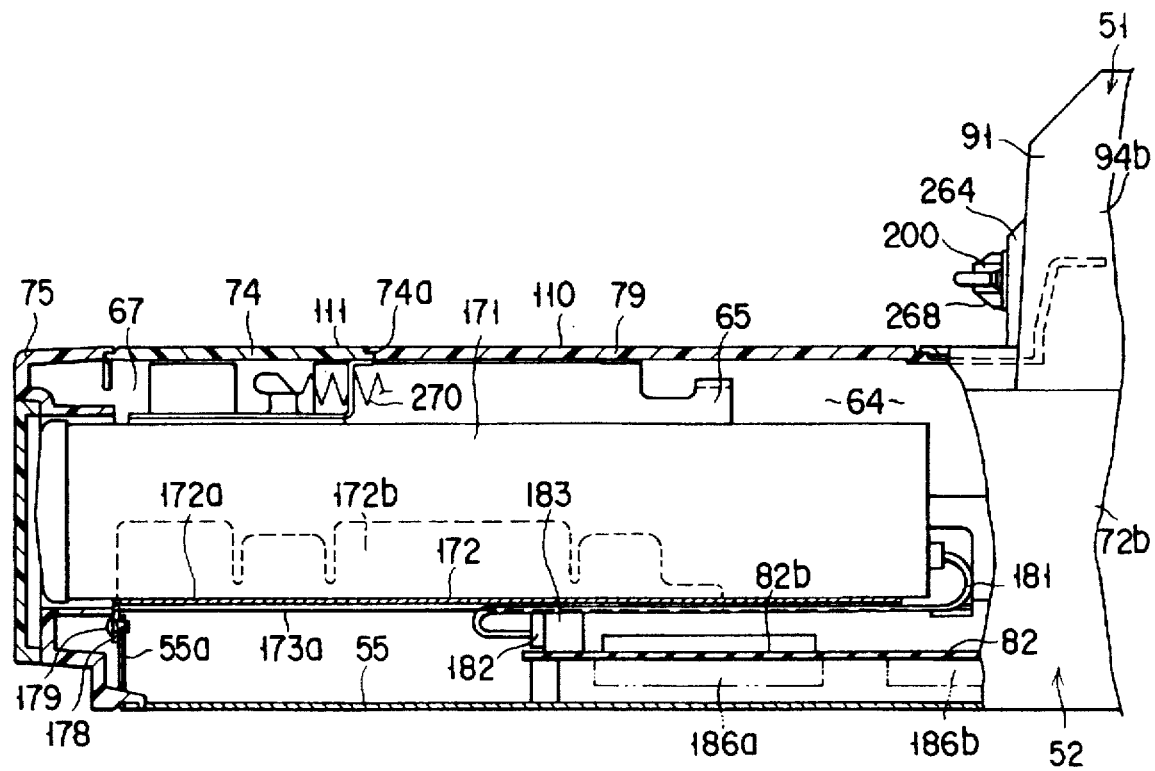
F I G. 23
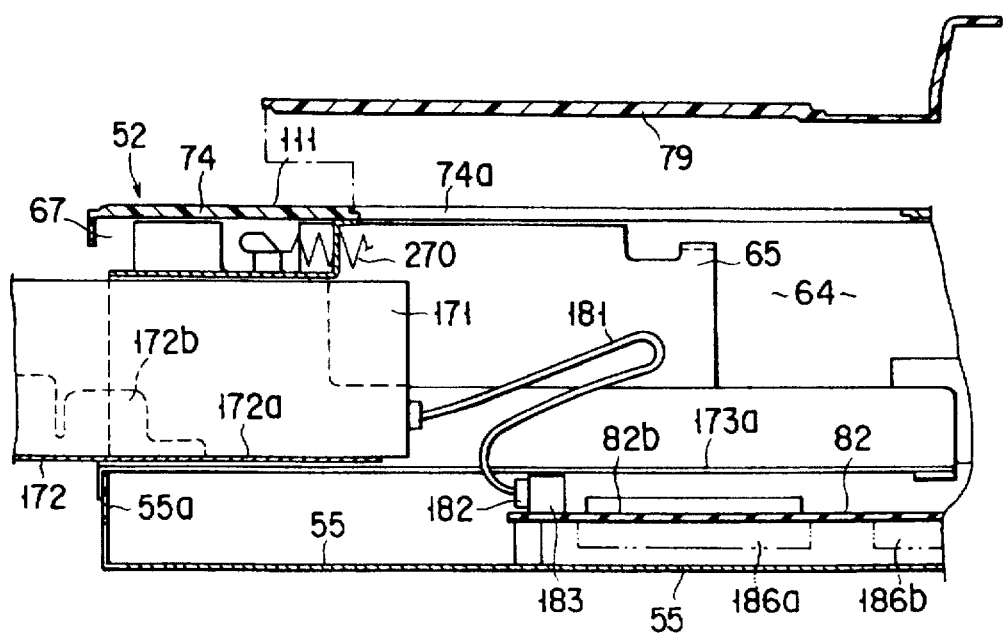
F I G. 24

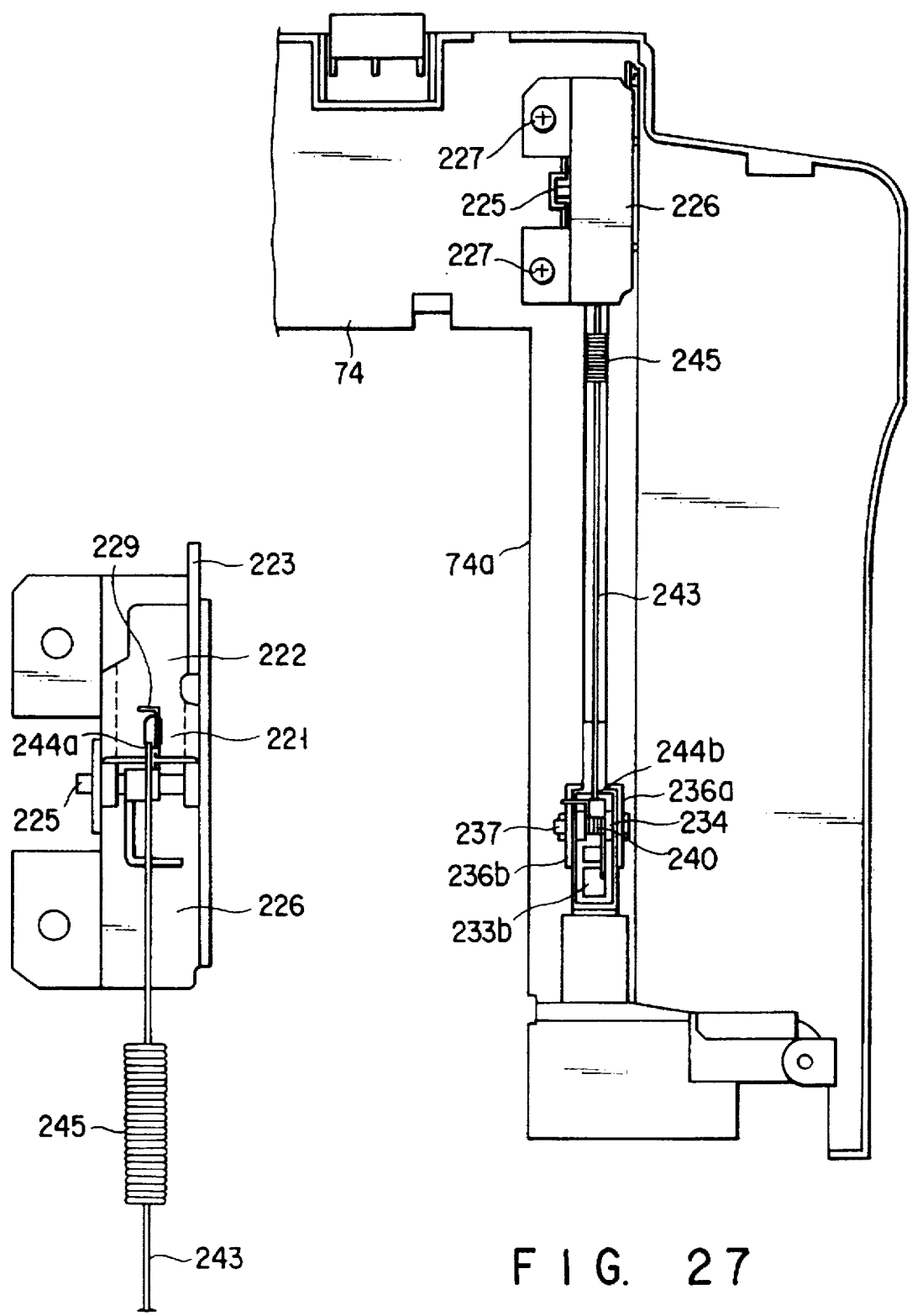
F I G. 27
F I G. 28

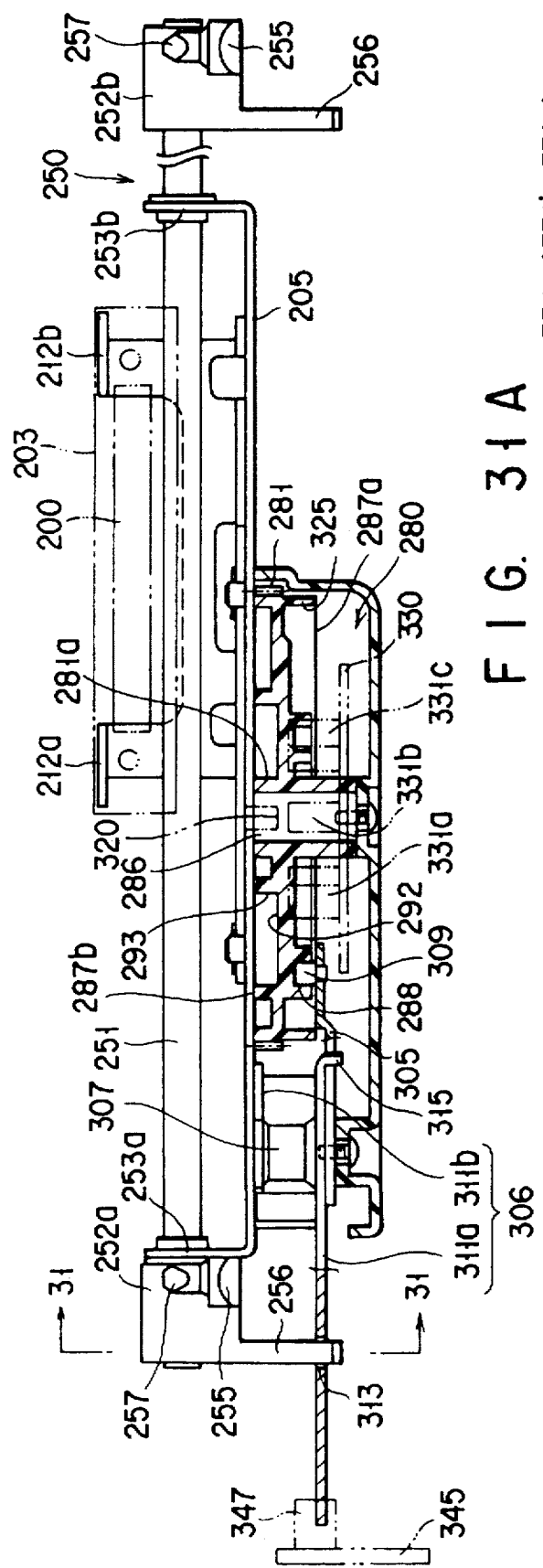
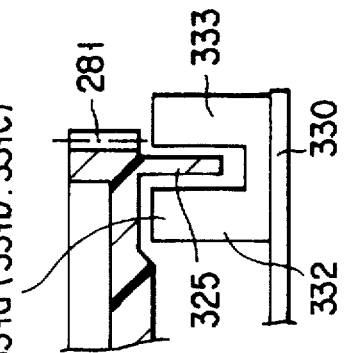
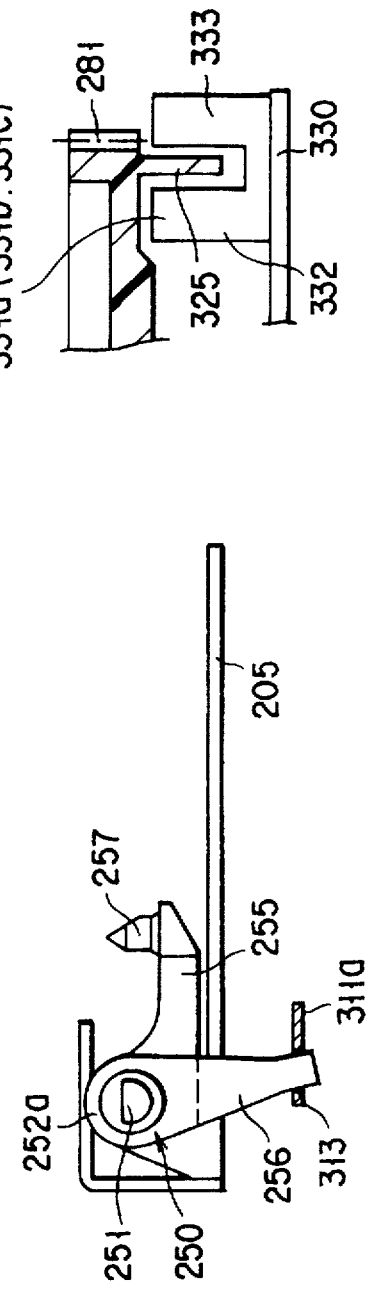
F I G. 31A
F I G. 31C
F I G. 31B

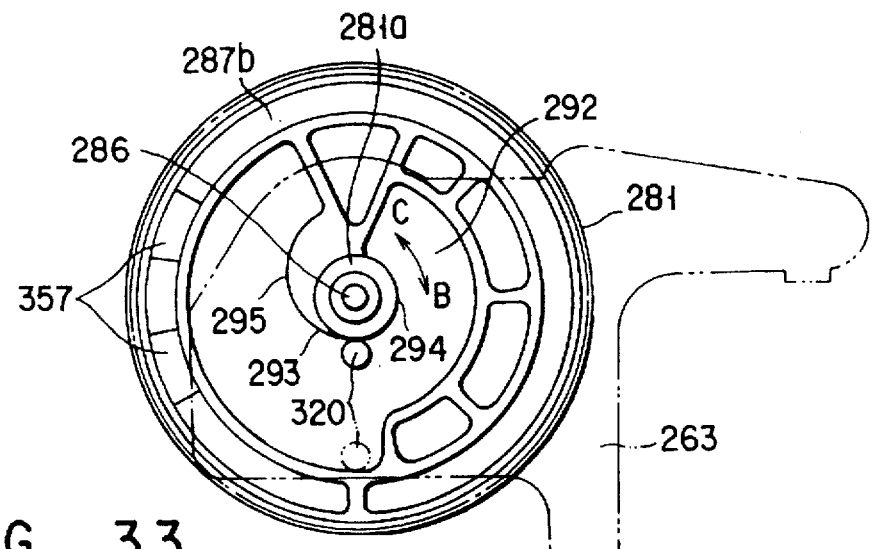
F I G. 33
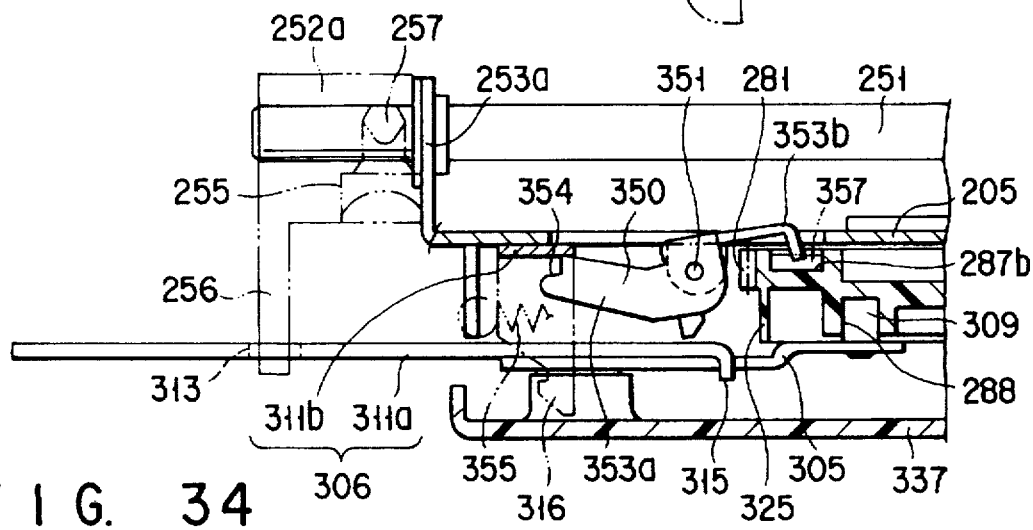
F I G. 34
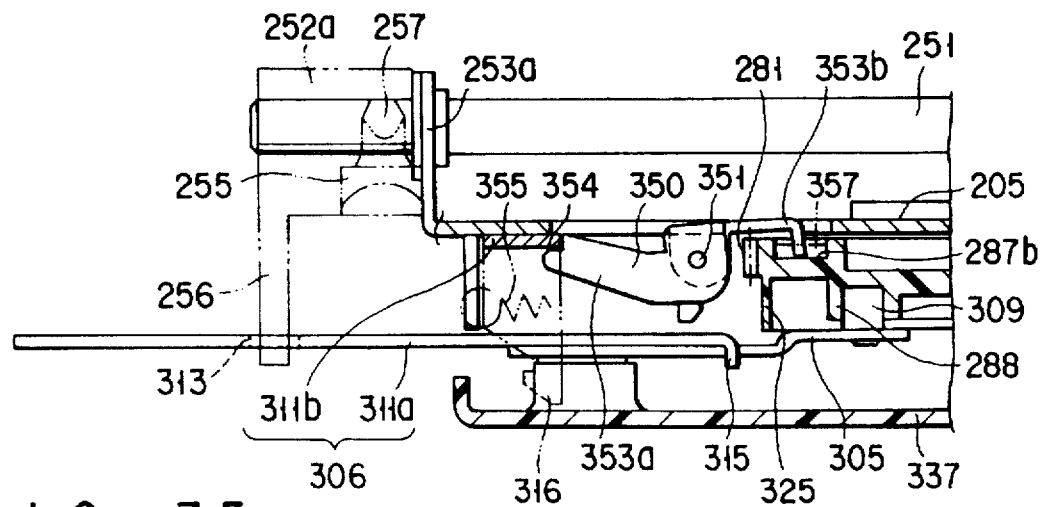
F I G. 35

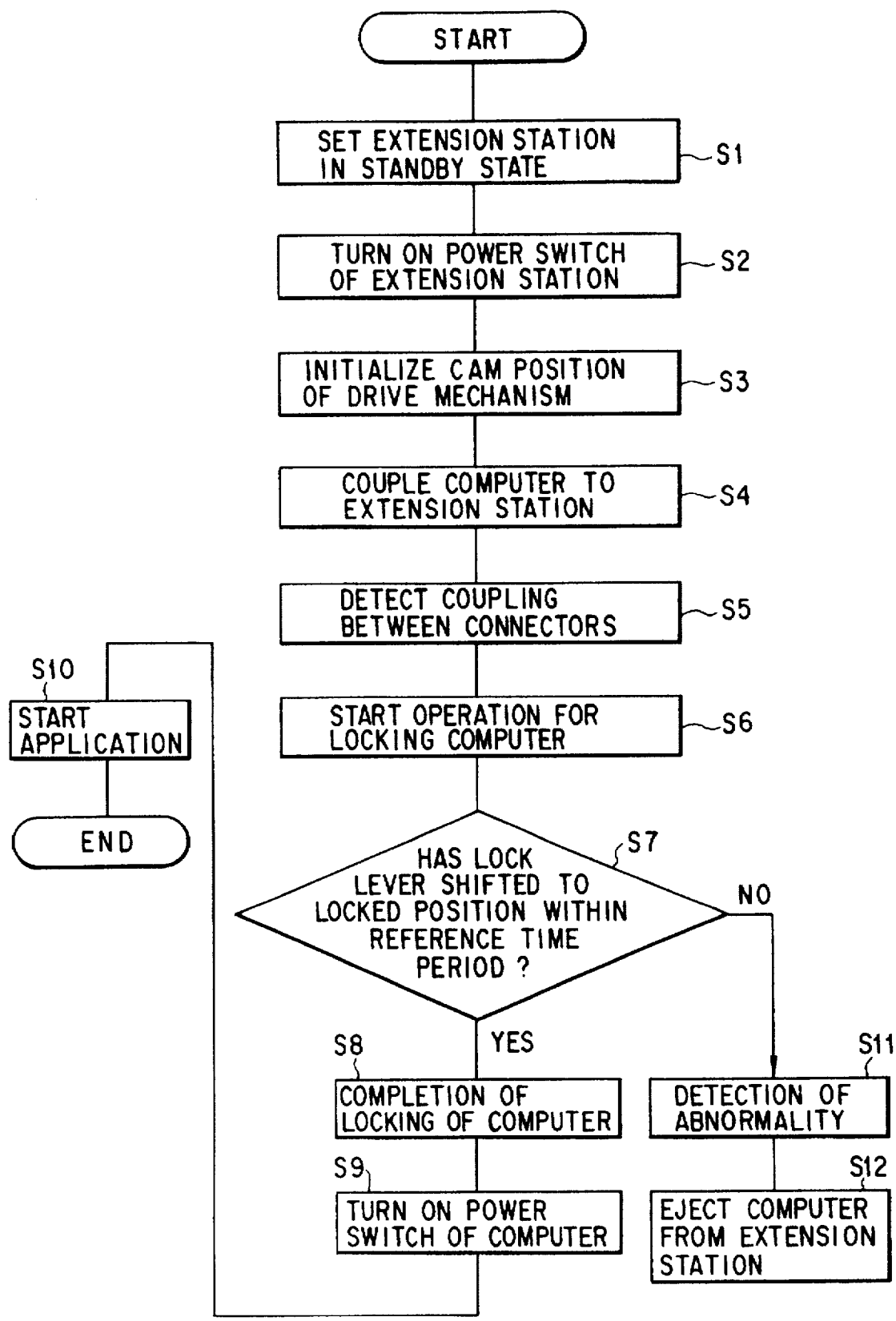
F I G. 43

DOCKING STATION INCLUDING EJECTION LEVER LOCATED UNDER COMPUTER MOUNTED ON DOCKING STATION AND COVER HELD CLOSED BY PORTION EXTENDING UNDER COMPUTER

This is a continuation of application Ser. No. 08/713,256, filed on Sep. 12, 1996, now abandoned.

BACKGROUND OF THE INVENTION

1. Field of the Invention

The present invention relates generally to an electronic apparatus system having a portable electronic apparatus, such as a book-type portable computer, and an extension station for use in extending the functions of the electronic apparatus, and more particularly to the structure of the extension station.

2. Description of the Related Art

A book-type portable computer has a box-shaped compact housing body. Thus, the portable computer is easy to carry, and is capable of using a battery pack mounted within the housing body as power supply in a space where commercial power is not available.

In order to enhance the portability of the portable computer, reduction in size of the housing body has been demanded more and more. The reduction in size of the housing body, however, causes reduction in mounting space within the housing body. The number of functions normally provided in the portable computer is generally less than that of functions normally provided in a desktop computer. In order to deal with this problem, the conventional portable computer has an extension port in the rear face of the housing body. The extension port is used for connection with an extension station for extending the functions of the portable computer.

The extension station has a box-shaped station body. The station body comprises an extension device, such as a CD-ROM drive or a hard disk drive, and a plurality of extension connectors. The extension device is contained within the station body. The station body has a mount portion for mounting of the portable computer. An extension port connector is disposed on a rear end portion of the mount portion. The extension port connector is electrically connected to the extension device and the extension connectors. When the portable computer is mounted on the mounted portion, the extension port connector faces the extension port of the computer. If the portable computer mounted on the mount portion is slid toward the extension port connector, the extension port of the portable computer engages the extension port connector. Thereby, the portable computer is electrically connected to the extension station.

In order to enhance the extendibility of function of the computer, an improved extension station has been manufactured, in which the extension device to be mounted in the station body can be selectively changed. The extension station comprises a plurality of device storage sections for storing extension devices, and an ejector for discharging the extension devices from the device storage sections. In general, an eject lever of the ejector is disposed on a front face or a side face of the station body so that the operator can easily handle the eject lever. Thus, the eject lever is always exposed to the outside of the station body even in the state in which the portable computer is placed on the mount portion.

The extension station in which the extension device can be changed has covers for opening and closing the device storage section. The extension station has a locking device for locking each cover in a locked position, thereby preventing theft of, mischief on, or careful removal of the extension device.

Since the eject lever is disposed on the front face or side face of the station body of the conventional extension station, the eject lever can be handled too easily. Consequently, the eject lever may be erroneously operated to discharge the extension device from the device storage section while the extension device is being used. Thus, the extension device or portable computer may be erroneously operated, or failure may occur. Moreover, the presence of the eject lever is obvious to viewers, and the antitheft security for the extension device is insufficient.

In the conventional extension station, each device storage section is equipped with the locking device, and many locking devices and fixing structures thereof are needed. Consequently, the structure of the extension station becomes complex, resulting in a higher manufacturing cost of the extension station. Furthermore, each locking device must be operated in order to lock and unlock the associated device storage section. Thus, the work for changing the extension device is time-consuming.

SUMMARY OF THE INVENTION

A first object of the present invention is to provide an electronic apparatus system capable of surely preventing an erroneous operation of or mischief on an ejector for discharging an extension device.

A second object of the invention is to provide an electronic apparatus system wherein a cover is held in a closed position by an electronic apparatus body placed on a mount portion, and a lock mechanism for exclusive use in locking the cover is not needed.

In order to achieve the above objects, there is provided an electronic apparatus system comprising:
an electronic apparatus body; and
an extension station having a mount portion on which the electronic apparatus body is detachably mounted, and a device storage section in which an extension device for extending functions of the electronic apparatus body is removably stored,
wherein the extension station has an ejector for discharging the extension device from the device storage section, the ejector having an eject lever manually operable at the time of discharging the extension device, the eject lever having an operation section exposed to the mount portion.

According to this structure, if the electronic apparatus body is placed on the mount portion, the operating section of the eject lever is covered by the electronic apparatus body. Thus, the operating section of the eject lever is not exposed to the outside of the extension station, and the extension device is protected against theft or mischief. In order to discharge the extension device from the device storage section by operating the eject lever, it is necessary to intentionally remove the electronic apparatus body from the mount portion. Thus, the extension device can be prevented from being unintentionally discharged.

In order to achieve the above objects, there is also provided an electronic apparatus system comprising:
an electronic apparatus body; and
an extension station having a mount portion on which the electronic apparatus body is detachably mounted, the extension station extending functions of the electronic apparatus body.

wherein the extension station comprises:
- a first device storage section for removably storing a first extension device for extending the functions of the electronic apparatus body;
- a second device storage section for removably storing a second extension device for extending the functions of the electronic apparatus body;
- a cover supported on the extension station, the cover being rotatable between a closed position where the first device storage section is closed and an open position where the first device storage section is opened, the cover having an extension portion extending toward the mount portion when the cover is rotated to the closed position, the extension portion being located below the electronic apparatus body placed on the mount portion; and
- an ejector for discharging the second extension device from the second device storage section, the ejector having an eject lever including an operation section exposed to the mount portion.

According to this structure, if the electronic apparatus body is placed on the mount portion in the state in which the cover is rotated to the closed position, the electronic apparatus body overlaps the extension portion of the cover. Thus, the electronic apparatus body prevents the cover from being opened. The cover can be locked in the closed position by using the electronic apparatus body, and the first extension device is protected against inadvertent removal or mischief. In addition, there is no need to provide a special lock mechanism for locking the cover in the closed position, and the number of parts of the extension station can be reduced.

If the electronic apparatus body is placed on the mount portion, the operating section of the eject lever is covered by the electronic apparatus body. Thus, the eject lever is not exposed to the outside of the extension station, and the second extension device is protected against theft or mischief. In order to discharge the second extension device from the second device storage section by operating the eject lever, it is necessary to intentionally remove the electronic apparatus body from the mount portion. Thus, the second extension device can be prevented from being unintentionally discharged.

In order to achieve the above objects, there is also provided an electronic apparatus system comprising:
- an electronic apparatus body; and
- an extension station having a mount portion on which the electronic apparatus body is detachably mounted, and a device storage section in which an extension device for extending functions of the electronic apparatus body is removably stored,
- wherein the extension station has an operating member operated in discharging the extension device from the device storage section, the operating member having a portion located below the electronic apparatus body placed on the mount portion.

According to this structure, if the electronic apparatus body is placed on the mount portion, the operating member is covered by the electronic apparatus body. Thus, in order to discharge the extension device from the device storage section by actuating the operating member, it is necessary to intentionally remove the electronic apparatus body from the mount portion. Thus, the extension device can be prevented from being unintentionally discharged.

In addition, since the electronic apparatus body overlaps the operating member, the electronic apparatus body prevents the operating member from being actuated. Thus, the operating member can be locked by using the electronic apparatus body, and the extension device is protected against inadvertent removal or mischief. Furthermore, there is no need to provide a special lock mechanism for locking the cover in the closed position, and the number of parts of the extension station can be reduced.

In order to achieve the above objects, there is also provided an extension station for extending functions of an electronic apparatus, the extension station comprising:
- a station body having a mount portion on which the electronic apparatus is detachably mounted, and a device storage section in which an extension device for extending functions of the electronic apparatus is removably stored; and
- an ejector for discharging the extension device from the device storage section, the ejector having an eject lever manually operable at the time of discharging the extension device, the eject lever having an operation section exposed to the mount portion.

According to this structure, if the electronic apparatus is placed on the mount portion of the station body, the operating section of the eject lever is covered by the electronic apparatus. Thus, the operation section of the eject lever is not exposed to the outside of the station body, and the extension device is protected against theft or mischief.

In addition, in order to discharge the extension device from the device storage section by operating the eject lever, it is necessary to intentionally remove the electronic apparatus from the mount portion. Thus, the extension device can be protected against unintentional removal or theft.

In order to achieve the above objects, there is also provided an extension station for extending functions of an electronic apparatus, the extension station comprising:
- a station body including a mount portion on which the electronic apparatus is detachably mounted, a first device storage section for removably storing a first extension device for extending the functions of the electronic apparatus, and a second device storage section for removably storing a second extension device for extending the functions of the electronic apparatus;
- a cover supported on the station body, the cover being rotatable between a closed position where the first device storage section is closed and an open position where the first device storage section is opened, the cover having an extension portion extending toward the mount portion when the cover is rotated to the closed position, the extension portion being located below the electronic apparatus placed on the mount portion; and
- an ejector for discharging the second extension device from the second device storage section, the ejector having an eject lever including an operation section exposed to the mount portion.

According to this structure, if the electronic apparatus is placed on the mount portion in the state in which the cover is rotated to the closed position, the electronic apparatus overlaps the extension portion of the cover. Thus, the electronic apparatus prevents the cover from being opened. The cover can be locked in the closed position by using the electronic apparatus, and the first extension device is protected against inadvertent removal or mischief. In addition, there is no need to provide a special lock mechanism for locking the cover in the closed position, and the number of parts of the extension station can be reduced.

If the electronic apparatus is placed on the mount portion of the station body, the operating section of the eject lever is covered by the electronic apparatus. Thus, the eject lever is not exposed to the outside of the station body, and the second extension device is protected against theft or mischief. In order to discharge the second extension device from the second device storage section by operating the eject lever, it is necessary to intentionally remove the electronic apparatus from the mount portion. Thus, the second extension device can be prevented from being unintentionally discharged.

In order to achieve the above objects, there is also provided an extension station for extending functions of an electronic apparatus, the extension station comprising:

- a station body having a mount portion on which the electronic apparatus is detachably mounted, and a device storage section in which an extension device for extending functions of the electronic apparatus is removably stored; and
- an operating member operated in discharging the extension device from the device storage section, the operating member having a portion located below the electronic apparatus placed on the mount portion.

According to this structure, if the electronic apparatus is placed on the mount portion, the operating member is covered by the electronic apparatus. Thus, in order to discharge the extension device from the device storage section by actuating the operating member, it is necessary to intentionally remove the electronic apparatus from the mount portion. Thus, the extension device can be prevented from being unintentionally discharged.

In addition, since the electronic apparatus overlaps the operating member, the electronic apparatus prevents the operating member from being actuated. Thus, the operating member can be locked by using the electronic apparatus, and the extension device is protected against inadvertent removal or mischief. Furthermore, there is no need to provide a special lock mechanism for locking the cover in the closed position, and the number of parts of the extension station can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a perspective view of a portable computer for use in an embodiment of the present invention;

FIG. 7 is a perspective view showing the state in which a front cover and an upper cover of the station body are removed from the frame;

FIG. 20 is a cross-sectional view of the ejector in the state in which the lock lever is rotated to the unlocked position;

FIG. 21 is a partly cross-sectional side view showing the relationship between the lock lever and the portable computer;

FIG. 22 is a perspective view of the extension station, showing the state in which a tray is drawn out of a second section of a device storage chamber;

FIG. 23 is a cross-sectional view of the extension station, showing the state in which the tray is inserted into the second section of the device storage chamber;

FIG. 24 is a cross-sectional view of the extension station, showing the state in which the connector of the extension device is connected to the connector of the station body;

FIG. 27 is a bottom-side view of a latch and an upper cover supporting a detection lever;

FIG. 28 is a plan view showing a latch and a bracket supporting the latch;

FIG. 31A is a cross-sectional view of the drive mechanism for driving the lock lever;

FIG. 31B is a cross-sectional view taken along line 31—31 in FIG. 31A;

FIG. 31C is a cross-sectional view showing the positional relationship between a photosensor and a light shield wall;

FIG. 33 is a plan view showing the positional relationship between a guide pin of the slider and a cam surface of the cam gear;

FIG. 34 is a cross-sectional view of the drive mechanism, showing the positional relationship between a second rotational lever and the lock lever;

FIG. 35 is a cross-sectional view of the drive mechanism, showing the state in which the second rotational lever is locked by the lock lever;

FIG. 43 is a flowchart illustrating the procedure for connecting the portable computer to the extension station.

DETAILED DESCRIPTION OF THE PREFERRED EMBODIMENTS

An embodiment of the present invention as applied to a portable computer will now be described with reference to the accompanying drawings.

Figure 2:
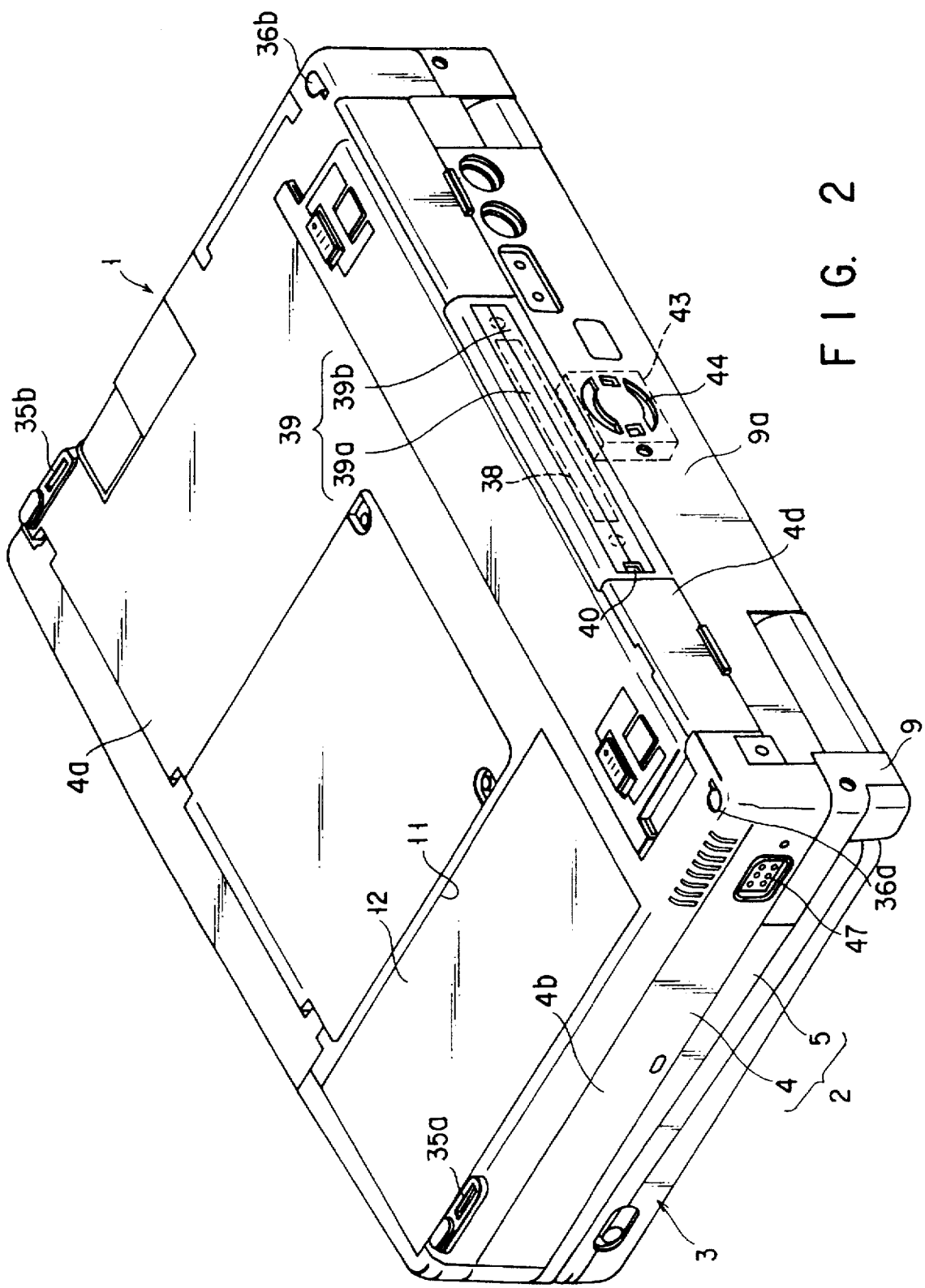
FIG. 2 is a perspective view showing the lower housing side of the portable computer.

FIGS. 1 and 2 show a book-type portable computer 1 employed as an electric apparatus body. The computer 1 comprises a flat, rectangular box-shaped housing body 2 and a display unit 3 supported on the housing body 2.

The housing body 2 has a lower housing 4 and an upper housing 5 coupled to the lower housing 4. The lower housing 4 comprises a flat bottom wall 4a, and a pair of side walls 4b and 4c and a rear wall 4d continuous with the bottom wall 4a. The upper housing 5 has a substantially flat upper wall 5a. The upper wall 5a is continuous with upper end portions of the side walls 4b and 4c and rear wall 4d of the lower housing 4. A keyboard 7 and click switch buttons 8a and 8b are disposed on the upper wall 5a of the upper housing 5.

The display unit 3 is coupled to a rear end portion of the lower housing 4 by means of hinge metal fixings (not shown). Coupling portions between the display unit 3 and lower housing 4 are covered by a top cover 9. The display unit 3 is thus supported on the housing body 2 so as to be rotatable between a closed position where the display unit 3 covers from above the keyboard 7, click switch buttons 8a and 8b and top cover 9, and an open position where the display unit 3 is erected in rear of the keyboard 7. When the display unit 3 is rotated to the closed position, the computer 1 has a box shape convenient for carrying.

As is shown in FIG. 2, the lower housing 4 has a battery storage section 11. The battery storage section 11 is formed by a recess open to the bottom wall 4a of the lower housing 4. A battery pack 12 is removably mounted in the battery storage section 11.

Figure 3:
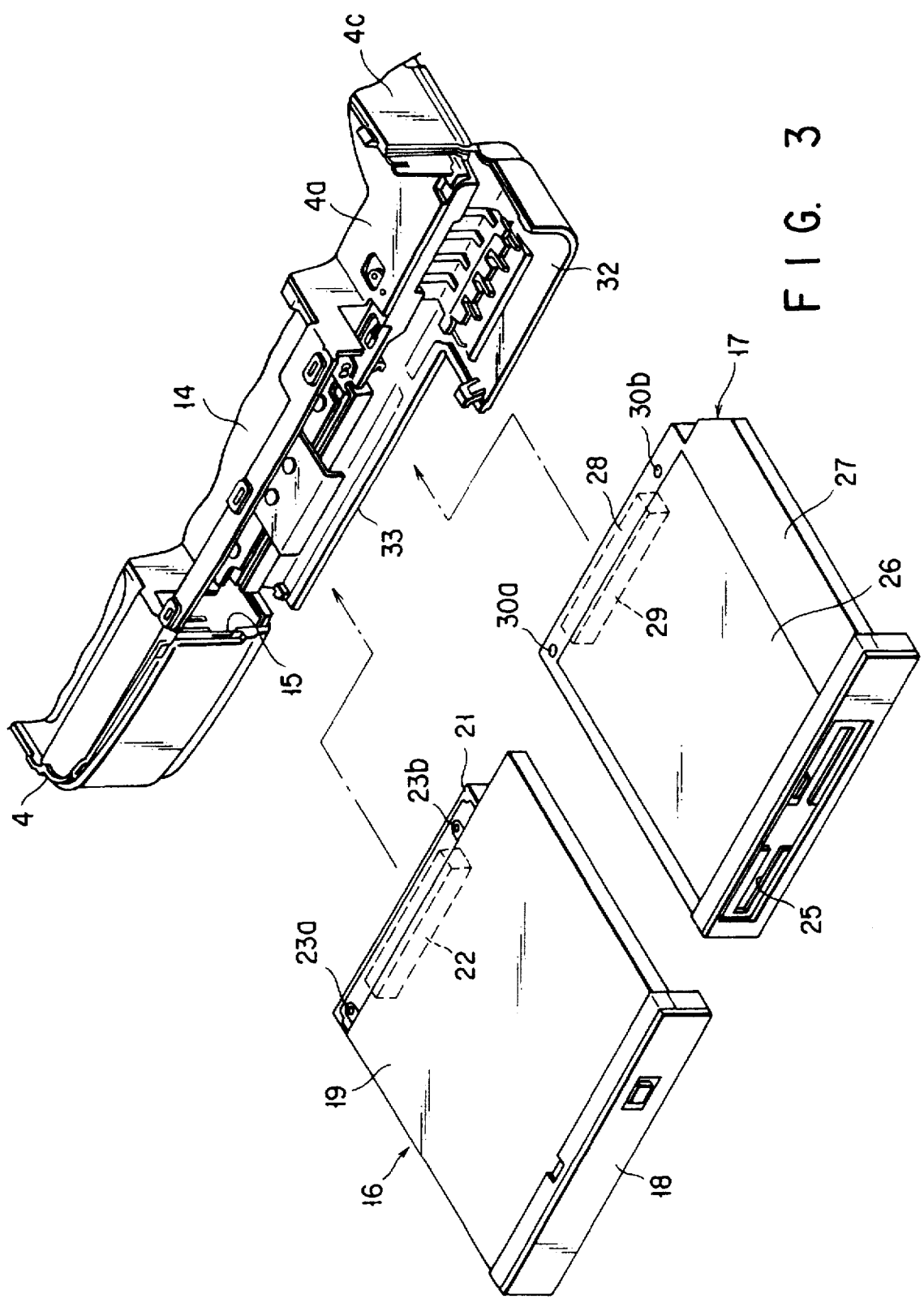
FIG. 3 is a perspective view showing a CD-ROM drive and a floppy disk drive, one of which is to be removably mounted in the pack storage section in the portable computer.

As is shown in FIG. 3, a pack storage section 14 is defined within the lower housing 4. The pack storage section 14 has an insertion hole 15 opening to the front side of the lower housing 4. A terminal end portion of the pack storage section 14, which is opposed to the insertion hole 15, is provided with a relay connector (not shown).

One of a CD-ROM drive 16 and a floppy disk drive (FDD) 17 is detachably mounted in the pack storage section 14 as a device for extending the functions of the computer 1. Each of the CD-ROM drive 16 and FDD 17 is constructed as module pack having its own function. The CD-ROM drive 16 and FDD 17 have the same shape and size.

The CD-ROM drive 16 has a tray 18 for containing an optical disk and a cabinet 19 for removably supporting the tray 18. The cabinet 19 has a flat box shape. An interface connector 22 is attached to an end portion of the cabinet 19, which is opposed to the tray 18, by means of a connector bracket 21. A pair of recess portions 23a and 23b are formed in the upper surface of the connector bracket 21. The recess portions 23a and 23b are spaced apart in the width direction of the CD-ROM drive 16.

The CD-ROM drive 16, as shown in FIG. 3, is inserted into the pack storage section 14 from the insertion hole 15 at the front end of the lower housing 4. Thereby, the interface connector 22 is coupled to the relay connector, and the CD-ROM drive 16 is electrically connected to the computer 1. In the state in which the CD-ROM drive 16 is inserted in the pack storage section 14, the front face of the tray 18 of CD-ROM drive 16 is located at the opening portion of the insertion hole 15.

As is shown in FIG. 3, the FDD 17 comprises a flat box-shaped FDD body 26 having a disk insertion hole 25 at its front face, and an outer cover 27 covering the FDD body 26. The outer cover 27 has substantially the same shape and size as the cabinet 19 of CD-ROM drive 16. The outer cover 27 has a connector attachment portion 28 at an end portion thereof opposed to the floppy disk insertion hole 25. An interface connector 29 is attached to the connector attachment portion 28. A pair of recess portions 30a and 30b are disposed on the upper surface of the connector attachment portion 28. The recess portions 30a and 30b are spaced apart in the width direction of the FDD 17. The distance between the recess portions 30a and 30b is equal to that between the recess portions 23a and 23b of CD-ROM drive 16.

As is shown in FIG. 3, the FDD 17 is inserted into the pack storage section 14 from the insertion hole 15 at the front end of lower housing 4. Thereby, the interface connector 29 is coupled to the relay connector, and the FDD 17 is electrically connected to the computer 1. In the state in which the FDD 17 is inserted in the pack storage section 14, the disk insertion hole 25 of FDD 17 is located at the opening portion of the insertion hole 15.

A front cover 32 is attached to a front end portion of the lower housing 4. The front cover 32 is supported on the lower housing 4 so as to be rotatable between a first position where the front cover 32 opens the insertion hole 15 and a second position where the front cover 32 faces the insertion hole 15. The front cover 32 has a rectangular notched opening portion 33. The opening portion 33 has a size corresponding to each of the front face of the tray 18 of CD-ROM drive 16 and the front face of FDD 17. If the front cover 32 is rotated to the second position, the tray 18 of CD-ROM drive 16 or the disk insertion hole 25 of FDD 17 is exposed to the front side of the housing body 2 through the opening portion 33.

As is shown in FIG. 2, first and second engagement holes 35a and 35b and first and second lock holes 36a and 36b are formed in the bottom wall 4a of lower housing 4. The engagement holes 35a and 35b are spaced apart in the width direction of lower housing 4 at the front end portion of bottom wall 4a. Each of the engagement holes 35a and 35b is elongated in the depth direction of lower housing 4. The lock holes 36a and 36b are spaced apart in the width direction of lower housing 4 at the rear end portion of bottom wall 4a. Each of lock holes 36a and 36b has a circular cross-sectional shape. The first engagement hole 35a and first lock hole 36a are arranged linearly in the depth direction of lower housing 4. The second engagement hole 35b and second lock hole 36b are arranged linearly in the depth direction of lower housing 4.

A first extension connector 38, as shown in FIG. 2, is disposed at a central portion of the rear wall 4d of lower housing 4. The first extension connector 38 is used to add a new function to the computer 1. The first extension connector 38 is covered by a connector cover 39. The connector cover 39 has a first cover 39a and a second cover 39b. A lever insertion port 40 is formed at one end of the first and second covers 39a and 39b. The first and second covers 39a and 39b are supported on the lower housing 4 so as to be rotatable between a closed position where the covers 39a and 39b cover the first extension connector 38 from the rear side of housing body 2, and an open position where the covers 39a and 39b retreat vertically on both sides of the first extension connector 38 and expose the first extension connector 38. The first and second covers 39a and 39b are normally held in the closed position.

The housing body 2 has a cooling fan 43, as shown in FIG. 2. The cooling fan 43 forcibly cools a CPU and a power supply circuit section of the computer 1. The cooling fan 43 is situated above the first extension connector 38 and is covered by the top cover 9. A rear wall 9a of top cover 9 is provided with an exhaust port 44 communicating with the cooling fan 43. In addition, as is clear from FIG. 2, a power switch 47 is disposed on the left-hand side wall 4b of lower housing 4. The power switch 47 turns on/off the power to the computer 1.

Figure 4:
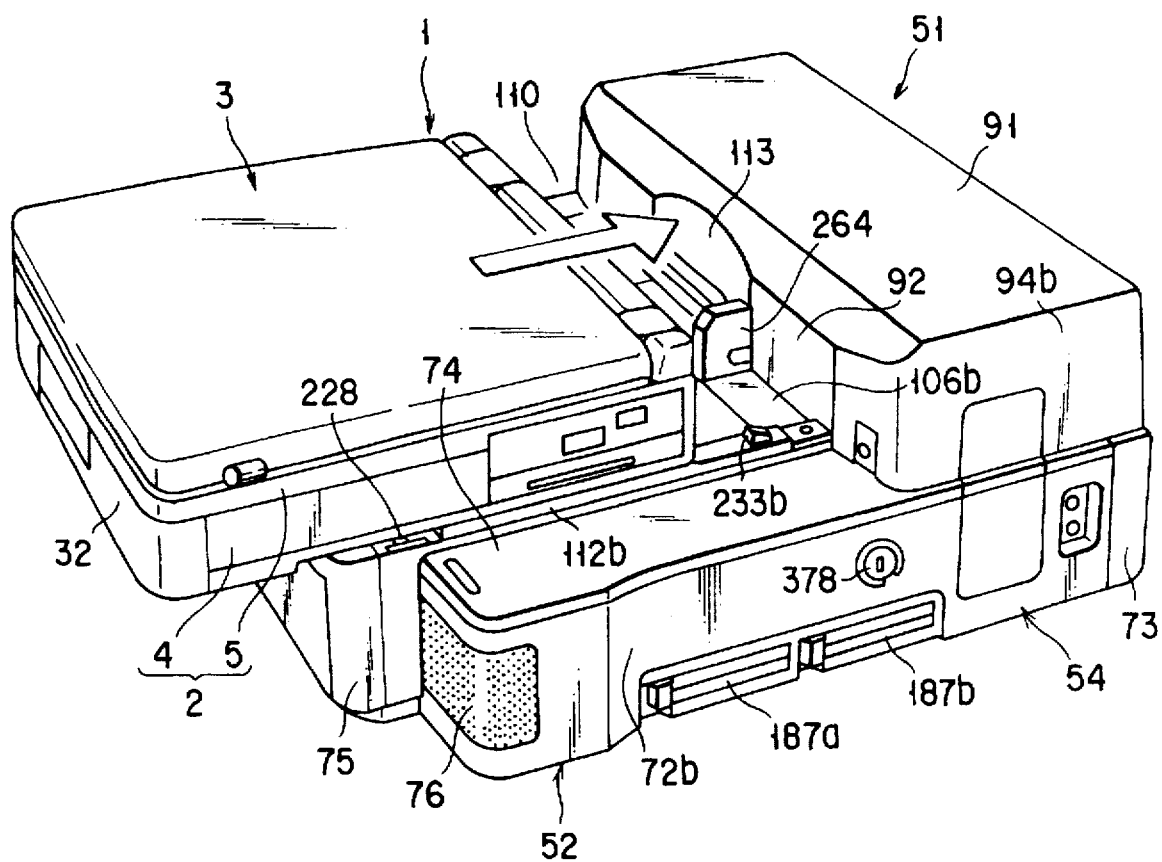
FIG. 4 is a perspective view showing the state in which the portable computer placed on the mount portion of the extension station is slid towards a second extension connector.
Figure 5:
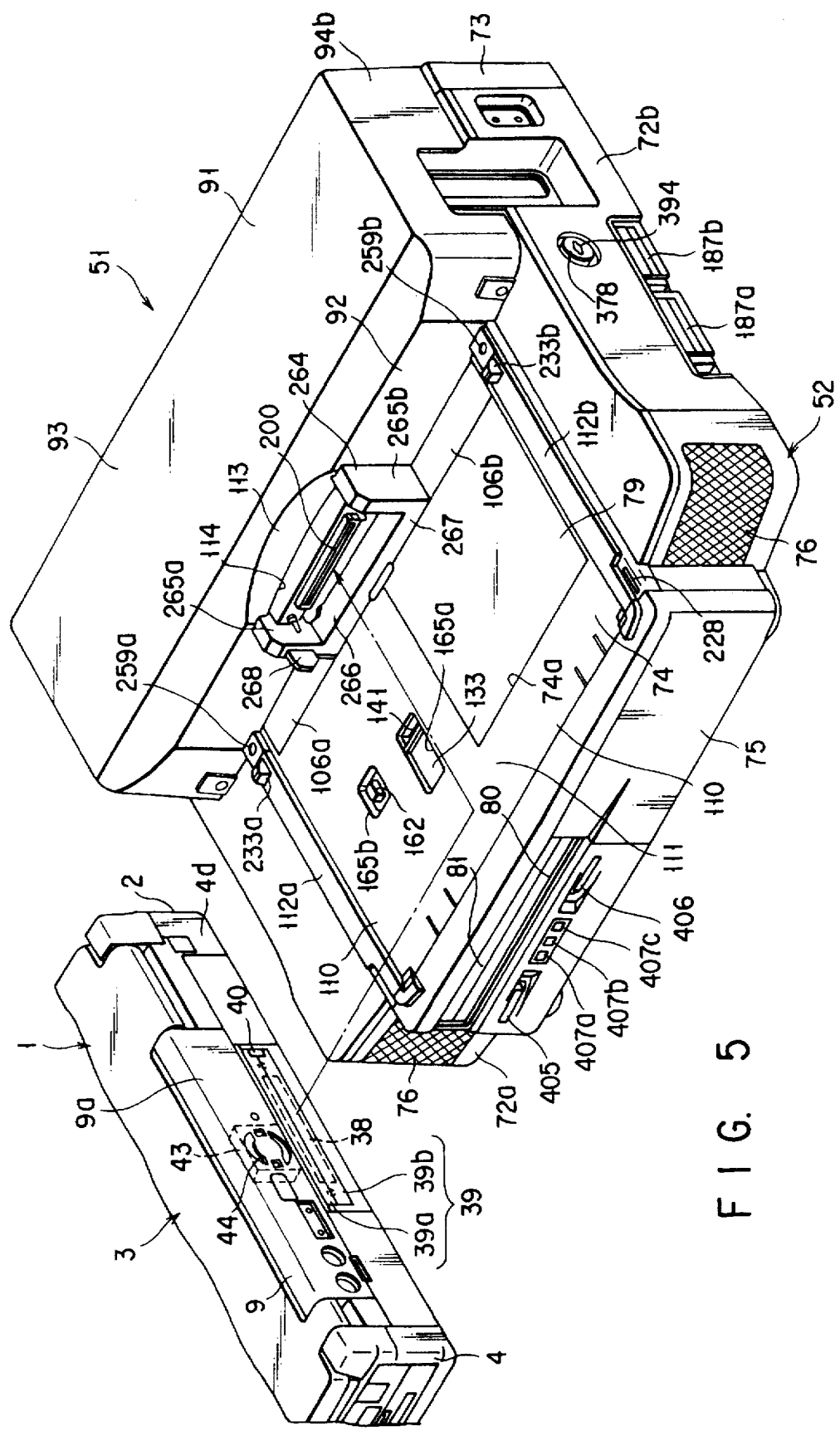
FIG. 5 is a perspective view showing a positional relationship between the second extension connector of the extension station and a first extension connector of the portable computer.
Figure 6:
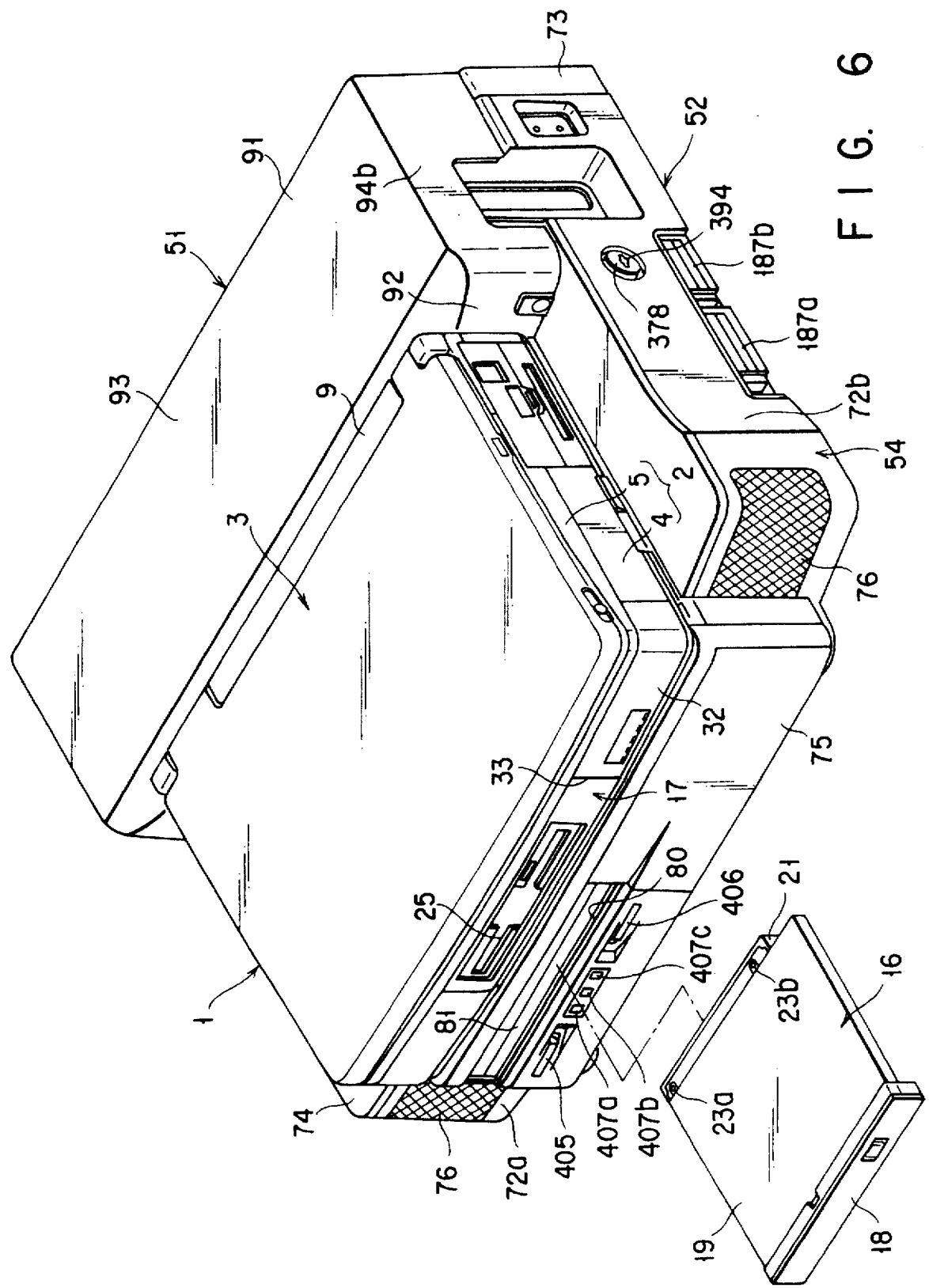
FIG. 6 is a perspective view showing the state in which the extension station and the portable computer are interconnected.
Figure 15:
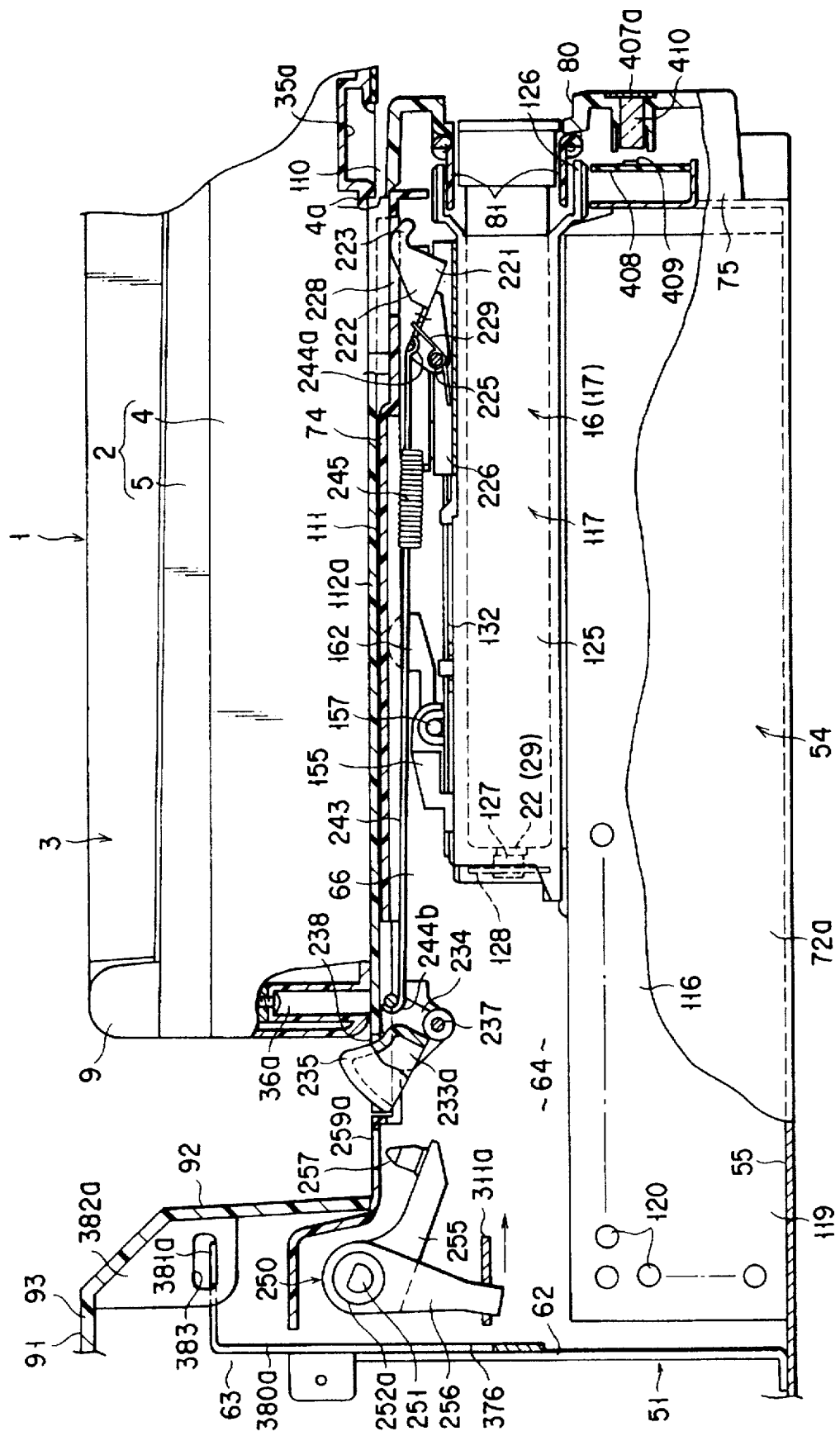
FIG. 15 is a cross-sectional view showing the state in which the portable computer is placed on the mount portion of the extension station.

FIGS. 4 and 5 show an extension station 51 for use in adding a new function to the computer 1. The extension station 51 has a station body 52. The station body 52 has a metallic frame 53 and a body cover 54 of a synthetic resin for covering the frame 53. The frame 53, as shown in FIGS. 7, 13 and 15, comprises a flat, rectangular plate-like bottom panel 55, a pair of side panels 56a and 56b continuous with the bottom panel 55, and a first rear panel 57 continuous with the bottom panel 55 and side panels 56a and 56b.

As is shown in FIGS. 7, 8, 9 and 22, an upwardly extending support wall 55a is formed at a front end portion of the bottom panel 55. The height of the support wall 55a is less than that of the side panels 56a and 56b. A number of vent holes 58 are formed in the left-hand side panel 56a. Guide walls 59a and 59b are formed at rear parts of the side panels 56a and 56b. The guide walls 59a and 59b extend upward from the side panels 56a and 56b. A second rear panel 60 extends between rear end portions of the guide walls 59a and 59b. The second rear panel 60, as shown in FIG. 13, is continuous with an upper end portion of the first rear panel 57. Thus, the frame 53 has a hollow box-like shape and opens upward and forward.

Figure 9:
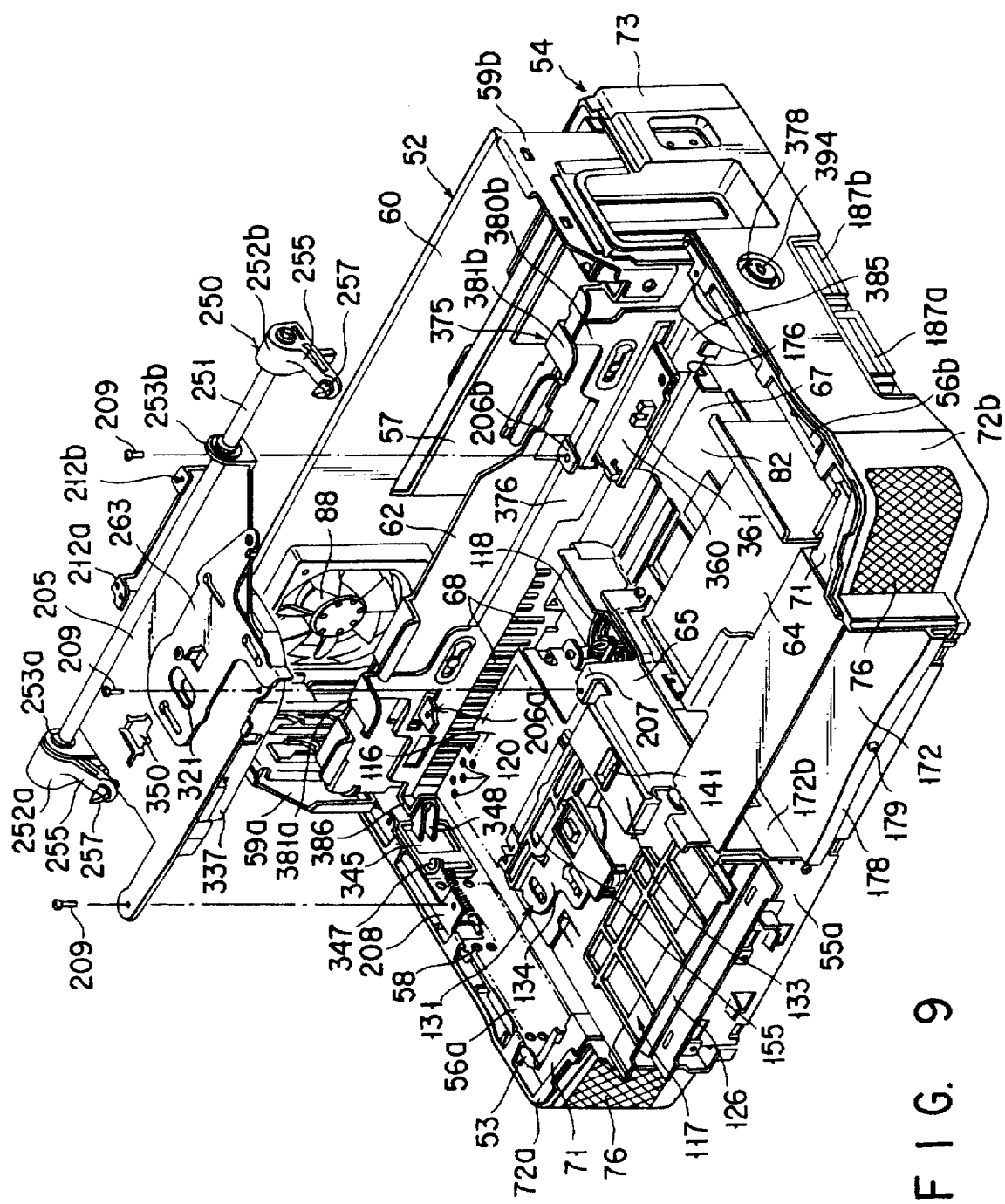
FIG. 9 is a perspective view of the extension station, showing in an exploded manner the state in which a driving mechanism is removed from the station body.
Figure 13:
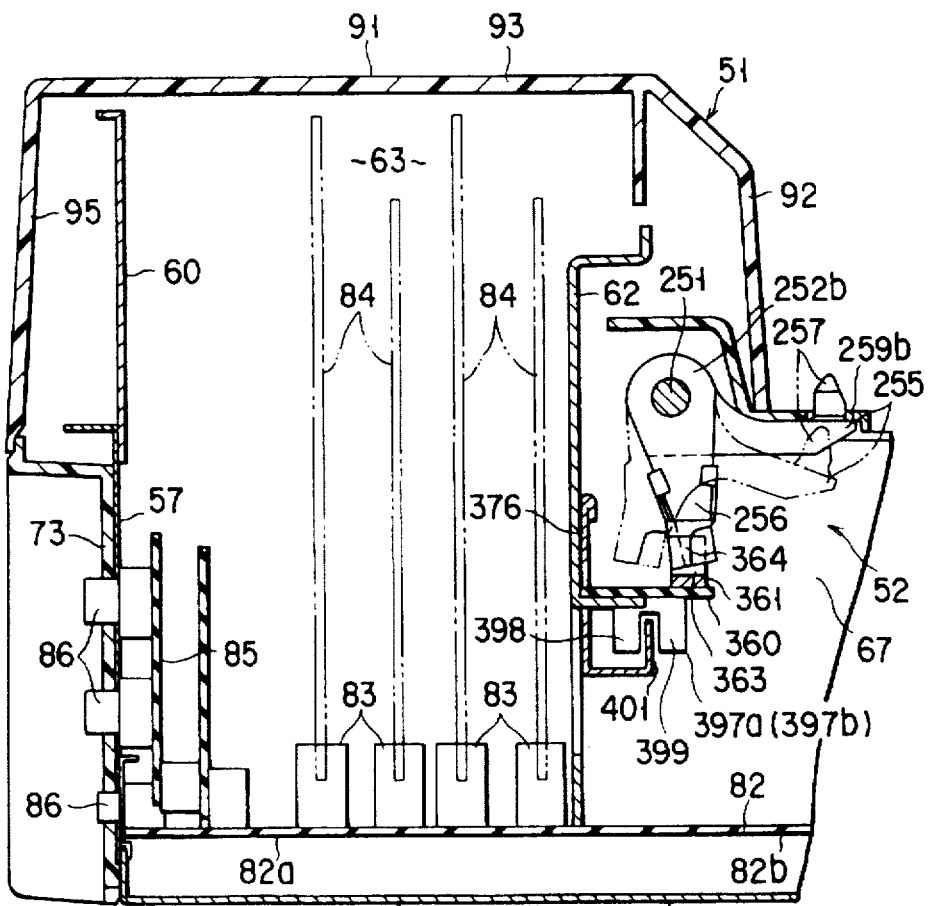
FIG. 13 is a cross-sectional view of the extension board chamber of the station body.

As is shown in FIGS. 9 and 13, a first partition plate 62 is provided between the guide walls 59a and 59b of side panels 56a and 56b. The first partition plate 62 extends in the width direction of station body 52. The first partition plate 62 divides the inside space of the frame 53 into an extension board chamber 63 serving as first device storage section and a device storage chamber 64 serving as second device storage section. The extension board chamber 63 is defined by the bottom panel 55, first and second rear panels 57 and 60, the rear parts of side panels 56a and 56b including guide walls 59a and 59b, and the first partition plate 62. The extension board chamber 63 extends in the width direction of the station body 52 in the rear region of the station body 52 and opens to the upper side of the station body 52.

The device storage chamber 64 is defined by the bottom panel 55, side panels 56a and 56b and first partition plate 62. The device storage chamber 64 is located in front of the extension board chamber 63 and has a greater volume than the extension board chamber 63. As is shown in FIG. 9, the device storage chamber 64 is divided by a second partition plate 65 into a first section 66 and a second section 67. The second partition plate 65 is fixed to the bottom panel 55 and extends in the depth direction of station body 52. The first section 66 and second section 67 are arranged in the width direction of station body 52. A plurality of communication holes 68, as shown in FIG. 9, are formed in that part of the first partition plate 62, which corresponds to the first section 66. The communication holes 68 permit the first section 66 to communicate with the extension board chamber 63.

Figure 8:
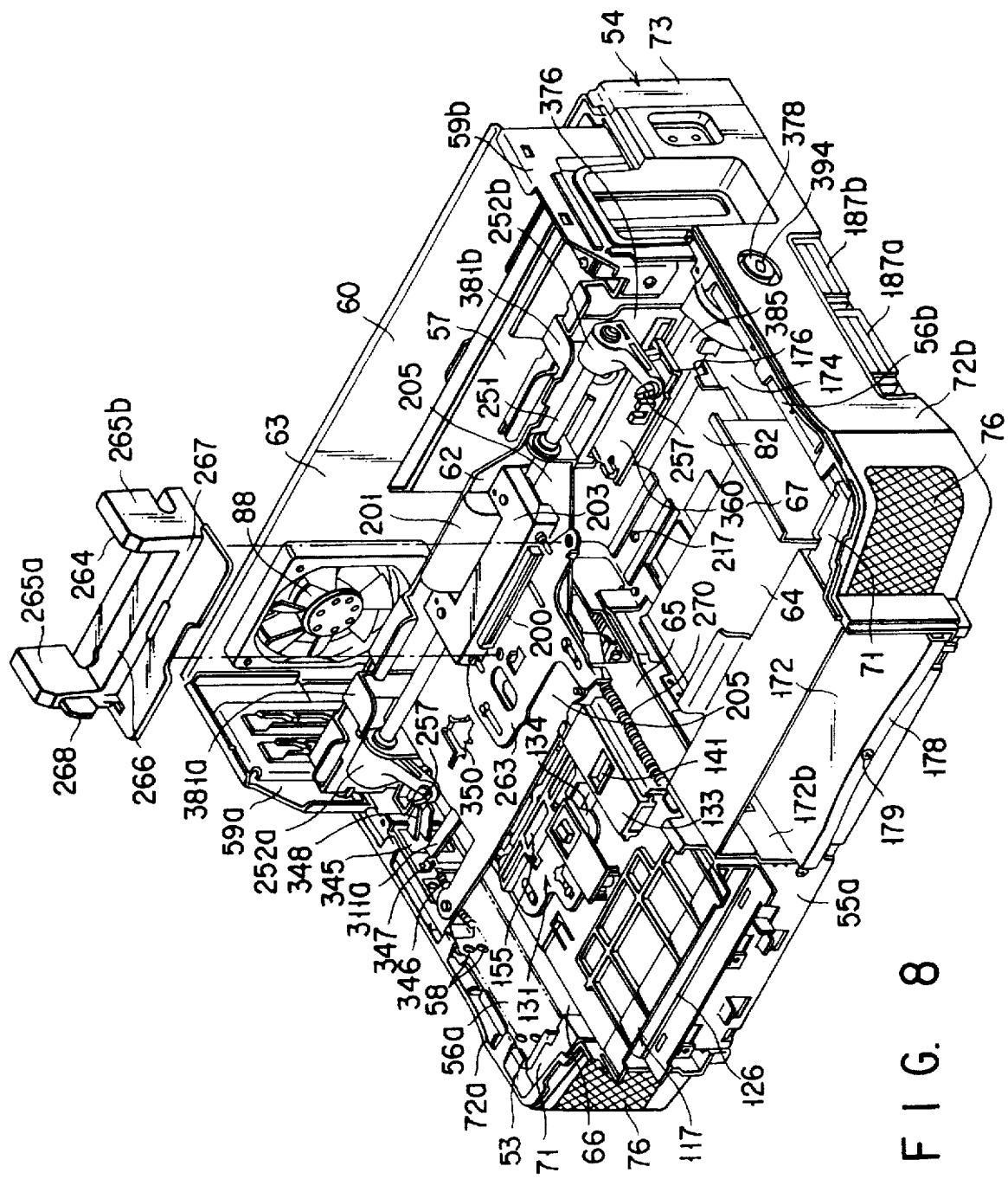
FIG. 8 is a perspective view showing the internal structure of the station body of the extension station.

As is shown in FIGS. 8 and 9, speaker holders 71 are attached to front end portions of side panels 56a and 56b respectively. The speaker holders 71 are located at the front end of the station body 52, and a speaker (not shown) is supported on each of the speaker holders 71.

Figure 11:
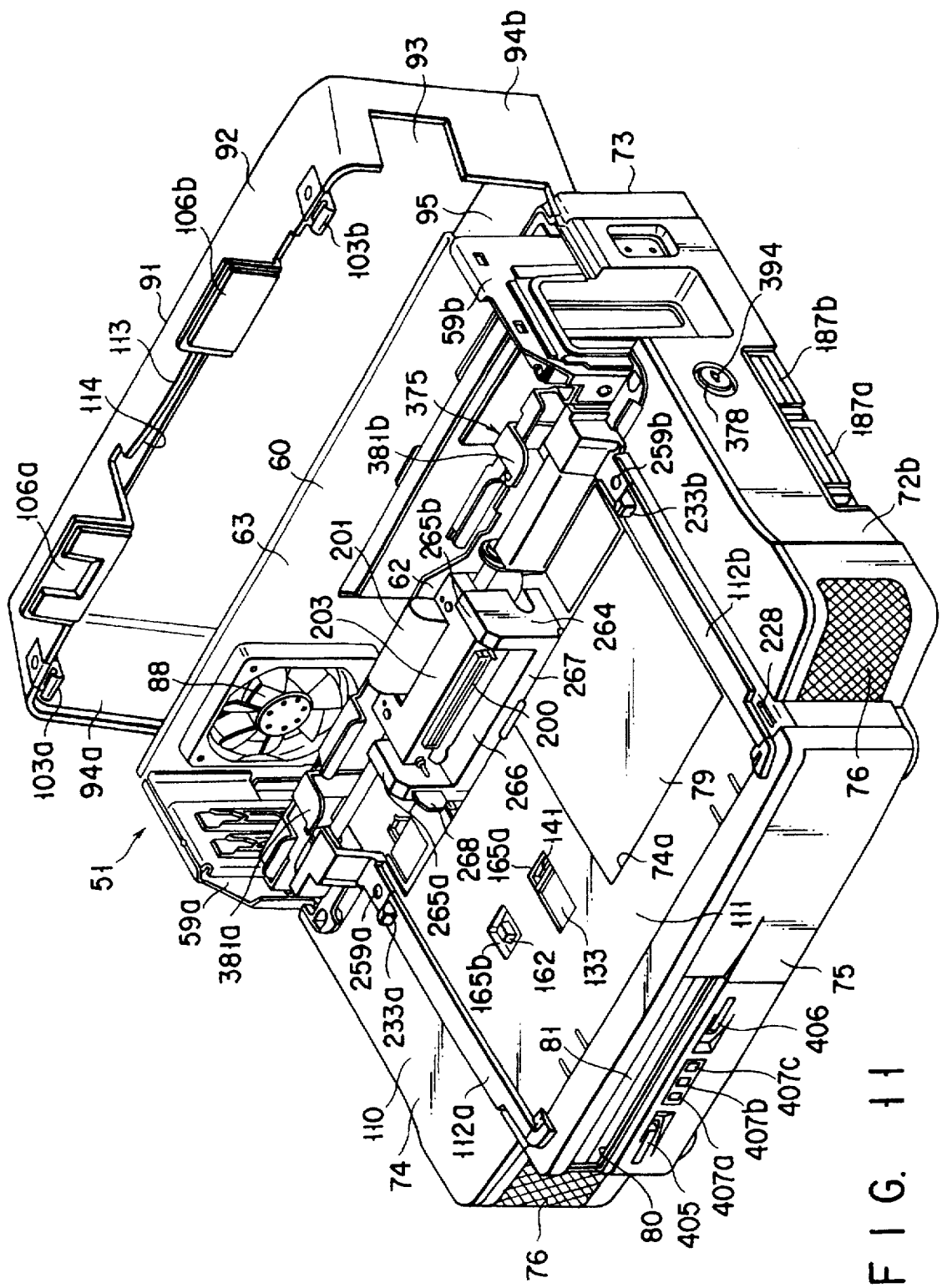
FIG. 11 is a perspective view of the extension station, showing the state in which the top cover is opened to expose an extension board chamber.
Figure 12:
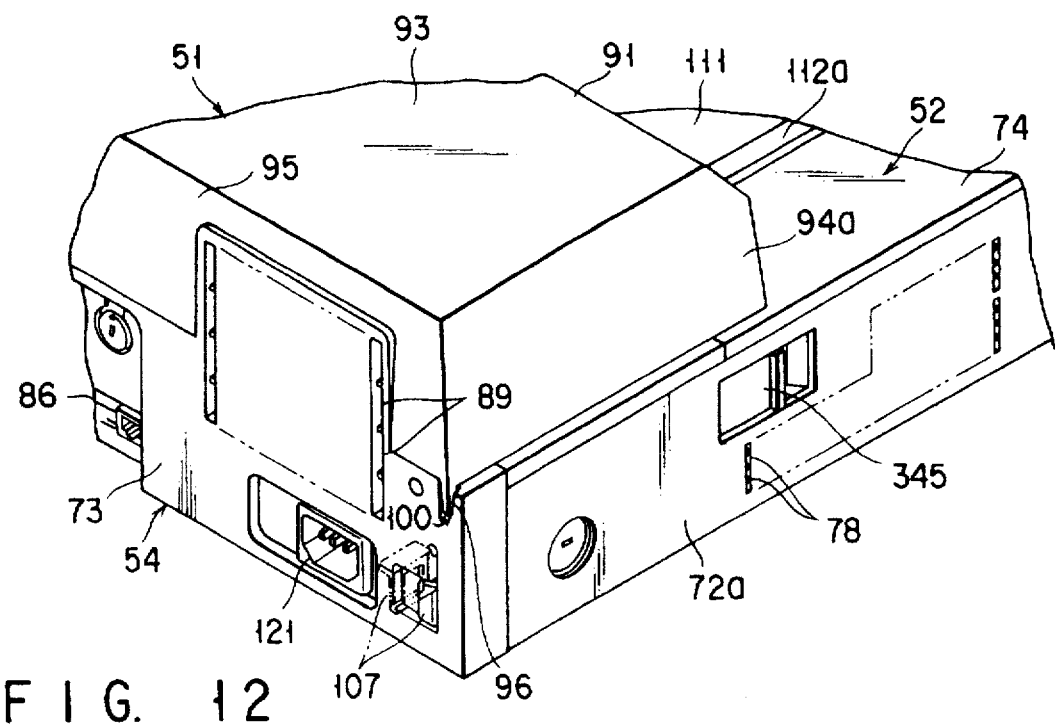
FIG. 12 is a perspective view of the extension station, showing the rear side of a left-hand portion of the station body.

As is shown in FIGS. 7, 11 and 12, the body cover 54 comprises a pair of side covers 72a and 72b, a rear cover 73, an upper cover 74 and a front cover 75. The side covers 72a and 72b are spaced apart in the width direction of the station body 52 and cover the side panels 56a and 56b in the lateral direction. The rear cover 73 extends between rear end portions of the side covers 72a and 72b and cover the rear side of the first rear panel 57. The upper cover 74 extends between upper end portions of the side covers 72a and 72b and cover the upper side of the device storage chamber 64. The front cover 75 is continuous with front end portions of the side covers 72a and 72b and upper cover 74 and covers the front side of the device storage chamber 64.

The side covers 72a and 72b have speaker cover portions 76 respectively. Each speaker cover portion 76 covers the front side of the associated speaker and speaker holder 71. As is shown in FIG. 12, a plurality of air inlets 78 are formed in the left-hand side cover 72a. The air inlets 78 communicate with the vent holes 58 in the side panel 56a.

The upper cover 74 has a flat plate shape, as shown in FIG. 7. The upper cover 74 has a greater plan shape than the housing body 2 of computer 1. The part of the upper cover 74, which corresponds to the second section 67, has an opening portion 74a. The opening portion 74a communicates with the second section 67. The opening portion 74a has such a size that the operator's finger can enter therein. The opening portion 74a is covered by a removable cover plate 79. The cover plate 79 is flush with the upper cover 74.

The front cover 75 is removably coupled to the front end of bottom panel 55 and the front end of upper cover 74. The front cover 75 is located between the speaker cover portions 76 of side covers 72a and 72b. The front cover 75 has a device insertion hole 80 communicating with the first section 66. The CD-ROM drive 16 or FDD 17 is inserted into the device insertion hole 80. The device insertion hole 80 has a rectangular shape elongated in the width direction of the station body 52. The device insertion hole 80 is covered by a shutter 81.

As is shown in FIGS. 13 and 23, a main circuit board 82 is supported on the bottom panel 55 of frame 53. The circuit board 82 is situated in parallel to the bottom panel 55. The circuit board 82 comprises a first portion 82a situated in a bottom region of the extension board chamber 63 and a second portion 82b situated in a bottom region of the second section 67. A plurality of extension board connectors 83 are mounted on the first portion 82a of circuit board 82. The connectors 83 are arranged in the bottom region of extension board chamber 63 in the depth direction of the station body 52.

A plurality of extension boards 84, each being a kind of extension device, are removably contained in the extension board chamber 63. The extension boards 84 are detachably coupled to the connectors 83.

As is shown in FIG. 13, a connector board 85 is supported on the first portion 82a of circuit board 82. The connector board 85 is situated in an upright position on a rear end portion of the extension board chamber 63. A plurality of connectors 86 are supported on the connector board 85. The connectors 86 are used for connection with, e.g. an external CRT display, an extension device of RS 232C Standard, a mouse, or an external keyboard. The connectors 86 are connected to the circuit board 82 via the connector board 85. The connectors 86 are exposed to the rear side of the station body 52 through the rear cover 73.

A motor fan 88 is disposed in the extension board chamber 63, as shown in FIG. 11. The motor fan 88 is driven to cool the extension boards 84 and is supported on the second rear panel 60. As is shown in FIG. 12, an exhaust port 89 is formed in the rear cover 73. The exhaust port 89 faces the motor fan 88. If the motor fan 88 is driven, the inside of the extension board chamber 63 is set at a negative pressure level and outside air is introduced into the first section 66 of the device storage chamber 64 via the air inlets 78 in side cover 72a and the vent holes 58 in side panel 56a. The air is then introduced into the extension board chamber 63 via the communication holes 68 in the first partition plate 62. The air, which has cooled the extension boards 84 contained in the extension board chamber 63, is exhausted to the rear side of station body 52 through the exhaust port 89.

As is shown in FIGS. 11 to 13, a top cover 91 of a synthetic resin is attached to a rear end portion of station body 52. The top cover 91 covers the extension board chamber 63. The top cover 91 comprises a front wall 92, an upper wall 93 continuous with the front wall 92, a pair of side walls 94a and 94b continuous with the front wall 92 and upper wall 93, and a rear wall 95 continuous with the upper wall 93 and side walls 94a and 94b. Accordingly, the top cover 91 has a downwardly opened box shape.

As is shown in FIGS. 14A to 14D, support portions 96 are formed integral with rear end portions of the respective side walls 94a and 94b of top cover 91. Each support portion 96 extends downward from the associated side wall 94a, 94b. A columnar projection 97 is formed on the outer side face of the support portion 96. The projection 97 has an outer peripheral surface 97a including an arcuated portion. Two cut portions 98a and 98b formed in parallel to each other are provided on the outer peripheral surface 97a. Accordingly, the projection 97 has a shorter axis S extending between the cut portions 98a and 98b and a longer axis L extending in a direction perpendicular to the shorter axis S.

Figure 14A:
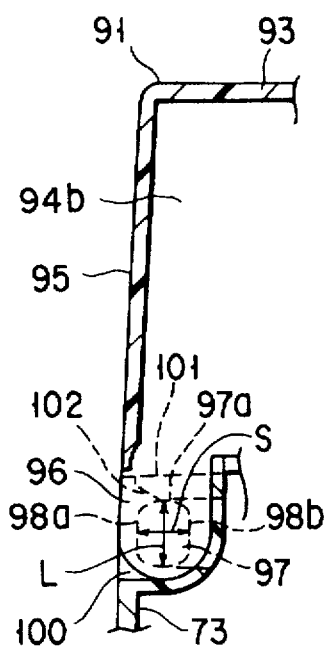
FIG. 14A is a cross-sectional view of a top cover attachment portion in the state in which the top cover is rotated to the closed position.
Figure 14B:
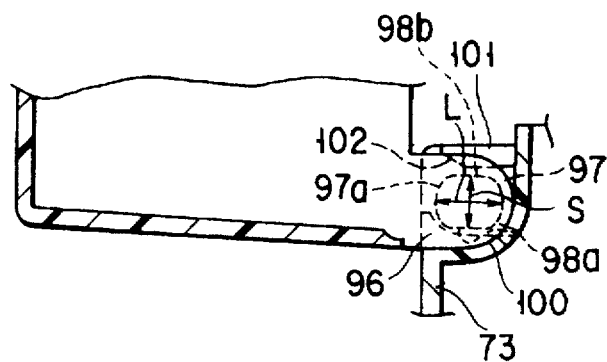
FIG. 14B is a cross-sectional view of the top cover attachment portion in the state in which the top cover is rotated to the open position.
Figure 14C:
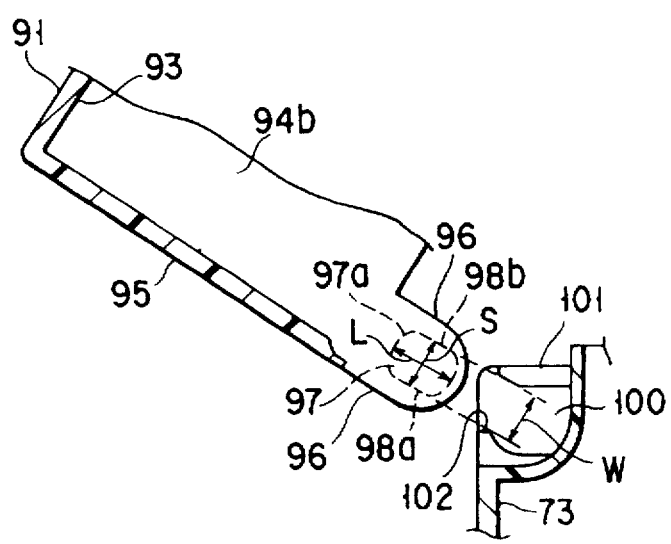
FIG. 14C is a cross-sectional view showing the state in which the top cover is separated from the station body.
Figure 14D:
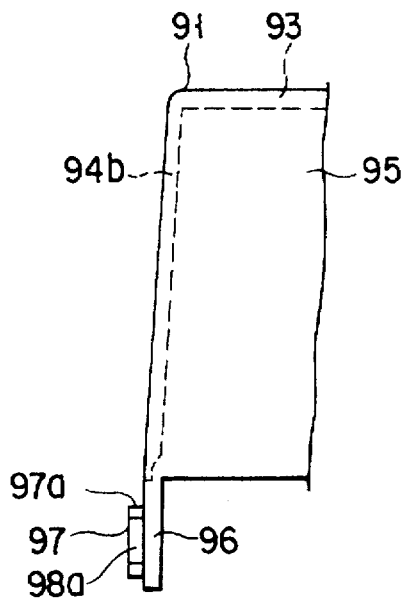
FIG. 14D is a rear view of a region of a support portion and a projection of the top cover.

As is shown in FIGS. 12 and 14C, cover support portions 100 are formed on both side portions of an upper edge portion of the rear cover 73. Each cover support portion 100 has a groove shape opened rearward and upward. Each support portion 96 of top cover 91 is inserted in the associated cover support portion 100.

The cover support portion 100 has a side face opposed to the outer side face of support portion 96. This side face of cover support portion 100 is provided with a bearing portion 101 to be slidably engaged with the projection 97. The bearing portion 101 has a notch portion 102 opened rearwardly upward of the station body 52. The width W of opening of the notch portion 102 is slightly greater than the length of the shorter axis S of the projection 97.

The top cover 91 is coupled to the body cover 54 of station body 52 such that the projection 97 of support portion 96 is inserted in the cover support portion 100 through the notch portion 102 and the projection 97 is engaged with the bearing portion 101. Accordingly, the top cover 91 is rotatable, with an engagement portion between the projection 96 and bearing portion 101 as a center of rotation, between a closed portion where the top cover 91 covers the extension board chamber 63 of station body 52 from above, and an open position where the top cover 91 is turned down in rear of the station body 52 and opens the extension board chamber 63 to the upper side.

When the top cover 91 is rotated to the closed position, as shown in FIG. 14A, the longer axis L of projection 97 extends vertical, and the direction of axis L does not coincide with the direction of opening of the notch portion 102 of bearing portion 101. Similarly, as shown in FIG. 14B, when the top cover 91 is rotated to the open position, the direction of the longer axis L of projection 97 does not coincide with the direction of opening of the notch portion 102. Thus, when the top cover 91 is rotated to either the closed position or open position, it is not removed from the station body 52.

The top cover 91 can be removed from the station body 52 in the following manner. The top cover 91 is rotated to an intermediate position between the closed position and open position, as shown in FIG. 14C, so that the direction of the longer axis L of each projection 97 may coincide with the direction of opening of each notch portion 102. In this state, the top cover 91 is pulled rearwardly upward and the projections 97 are drawn out rearward of the station body 52 through the notches 102. Thereby, the support portions 96 of top cover 91 are pulled out of the cover support portions 100 and the top cover 91 is separated from the station body 52.

As is shown in FIGS. 5 and 13, when the top cover 91 is rotated to the closed position, the front wall 92 of top cover 91 extends upward from the rear end portion of upper cover 74 and covers the front side of the first partition plate 62. A pair of cover latches 103a and 103b, as shown in FIG. 11, are attached to a lower end portion of the front wall 92. The cover latches 103a and 103b are spaced apart in the width direction of top cover 91. When the top cover 91 is rotated to the closed position, the cover latches 103a and 103b are removably engaged with the rear edge portion of upper cover 74, thereby holding the upper cover 91 in the closed position.

The front wall 92 of top cover 91 has a pair of tongue portions 106a and 106b as extension portions. The tongue portions 106a and 106b are spaced apart in the width direction of top cover 91 between the cover latches 103a and 103b. When the top cover 91 is rotated to the closed position, the tongue portions 106a and 106b extend forward from the front wall 92 of top cover 91 and is continuous with the rear end portion of upper cover 74 and the rear end portion of cover plate 79. These tongue portions 106a and 106b are located flush with the upper cover 74 and cover plate 79.

As is shown in FIG. 12, an antitheft hook 107 is disposed at a corner portion of a rear end portion of the station body 52. The hook 107 is supported on the station body 52 so as to be rotatable between a use position where the hook 107 projects rearward of station body 52 and a storage position where the hook 107 is stored in the corner portion of the rear end portion of station body 52. When the hook 107 is rotated to the use position, a lock chain (not shown) is hooked to the hook 107.

As is shown in FIGS. 4 and 5, the station body 52 has a mount portion 110 on which the computer 1 is detachably mounted. The mount portion 110 is constituted by the upper cover 74 of station body 52. The upper surface of the upper cover 74 serves as a flat mount surface 111 on which the housing body 2 is to be placed. The mount surface 111 has substantially the same size as the bottom wall 4a of housing body 2.

A pair of guide rails 112a and 112b are disposed on the mount surface 111. The guide rails 112a and 112b are spaced apart in the width direction of mount surface 111 and extend in the depth direction of mount surface 111. A rear end portion of each of the guide rails 112a and 112b is continuous with the front wall 92 of top cover 91. The upper surfaces of the guide rails 112a and 112b project higher than the mount surface 111. Thus, when the housing body 2 of computer 1 is placed on the mount surface 111, both side portions of the bottom wall 4a of housing body 2 are put in slidable contact with the upper surfaces of the guide rails 112a and 112b. Accordingly, the housing body 2 of computer 1 is slid in the depth direction of mount surface 111 along the guide rails 112a and 112b.

The opening portion 74a of upper cover 74 is open to the mount surface 111. The opening portion 74a, cover plate 79 and tongue portions 106a and 106b of top cover 91 are located between the guide rails 112a and 112b.

When the top cover 91 is closed, as shown in FIG. 5, the front wall 92 of top cover 91 is located at the terminal end portion of the mount surface 111. When the housing body 2 of computer 1 is placed on the mount surface 111, the front wall 92 faces the rear wall 4d of lower housing 4 and the rear wall 9a of top cover 9. A recess portion 113 is formed at a substantially middle portion of the front wall 92. The recess portion 113 faces the exhaust port 44 of housing body 2 and cooperates with the rear wall 9a of top cover 9 in defining an air passage for exhausting cooling air from the exhaust port 44. Even if the computer 1 is placed on the mount surface 111, the exhaust port 44 is not closed by the front wall 92 of top cover 91 and the cooling air is exhaust from the exhaust port 44 without problem.

The front wall 92 of top cover 91 has a notch portion 114 continuous with the terminal end portion of mount surface 111. The notch portion 114 is located below the recess portion 113 and faces the first partition plate 62.

Figure 16:
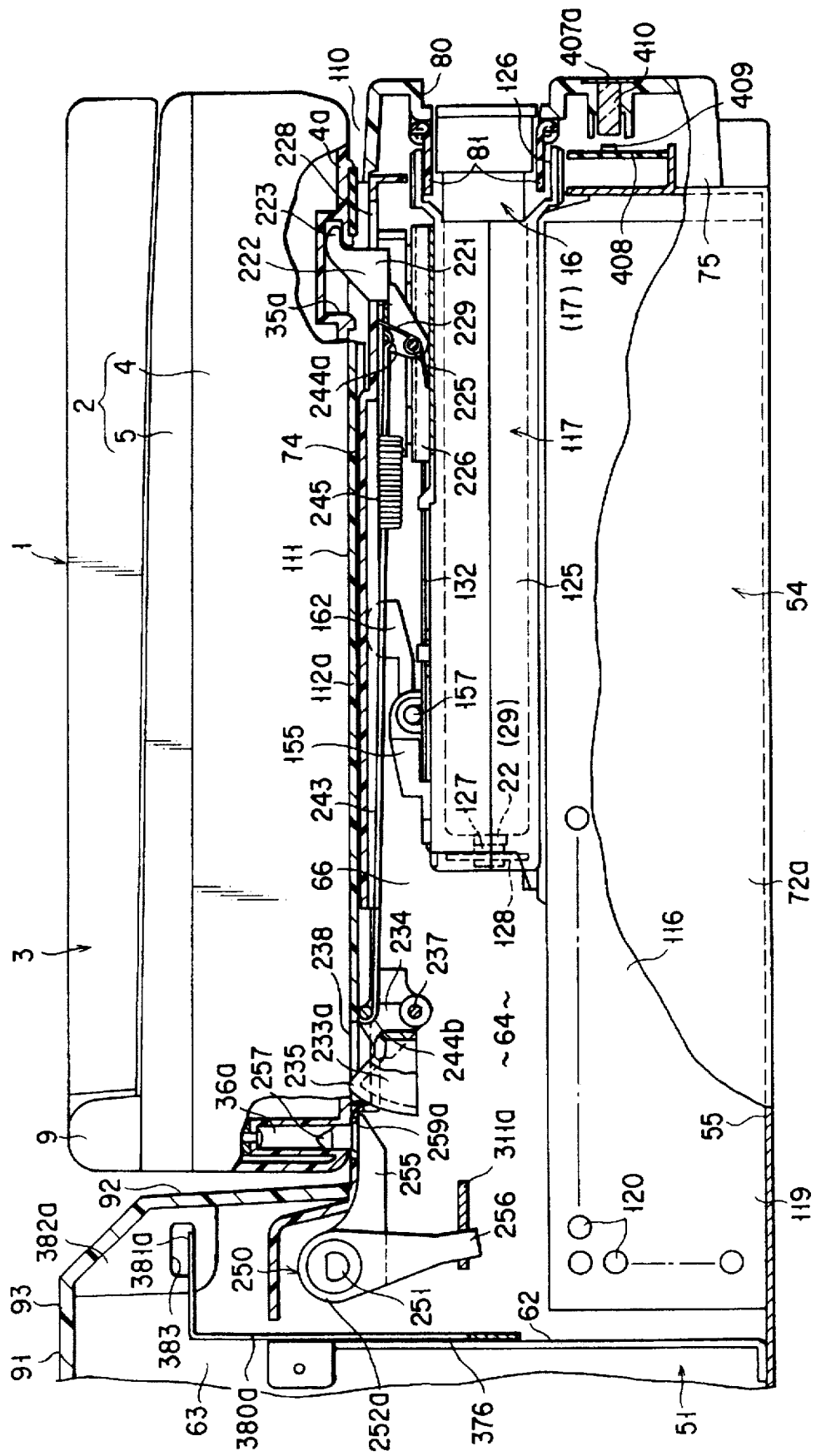
FIG. 16 is a cross-sectional view showing the state the portable computer placed on the mount portion of the extension station is slid to the terminal end portion of the mount portion.

As is shown in FIGS. 9, 15 and 16, a power unit 116 and an adapter 117 are contained in the first section 66 of device storage chamber 64. The power unit 116 serves as a driving power supply for the extension station 51. The power unit 116 is connected to the circuit board 82 via a power cable 118. The power unit 116 has a box-shaped case 119. The case 119 covers a circuit board (not shown) and power supply circuit components (not shown) mounted on the circuit board. The case 119 is screwed down to the bottom panel 55 of frame 53.

The case 119 has a number of through-holes 120. If the motor fan 88 is driven, part of outside air introduced into the first section 66 flows into the case 119 through the through-holes 120, thereby forcibly cooling the power supply circuit components.

The power unit 116 has a power connector 121, as shown in FIG. 12. A power plug (not shown) connected to a commercial power supply is detachably coupled to the power connector 121. The power connector 121 is exposed to the rear side of the station body 52 through the rear cover 73. The power unit 116 is turned on when the power plug is inserted in the power connector 121. Thereby, the extension station 51 is set in the standby state.

As is shown in FIGS. 15 and 16, the adapter 117 removably stores one of the CD-ROM drive 16 and FDD 17. In the present embodiment of the invention, the computer 1 and extension station 51 can commonly use one of the CD-ROM drive 16 and FDD 17.

Figure 17:
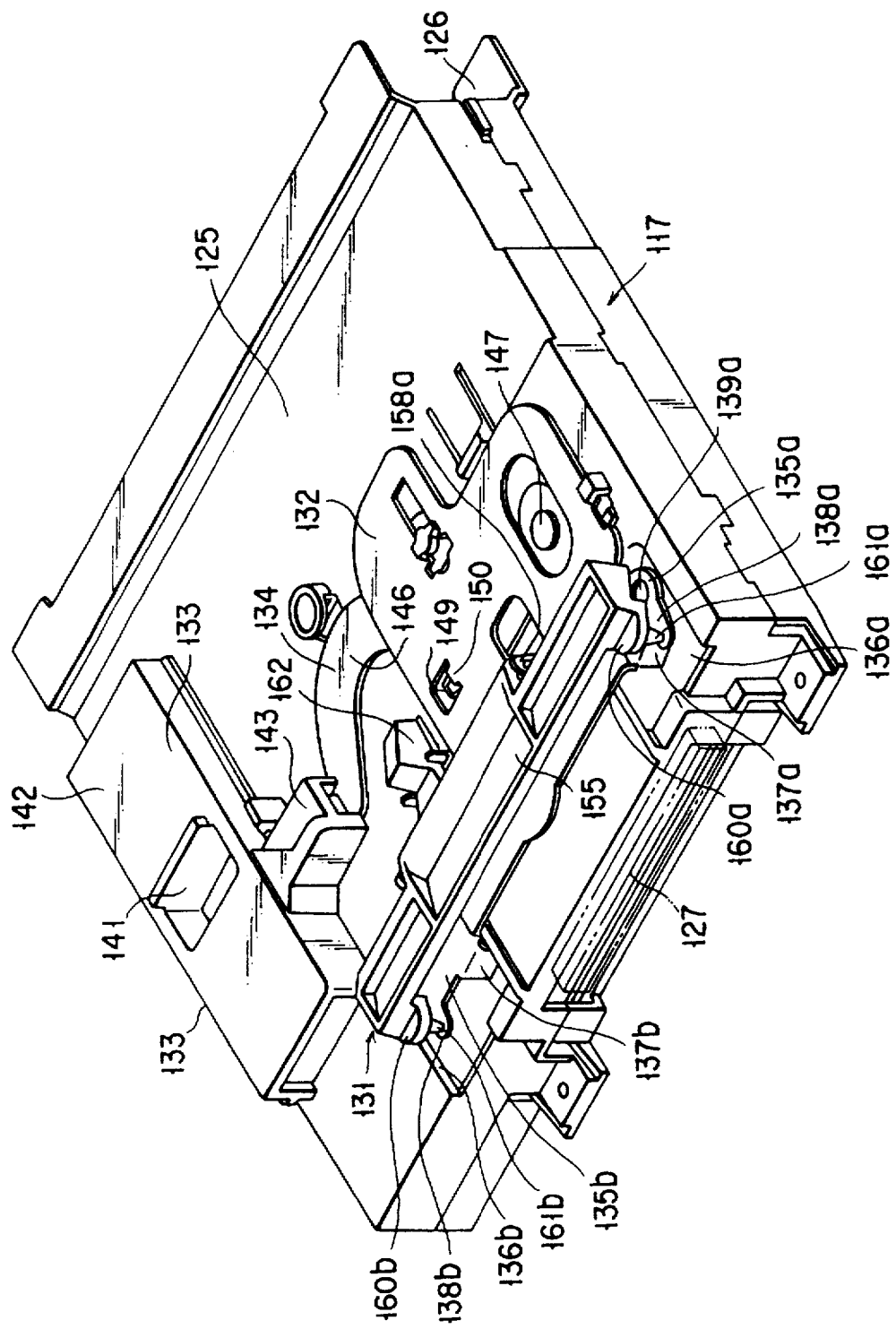
FIG. 17 is a perspective view of an adaptor built in the extension station.

As is shown in FIG. 17, the adapter 117 has a casing 125 of a synthetic resin. The CD-ROM drive 16 or FDD 17 is removably inserted into the casing 125. The casing 125 has a flat box-like shape. The casing 125 has an opening portion 126 communicating with the device insertion hole 80 in the front cover 75. The casing 125 is screwed down on the upper surface of the case 119 of power unit 116. The adapter 117 is thus stacked on the power unit 116.

The casing 125 has a terminal end portion opposed to the opening portion 126. A connector board 128 having a relay connector 127 is supported on the terminal end portion of casing 125. The connector board 128 is electrically connected to the circuit board 82 by means of a flexible wiring board (not shown). If the CD-ROM drive 16 or FDD 17 is inserted in the insertion hole 80, the interface connector 22 (29) of the drive 16 (17) is engaged with the relay connector 127. Thereby, the CD-ROM drive 16 or FDD 17 is electrically connected to the extension station 51.

An ejector 131 is disposed on the upper surface of casing 125, as shown in FIG. 17. The ejector 131 is used to eject the CD-ROM drive 16 or FDD 17 from the casing 125. The ejector 131 comprises a metallic slide plate 132, a manual eject lever 133 of a synthetic resin, and a metallic rotary lever 134 for interlocking the eject lever 133 and slide plate 132.

The slide plate 132 is supported on the upper surface of casing 125 so as to be slidable in the direction of insertion of CD-ROM drive 16 or FDD 17. The slide plate 132 has a pair of tongue portions 135a and 135b at end portions located near the relay connector 127. The tongue portions 135a and 135b are disposed in parallel to the upper surface of casing 125. The tongue portions 135a and 135b are spaced apart in a direction crossing the direction of sliding of the slide plate 133. Engagement holes 139a and 139b are formed in the tongue portions 135a and 135b respectively.

Figure 18A:
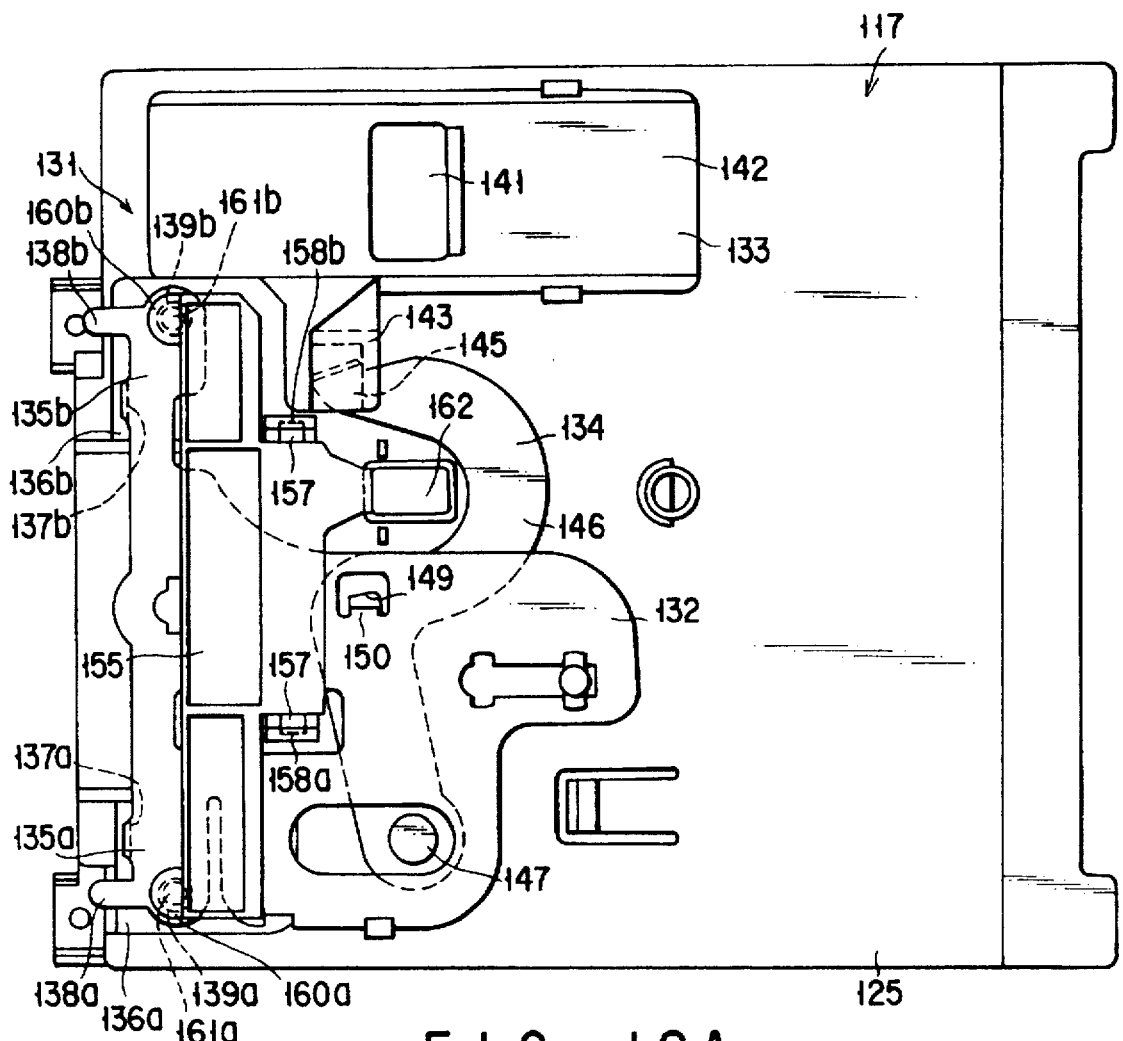
FIG. 18A is a plan view of an ejector, showing the state in which an eject lever is slid to a first slide position and a lock lever is rotated to a locked position.
Figure 18B:
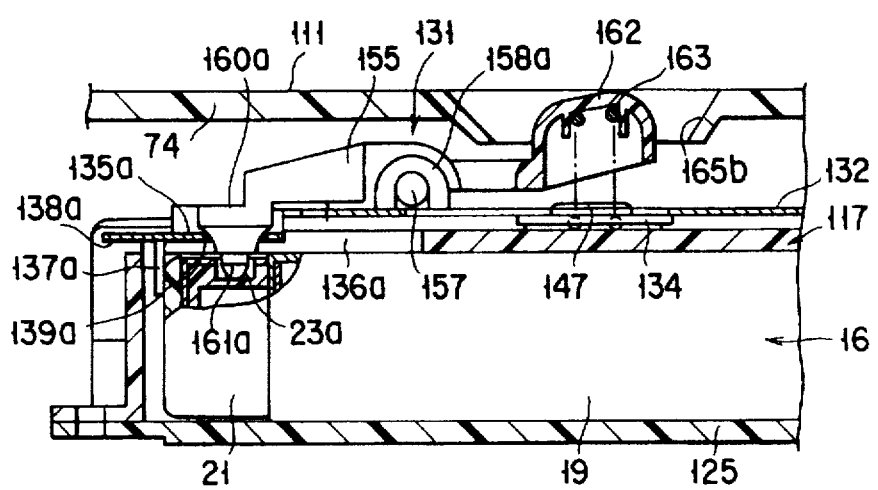
FIG. 18B is a cross-sectional view of the ejector, showing the state in which the eject lever is slid to the first slide position and the lock lever is rotated to the locked position.
Figure 19A:
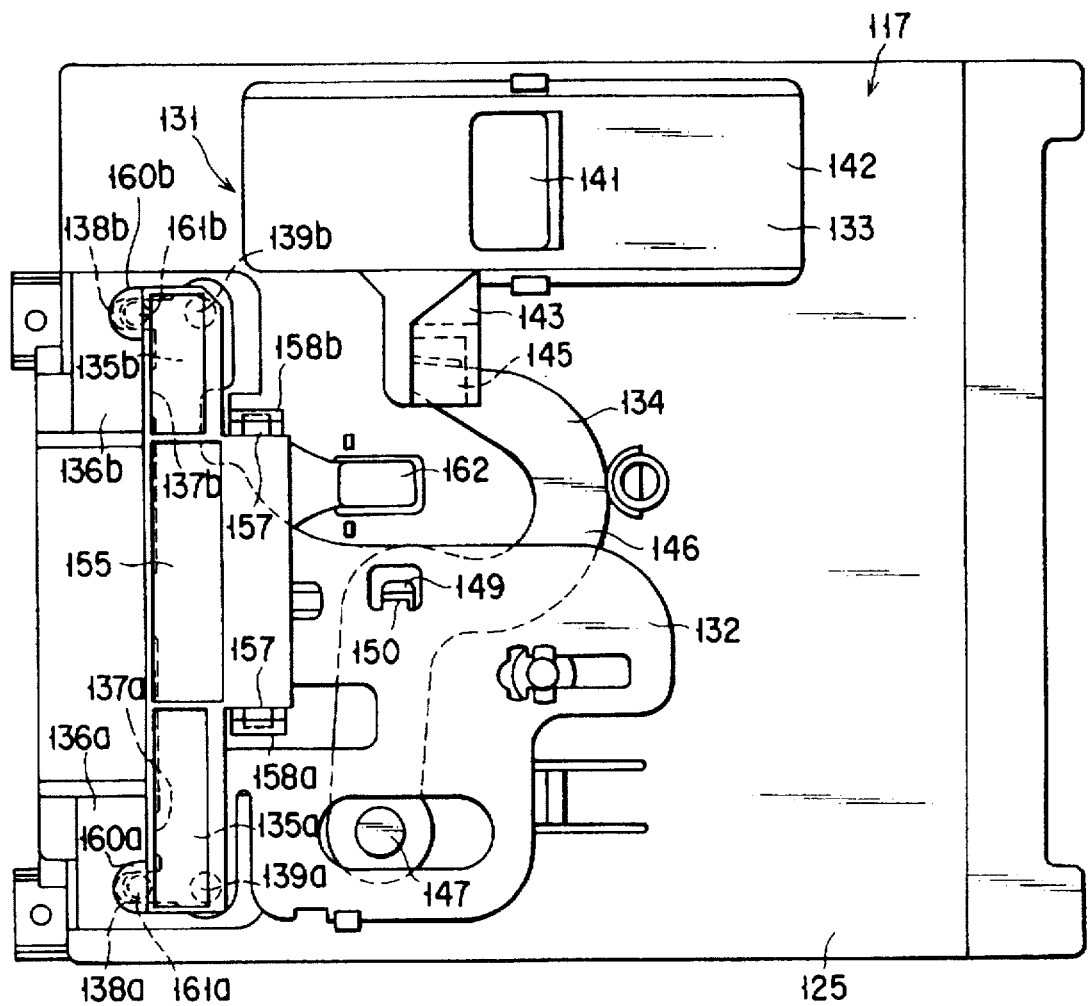
FIG. 19A is a plan view of the ejector, showing the state in which the eject lever is slid to a second slide position and the lock lever is rotated to an unlocked position.
Figure 19B:
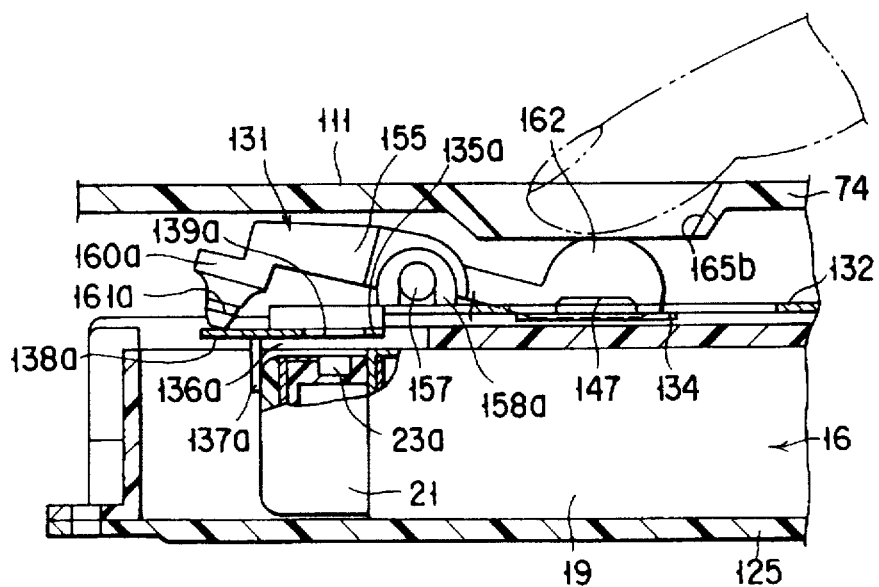
FIG. 19B is a cross-sectional view of the ejector, showing the state in which the eject lever is slid to the second slide position and the lock lever is rotated to the unlocked position.

As is shown in FIGS. 17, 18B and 19B, a pair of communication holes 136a and 136b are formed in the upper surface of casing 125. The communication holes 136a and 136b face the tongue portions 135a and 135b of slide plate 132. The tongue portions 135a and 135b integrally include a pair of engaging portions 137a and 137b and a pair of guide portions 138a and 138b. The engaging portions 137a and 137b extend downward from the tongue portions 135a and 135b. The engaging portions 137a and 137b project into the casing 125 through the communication holes 136a and 136b. The relay connector 127 is located between the engaging portions 137a and 137b.

As is shown in FIGS. 18B and 19B, if the CD-ROM drive 16 or FDD 17 is inserted in the casing 125, the engaging portions 137a and 137b come into contact with the end face of connector bracket 21 of CD-ROM drive 16 or the end face of connector attachment portion 28 of FDD 17. Thus, the slide plate 132 is slid between a first position and a second position. In the first position, the slide plate 132 is pushed towards the relay connector 127 and the relay connector 127 is engaged with the interface connector 22 or 29. In the second position, the CD-ROM drive 16 or FDD 17 is moved away from the relay connector 127 and the interface connector 22 or 29 is disengaged from the relay connector 127.

The guide portions 138a and 138b of slide plate 132 are flush with the tongue portions 135a and 135b. The guide portions 138a and 138b extend linearly in the direction of sliding of slide plate 132 from locations near the engagement holes 139a and 139b. When the CD-ROM drive 16 is inserted in the casing 125, the engagement holes 139a and 139b face the recess portions 23a and 23b in the upper surface of the connector bracket 21. When the FDD 17 is inserted in the casing 125, the engagement holes 139a and 139b face the recess portions 30a and 30b in the upper surface of the connector attachment portion 28 of FDD 17.

The eject lever 133 includes a lever body 142 and a coupling portion 143 continuous with a side portion of the lever body 142. The lever body 142 has a recess portion 141 in which the fingertip is to be hooked. The recess portion 141 functions as an operating portion of the eject lever 133. The eject lever 133 is supported on the upper surface of casing 125 so as to be slidable between a first slide position where the eject lever 133 is pushed towards the relay connector 127, and a second slide position where the eject lever 133 is pushed away from the relay connector 127.

The rotary lever 134 includes an engaging portion 145 engaged with the coupling portion 143 of lever body 142, and a lever portion 146 continuous with the engaging portion 145. The lever portion 146 is situated between the upper surface of casing 125 and slide plate 132. The end portion of lever portion 146, which is opposed to the engaging portion 145, is rotatably supported on a shaft member 147 provided on the upper surface of casing 125.

As is shown in FIGS. 18A and 19A, the lever portion 146 of rotary lever 134 has an engagement hole 149. The engagement hole 149 is located at a substantially middle point between the shaft member 147 and engaging portion 145. An engaging portion 150 of slide plate 132 is engaged in the engagement hole 149. If the eject lever 133 is slid, the rotary lever 134 rotates about shaft member 147. The rotational movement of the rotary lever 134 is transmitted to the slide plate 132 via an engagement section between the engagement hole 149 and engaging portion 150. Specifically, if the eject lever 133 is slid from the second slide position to the first slide position, as shown in FIG. 18A, the slide plate 132 is slid from the second position to the first position. If the eject lever 133 is slid from the first slide position to the second slide position, as shown in FIG. 19A, the slide plate 132 is slid from the first position to the second position.

The rotational support point of the rotary lever 134 is located on the side opposite to the eject lever 133, with the engagement section between the rotary lever 134 and slide plate 132 interposed. In addition, the engagement section is located at a substantially middle point between the rotational support point of rotary lever 134 and the coupling portion 143. Accordingly, the amount of sliding movement of slide plate 132 does not exceed half the amount of sliding movement of eject lever 133. Thus, the operating force of the eject lever 133 is amplified and transmitted to the slide plate 132.

The ejector 131 has a lock lever 155 of a synthetic resin. The lock lever 155 is operated to lock the eject lever 133 in the first slide position. The lock lever 155 has a pair of shaft portions 157 extending horizontally in the width direction of casing 125. The shaft portions 157 are rotatably supported on bearing portions 158a and 158b provided on the upper surface of casing 125.

The lock lever 155 has a pair of seat portions 160a and 160b. The seat portions 160a and 160b are put in slidable contact with the tongue portions 135a and 135b of slide plate 132. The seat portions 160a and 160b have engaging projections 161a and 161b on their lower surfaces. When the slide plate 132 is slid to the first position, the engaging projections 161a and 161b face the engagement holes 139a and 139b of tongue portions 135a and 135b. When the slide plate 132 is slid to the second position, the engaging projections 161a and 161b face the guide portions 138a and 138b of tongue portions 135a and 135b.

The lock lever 155 is supported on the upper surface of casing 125 so as to be rotatable about the shaft portions 157 between a locked position, as shown in FIGS. 18A and 18B, and an unlocked position, as shown in FIGS. 19A and 19B. If the lock lever 155 is rotated to the locked position, the engaging projections 161a and 161b are put in the engagement holes 139a and 139b in the slide plate 132, and the slide plate 132 is locked in the first position. When the lock lever 155 is rotated to the unlocked position, the engaging projections 161a and 161b are pulled upward from the engagement holes 139a and 139b and thus the locking of the slide plate 132 by means of engaging projections 161a and 161b is released.

If the slide plate 132 is locked in the first position in the state in which the interface connector 22 or 29 of the CD-ROM drive 16 or FDD 17 is coupled to the relay connector 127, the tip portions of engaging projections 161a and 161b are fitted in the recess portions 23a and 23b, or 30a and 30b. Thereby, the CD-ROM drive 16 or FDD 17 is irremovably held in the casing 125.

The lock lever 155 has a push portion 162. As is shown in FIG. 19B, the push portion 162 is pushed by the operator's fingertip. The push portion 162 is located on the side opposite to the seat portions 160a and 160b, with the shaft portions 157 interposed. A compression coil spring 163 is interposed between the push portion 162 and the upper surface of casing 125. The compression coil spring 163 constantly urges the lock lever 155 to the locked position. If the push portion 162 is pushed downward, as shown in FIGS. 19B and 20, the lock lever 155 is rotated from the locked position to the unlocked position, thereby unlocking the slide plate 132. If the slide plate 132 is slid from the first position to the second position in this state, the tip portions of engaging projections 161a and 161b come into slidable contact with the upper surfaces of guide portions 138a and 138b. Even if the push portion 162 is released, the lock lever 155 is retained in the unlocked position.

Suppose that the slide plate 132 is slid from the second position toward the first position, as in the case where the CD-ROM drive 16 or FDD 17 is inserted into the casing 125. In this situation, once the locations of the engagement holes 139a and 139b of slide plate 132 have been moved to the locations of the engaging projections 161a and 161b, the lock lever 155 is automatically rotated to the locked position. Thus, the engaging projections 161a and 161b are engaged in the recess portions 23a and 23b, or 30a and 30b, via the engagement holes 139a and 139b. Accordingly, the CD-ROM drive 16 or FDD 17 is fixed in the casing 125 and the slide plate 132 and eject lever 133 are prevented from sliding.

Figure 10:
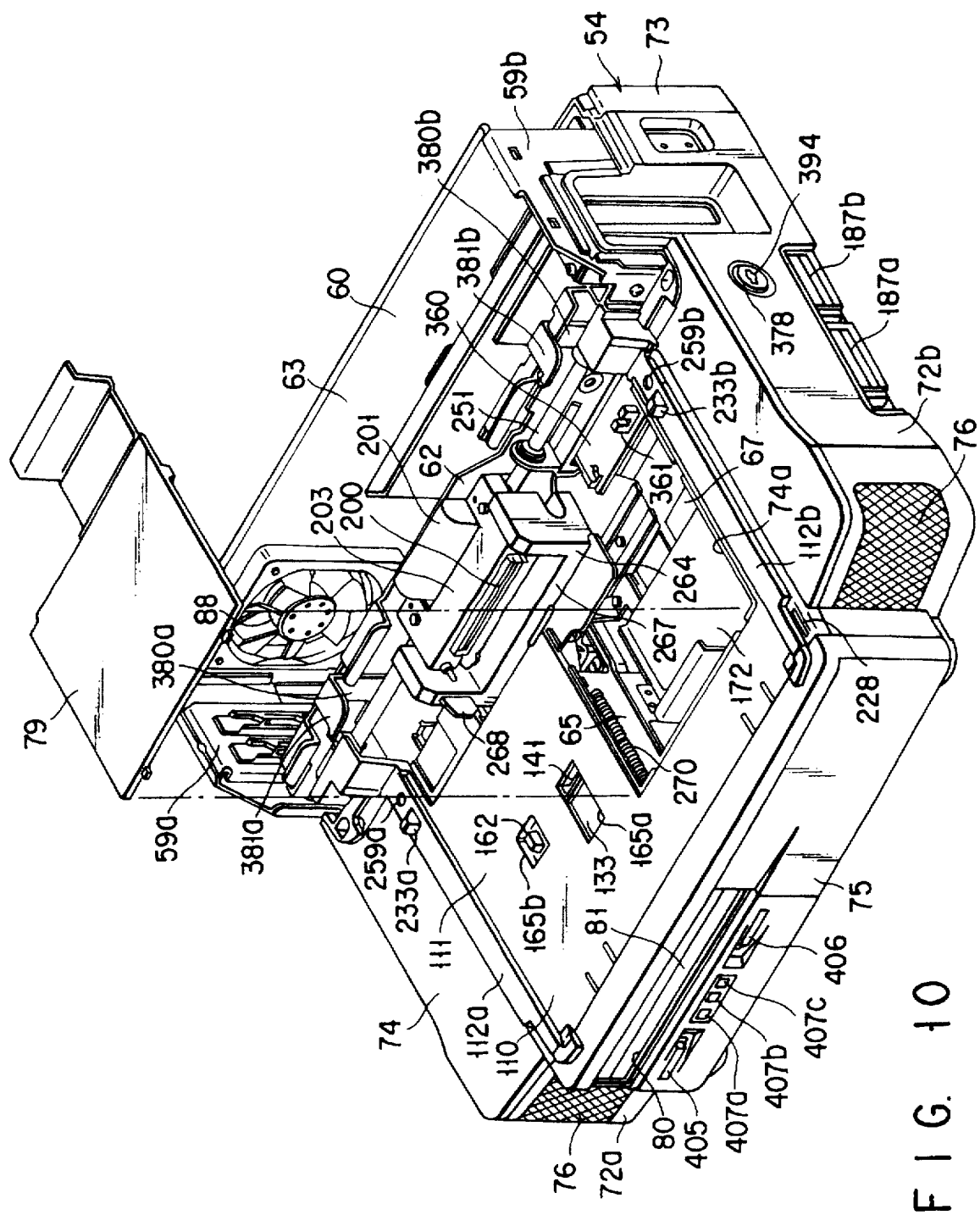
FIG. 10 is a perspective view of the extension station, showing in an exploded manner the state in which a cover plate is removed from the upper cover of the station body.

As regards the ejector 131 having the above structure, the recess portion 141 of eject lever 133 and the push portion 162 of lock lever 155 face the upper cover 74 constituting the mount portion 110. The upper cover 74, as shown in FIG. 10, has first and second opening portions 165a and 165b at positions corresponding to the recess portion 141 of eject lever 133 and the push portion 162 of lock lever 155. Thus, the recess portion 141 of eject lever 133 and the push portion 162 of lock lever 155 are exposed to the mount surface 111 of station body 52 through the first and second opening portions 165a and 165b. The recess portion 141 and push portion 162 are adjacent to each other. When the computer 1 is placed on the mount surface 111, as shown in FIG. 21, the recess portion 141 and push portion 162 are covered by the housing body 2 of computer 1.

As is shown in FIGS. 22 and 23, a 5-inch-sized extension device 171 such as an external FDD or a streamer tape drive is disposed in the second section 67 of device storage chamber 64. The extension device 171 is contained within the second section 67 so as to be selectively removed by means of a tray 172 of a metallic plate. The tray 172 comprises a bottom wall 172a for receiving the extension device 171 and a pair of side walls 172b and 172c continuous with the bottom wall 172a. The extension device 171 is removably attached to the side walls 172b and 172c by means of screws.

As is shown in FIGS. 22 to 24, a pair of guide rails 173a and 173b are disposed in the second section 67. The guide rails 173a and 173b are used to guide the tray 172 into the second section 67. The guide rails 173a and 173b are spaced apart in the width direction of second section 67 and extend in the depth direction of second section 67. Accordingly, corner portions of the tray 172, which are defined by the bottom wall 172a and side walls 172b and 172c, are put in slidable contact with the guide rails 173a and 173b. The tray 172 is thus slidable in the depth direction of second section 67 along the guide rails 173a and 173b.

An extension portion 174 is formed at that end portion of the tray 172, which is to be first inserted into the second section 67. The extension portion 174 extends toward the first partition plate 62. An upwardly extending engaging portion 175 is formed on one side portion of the extension portion 174. The engaging portion 175 has an engaging groove 176 which is opened to the upper edge of the engaging portion 175.

The tray 172 has a downwardly extending flange portion 178 at the end portion of tray 172, which is opposed to the extension portion 174. When the tray 172 is completely inserted in the second section 67, the flange portion 178 is abutted upon the support wall 55a of bottom panel 55. The flange portion 178 is detachably attached to the support wall 55a by means of a screw 179. The tray 172 and screw 179 are covered by the front cover 75.

As is shown in FIGS. 23 and 24, the extension device 171 is situated above the second portion 82b of circuit board 82. The extension device 171 is connected to an interface connector 182 by means of a cable 181. The interface connector 182 is connected to an extension connector 183. The extension connector 183 is mounted on the circuit board 82 and located in a deep region of the second section 67. A connection portion between the interface connector 182 and extension connector 183 is located below the opening portion 74a of upper cover 74.

When the extension device 171 is mounted in the second section 67, the front cover 75 is removed and the second section 67 of device storage chamber 64 is opened to the front side of station body 52, as shown in FIG. 22. Then, the screw 179 is unfastened to set the tray 172 free. The tray 172 is pulled out of the second section 67, and the desired extension device 171 is mounted on the tray 172. The cable 181 of extension device 171 is then led into the second section 67, and the interface connector 182 attached to the cable 181 is coupled to the extension connector 183.

Since the extension connector 183 is located in the deep region of second section 67, the cover plate 79 is removed from the upper cover 74 and the opening portion 74a is opened, as shown in FIG. 24, in order to couple the connectors 182 and 183. The opening portion 74a is located above the connection portion between the connectors 182 and 183 and thus the fingertip is inserted into the second section 67 through the opening portion 74a to couple the connectors 182 and 183. Although the extension connector 183 is disposed in the deep region of second section 67, the surrounding of the extension connector 183 is widely opened to the upper side of mount surface 111 and the work for coupling the extension connector 183 and interface connector 182 can be easily carried out.

After the interface connector 182 has been coupled to the extension connector 183, the tray 172 is inserted into the second section 67 along the guide rails 173a and 173b. Then, the flange portion 178 of tray 172 is fixed to the support wall 55a by means of the screw 179 and the tray 172 on which the extension device 171 is mounted is held in a predetermined position within the second section 67. Finally, the front cover 75 is attached to the station body 52, thereby closing the opening end of the second section 67. Thus, the work of attaching the extension device 171 is completed.

As is shown in FIG. 23, a pair of card storage sections 186a and 186b are provided at a right-hand end portion of circuit board 82. Extension cards (not shown) such as PCMCIA cards are removably contained within the card storage sections 186a and 186b. The card storage sections 186a and 186b are arranged in the depth direction of the station body 52. The card storage sections 186a and 186b are situated adjacent to the right-hand side panel 56b and side cover 72b of station body 52 in the bottom region of second section 67. As is shown in FIGS. 5 and 7, a pair of card insertion holes 187a and 187b communicating with the card storage sections 186a and 186b are formed in the side cover 72b.

Figure 25:
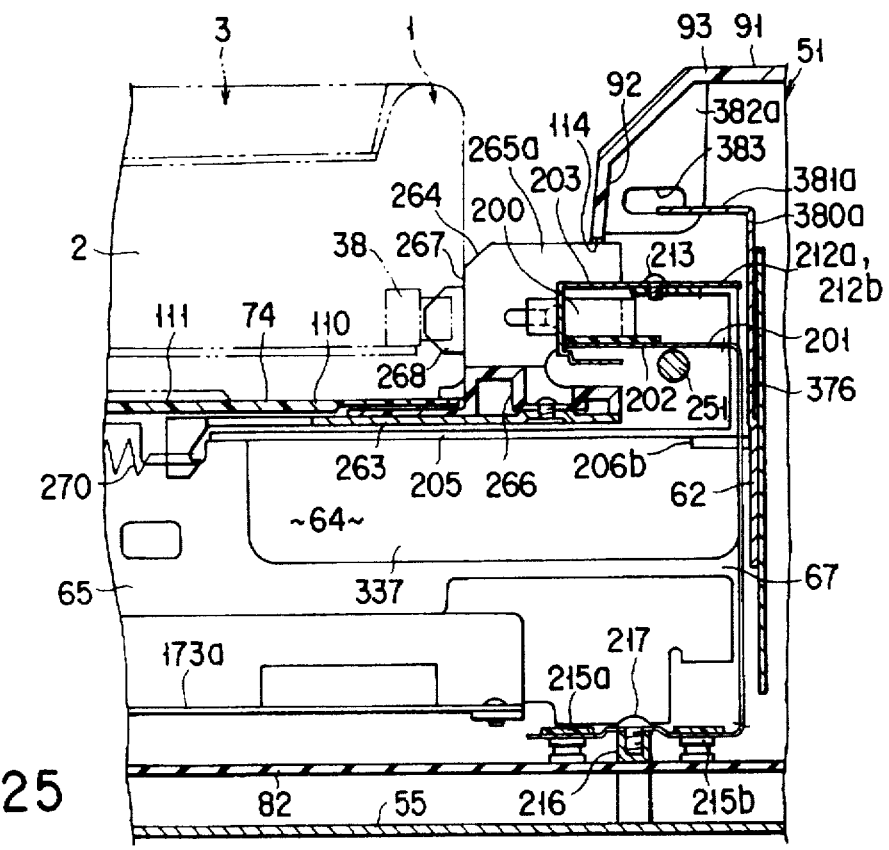
FIG. 25 is a cross-sectional view of the extension station, showing an attachment portion for a second extension connector.

The extension station 51, as shown in FIG. 5, includes a second extension connector 200. The second extension connector 200 is detachably coupled to the first extension connector 38 of computer 1. The second extension connector 200 is located at a substantially middle portion of the terminal end portion of mount surface 111. As is shown in FIG. 25, the second extension connector 200 is connected to a flexible wiring board 201. A connection portion between the wiring board 201 and second extension connector 200 is reinforced by a reinforcement plate 202. A metallic connector holder 203 is screwed down to the reinforcement plate 202. The connector holder 203 surrounds the connection portion between the wiring board 201 and second extension connector 200.

As is shown in FIGS. 8 and 25, the connector holder 203 is supported on a metallic bracket 205. The bracket 205 has a flat plate shape and extends between the first section 66 and second section 67 of device storage chamber 64. The bracket 205 is supported by the first partition plate 62, second partition plate 65 and side panel 56a of frame 53. Most part of the bracket 205 is located between the adapter 117 and first partition plate 62.

Specifically, as shown in FIG. 9, the first partition plate 62 has a pair of tongue portions 206a and 206b which are projected toward the device storage chamber 64. The tongue portions 206a and 206b are spaced apart in the width direction of device storage chamber 64. The second partition plate 65 and side panel 56a have tongue portions 207 and 208, respectively. The tongue portion 207 of second partition plate 65 is located in front of the first partition plate 62. The tongue portion 208 of side panel 56a project toward the device storage chamber 64. The tongue portions 206a, 206b, 207 and 208 are located in the same plane. The bracket 205 is fixed on the upper surfaces of tongue portions 206a, 206b, 207 and 208 by means of screws 209. Thus, the bracket 205 is disposed in parallel to the mount surface 111 of upper cover 74 below the upper cover 74.

As is clear from FIGS. 9 and 25, the bracket 205 has a pair of support stays 212a and 212b. The support stays 212a and 212b are spaced apart in the width direction of mount surface 111 immediately before the first partition plate 62. The support stays 212a and 212b extend upward from the bracket 205. The connector holder 203 is supported on upper end portions of support stays 212a and 212b by means of screws 213. The connector holder 203 and second extension connector 200 are exposed to the mount portion 110 through the notch 114 in the front wall 92 of top cover 91.

As is shown in FIG. 25, the wiring board 201 continuous with the second extension connector 200 is guided downward along the first partition plate 62. A distal end portion of the wiring board 201 is connected to the circuit board 82 by means of a pair of stacking connectors 215a and 215b. The distal end portion of the wiring board 201 is fixed to a boss portion 216 on the upper surface of circuit board 82 by means of a screw 217.

As is shown in FIGS. 15 and 16, a pair of latches 221 (only one shown) are supported on the upper cover 74. When the computer 1 placed on the mount surface 111 is slid toward the second extension connector 200 along the guide rails 112a and 112b, the latches 221 are disengageably hooked in the engagement holes 35a and 35b in the lower housing 4. The latches 221 are situated adjacent to the guide rails 112a and 112b at the front end portion of mount surface 111.

Each latch 221 has a latch body 222 and a claw portion 223 continuous with the latch body 222. The latch body 222 is rotatably supported on a bracket 226 by means of a pin 225. The bracket 226, as shown in FIG. 27, is fixed to the bottom surface of the upper cover 74 by means of screws 227. The bracket 226 covers the associated latch 221 from bottom side, and the claw portion 223 of latch 221 faces the upper cover 74. The upper cover 74 has slits 228 for insertion of claw portions 223 at positions facing the claw portions 223. The slits 228 open to the mount surface 111, as shown in FIG. 5. Each latch 221 is supported on the upper cover 74 so as to be rotatable between an engaged position where the claw portion 223 projects through the slit 228 above the mount surface 111, and a disengaged position where the claw portion 223 retreats in the slit 228. The latches 221 are normally held in the disengaged position by means of return springs 229.

As is shown in FIG. 5, a pair of detection levers 233a and 233b are supported on the upper cover 74. The detection levers 233a and 233b detect the position of the computer 1 slid over the mount surface 111. The detection levers 233a and 233b are situated on the guide rails 112a and 112b at the terminal end portion of mount surface 111. Thus, the detection levers 233a and 233b and the associated latches 211 are spaced apart in the longitudinal direction of guide rails 112a and 112b.

Since the detection levers 233a and 233b have the same structure, one of them will now be described representatively. As is shown in FIGS. 15 and 16, the detection lever 233a has a lever body 234 and an engaging portion 235 continuous with the lever body 234. The lever body 234 is located below the upper cover 74. As is shown in FIG. 27, the upper cover 74 has a pair of downwardly extending support walls 236a and 236b. The lever body 234 is rotatably supported between the support walls 236a and 236b by means of a pin 237.

As is shown in FIG. 16, an opening portion 238 is formed in a terminal end portion of the guide rail 112a, 112b. The opening portion 238 has such a size as to permit passage of the engaging portion 235 of detection lever 233a. The opening portion 238 is open to the mount portion 110. Thus, the detection levers 233a and 233b are supported on the upper cover 74 so as to be rotatable between a first position where the detection levers 233a and 233b project above the mount portion 110 through the opening portions 238, and a second position where the detection levers 233a and 233b retreat in the opening portions 238. The detection levers 233a and 233b are normally held in the first position by means of return springs 240.

As is shown in FIGS. 15, 16 and 27, the latches 221 are coupled to the detection levers 233a and 233b by means of rods 243. The rods 243 are formed of metallic wire material. The rods 243 are situated along the guide rails 112a and 112b below the upper cover 74. Each rod 243 has a first end provided with a first hook portion 244a and a second end provided with a second hook portion 244b. The first hook portion 244a is hooked on the latch body 222 of latch 221. The second hook portion 244b is hooked on the lever body 234 of detection lever 233a, 233b. The rod 243 has a resilient portion 245 wound in a coil shape. The resilient portion 245 is located between the hook portions 244a and 244b. The resilient portion 245 is extendible in the axial direction of rod 243.

The computer 1 is placed on the mount surface 111, with the first extension connector 38 directed toward the second extension connector 200, as shown in FIGS. 4 and 5. If the computer 1 placed on the mount surface 111 is slid toward the second extension connector 200, the rear end portion of lower housing 4 comes into contact with the engaging portions 235 of detection levers 233a and 233b, as shown in FIG. 15. Thereby, the detection levers 233a and 233b are rotated from the first position toward the second position, and their engaging portions 235 are pushed into the opening portions 238.

When the detection levers 233a and 233b are rotated toward the second position, as shown in FIG. 16, the rods 243 are pulled towards the detection levers 233a and 233b. The rods 243 pull the latch bodies 222 of latches 221 rearward, and the latch bodies 222 are rotated upward on the pins 225. Accordingly, the latches 221 are rotated from the disengaged position to the engaged position, and the claw portions 223 are about to project from the slit 238.

In this case, when the detection levers 233a and 233b have just began to rotate toward the second position, the location of first extension connector 38 has not yet reached the location of the second extension connector 200. Accordingly, the locations of engagement holes 35a and 35b formed in the front end portion of lower housing 4 have not reached the locations of slits 228. As a result, the claw portions 223 of latches 221 abut against the bottom wall 4a of lower housing 4 and are prevented from rotating toward the engaged position.

If the rotation of each latch 221 is prevented, the resilient portion 245, which is provided at the intermediate portion of each rod 243 for transmitting movement of the associated detection lever 233a, 233b to the associated latch 221, begins to extend. Thus, even if the rotation of each latch 221 abuts on the bottom wall 4a and is prevented from rotating, the detection levers 233a and 233b can rotate from the first position to the second position, and the sliding movement of computer 1 is not prevented.

When the first extension connector 38 has reached a position immediately before the second extension connector 200 in accordance with the sliding movement of computer 1, the engagement holes 35a and 35b of lower housing 4 face the slits 228 and the claw portions 223 of latches 221 are disengaged from the bottom wall 4a. Accordingly, the latches 221 are quickly turned to the engaged position by the pulling force of rods 243 and the claw portions 223 of latches 221 enter the engagement holes 35a and 35b.

If the computer 1 is slid to the terminal end portion of mount surface 111 and the first extension connector 38 is connected to the second extension connector 200, the claw portions 223 are hooked on the opening edges of engagement holes 35a and 35b, as shown in FIG. 16. As a result, the front end portion of the computer 1 is locked on the mount surface 111.

As is shown in FIG. 16, the extension station 51 has lock means 250 for locking the rear end portion of computer 1 on the mount surface 111. The lock means 250 comprises a support shaft 251 and a pair of lock levers 252a and 252b fixed to the support shaft 251. The lock means 250 is supported on the bracket 205, as is clear from FIG. 9. The bracket 205 has a pair of support walls 253a and 253b. The support walls 253a and 253b are spaced apart in the width direction of station body 52. The support shaft 251 is rotatably supported on the support walls 253a and 253b. The support shaft 251, as shown in FIG. 13, is disposed horizontally in the width direction of station body 52 between the first partition plate 62 and the front wall 92 of top cover 91. The lock levers 252a and 252b are spaced apart in the axial direction of support shaft 251. The lock levers 252a and 252b are located between the first partition plate 62 and the front wall 92 of top cover 91, immediately in rear of the terminal ends of the guide rails 112a and 112b.

Each of the lock levers 252a and 252b comprises a first arm portion 255 and a second arm portion 256. The first arm portion 255 extends forward of the first partition plate 62, and the second arm portion 256 extends downward of the support shaft 251 along the first partition plate 62. An upwardly extending lock pin 257 is formed at a front end portion of the first arm portion 255. The lock pin 257 is tapered.

As is shown in FIGS. 15 and 16, a front half portion of each first arm portion 255 including lock pin 257 is located below the terminal end portion of the associated guide rail 112a, 112b. Pin guide holes 259a and 259b are formed in terminal end portions of guide rails 112a and 112b. The pin guide holes 259a and 259b face the lock pins 257. The lock levers 252a and 252b are supported on the bracket 205 so as to be rotatable between a locked position where the lock pins 257 project out of the pin guide holes 259a and 259b and an unlocked position where the lock pins 257 retreat in the pin guide holes 259a and 259b. The pin guide holes 259a and 259b are located immediately behind the detection levers 233a and 233b. When the computer 1 is slid to the terminal end portion of the mount surface 111, the pin guide holes 259a and 259b face the lock holes 36a and 36b in the lower housing 4.

As is shown in FIGS. 8 and 9, a slider 263 formed of a metallic plate is disposed on the upper surface of bracket 205. A release member 264 of a synthetic resin is screwed down on the upper surface of slider 263. The release member 264 is used to push the computer 1 placed on the mount surface 111 in a direction away from the second extension connector 200. The release member 264 has a pair of side wall portions 265a and 265b and a bottom wall portion 266 extending between the side wall portions 265a and 265b. The side wall portions 265a and 265b face each other, with the second extension connector 200 interposed therebetween. The bottom wall portion 266 is located below the second extension connector 200. The release member 264 is disposed inside the notch 114 of top cover 91.

The side wall portions 265a and 265b and bottom wall portion 266 of release member 264 have front surfaces which are continuous with each other. These front surfaces constitute a push face 267 standing upright at the terminal end portion of mount surface 111. The push face 267 is located so as to surround the second extension connector 200. The push face 267 face the rear wall 4d of lower housing 4 and the rear wall 9a of top cover 9 when the computer 1 is placed on the mount surface 111.

As is shown in FIG. 8, a push lever 268 is disposed on the push face 267 of the left-hand side wall portion 265a. The push lever 268 opens and closes the connector cover 39 of computer 1. The push lever 268 projects from the push face 267 toward the mount portion 110. When the computer 1 placed on the mount surface 111 is slid towards the second extension connector 200, the push lever 268 is inserted into the lever insertion port 40 in the connector cover 39. If the push lever 268 is inserted into the lever insertion port 40, the first and second covers 39a and 39b of connector cover 39 are forcibly rotated from the closed position to the open position, thereby exposing the first extension connector 38.

Figure 26:
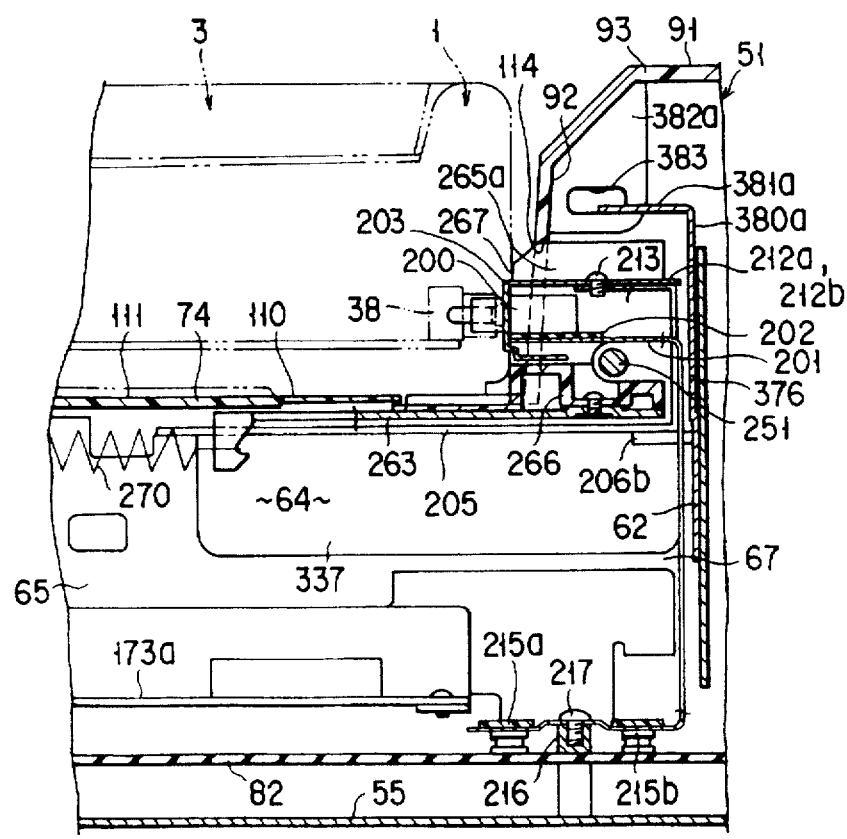
FIG. 26 is a cross-sectional view showing the state in which the second extension connector is connected to the first extension connector.

The slider 263 supporting the release member 264 is supported on the upper surface of bracket 205 so as to be slidable in the depth direction of mount surface 111. Thus, the release member 264 is slidable between a first slide position where the release member 264 is pushed into the notch portion 114 of top cover 91 by computer 1, and a second slide position where the release member 264 is pushed out of the notch portion 114 toward the mount portion 110. When the release member 264 is slid to the first slide position, as shown in FIG. 26, the push face 267 retreats from the second extension connector 200. When the release member 264 is slid to the second position, as shown in FIGS. 5 and 25, the push face 267 projects forward from the second extension connector 200.

As is shown in FIG. 8, an extension coil spring 270 is provided between a front end portion of slider 263 and a front end portion of the second partition plate 65. The extension coil spring 270 pulls the slider 263 toward the front side of mount surface 111. Thus, the release member 264 is normally maintained in the second slide position.

As is shown in FIGS. 29 to 31A, a drive mechanism 280 is disposed on the lower surface of bracket 205. The drive mechanism 280 rotates the lock levers 252a and 252b between the locked position and unlocked position and slides the release member 264 from the first slide position toward the second slide position. The drive mechanism 280 comprises a cam gear 281, a motor 282 for rotating the cam gear 281, a first interlock mechanism 283 driven by the cam gear 281 to rotate the lock levers 252a and 252b between the locked position and unlocked position, and a second interlock mechanism 284 driven by the cam gear 281 to slide the release member 264 from the first slide position toward the second slide position.

Figure 30:
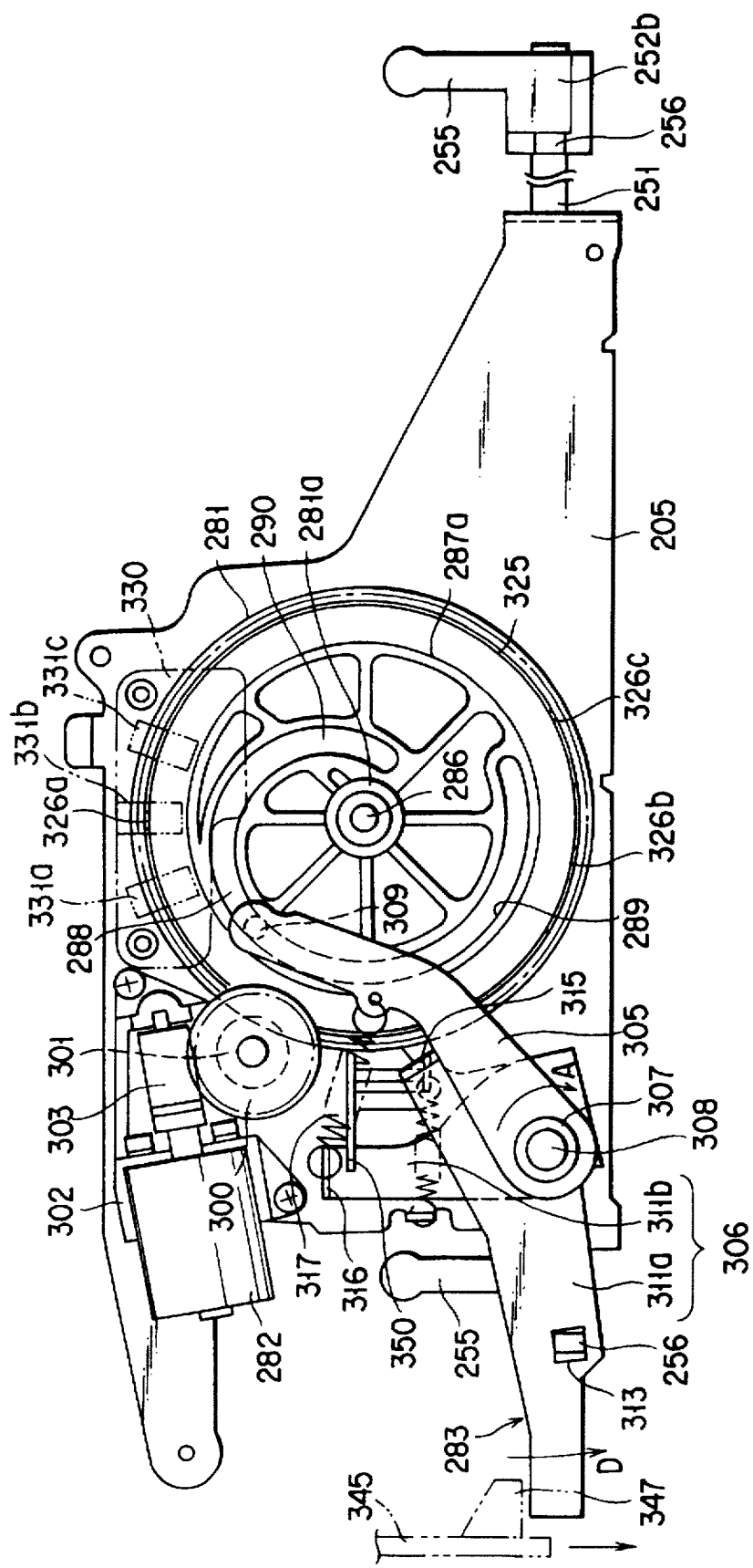
FIG. 30 is a plan view of the drive mechanism for driving the lock lever.

The cam gear 281 includes a hollow cylindrical boss portion 281a at a central portion thereof. The boss portion 281a is rotatably supported on the lower surface of bracket 205 by means of a support shaft 286. The cam gear 281 has a lower surface 287a or a first end surface, and an upper surface 287b or a second end surface. As is shown in FIG. 30, a cam groove 288 is formed in the lower surface 287a of cam gear 281. The cam groove 288 comprises a first groove portion 289 arcuated around the support shaft 286, and a second groove portion 290 arcuately extending from one end of the first groove portion 289 toward the center of rotation of the cam gear 281.

As is shown in FIGS. 31A and 33, a recess portion 292 is formed in the upper surface 287b of cam gear 281. The recess portion 292 is arcuated around the support shaft 286. The recess portion 292 has a cam surface 293 continuous with the outer peripheral surface of the boss portion 281a. The cam surface 293 comprises a first portion 294 arcuated around the support shaft 286, and a second portion 295 arcuately projecting radially outward of the boss portion 281a from one end of the first portion 294.

As is shown in FIG. 30, a worm gear 300 and a deceleration gear 301 are rotatably supported on the lower surface of bracket 205. These gears 300 and 301 are coaxially formed as one body. The deceleration gear 301 is meshed with the cam gear 281.

A forwardly and reversely movable stepping motor is used as motor 282. The motor 282 is screwed down on the lower surface of the bracket 205 with use of a motor bracket 302. A worm 303 is supported on the motor bracket 302. The worm 303 is driven by the motor 282. The worm 303 is meshed with the worm gear 300. If the motor 282 is driven, the rotation of worm 303 is transmitted to the cam gear 281 via the worm gear 300 and deceleration gear 301. Thus, the cam gear 281 is rotated over a predetermined range of angles.

Figure 29:
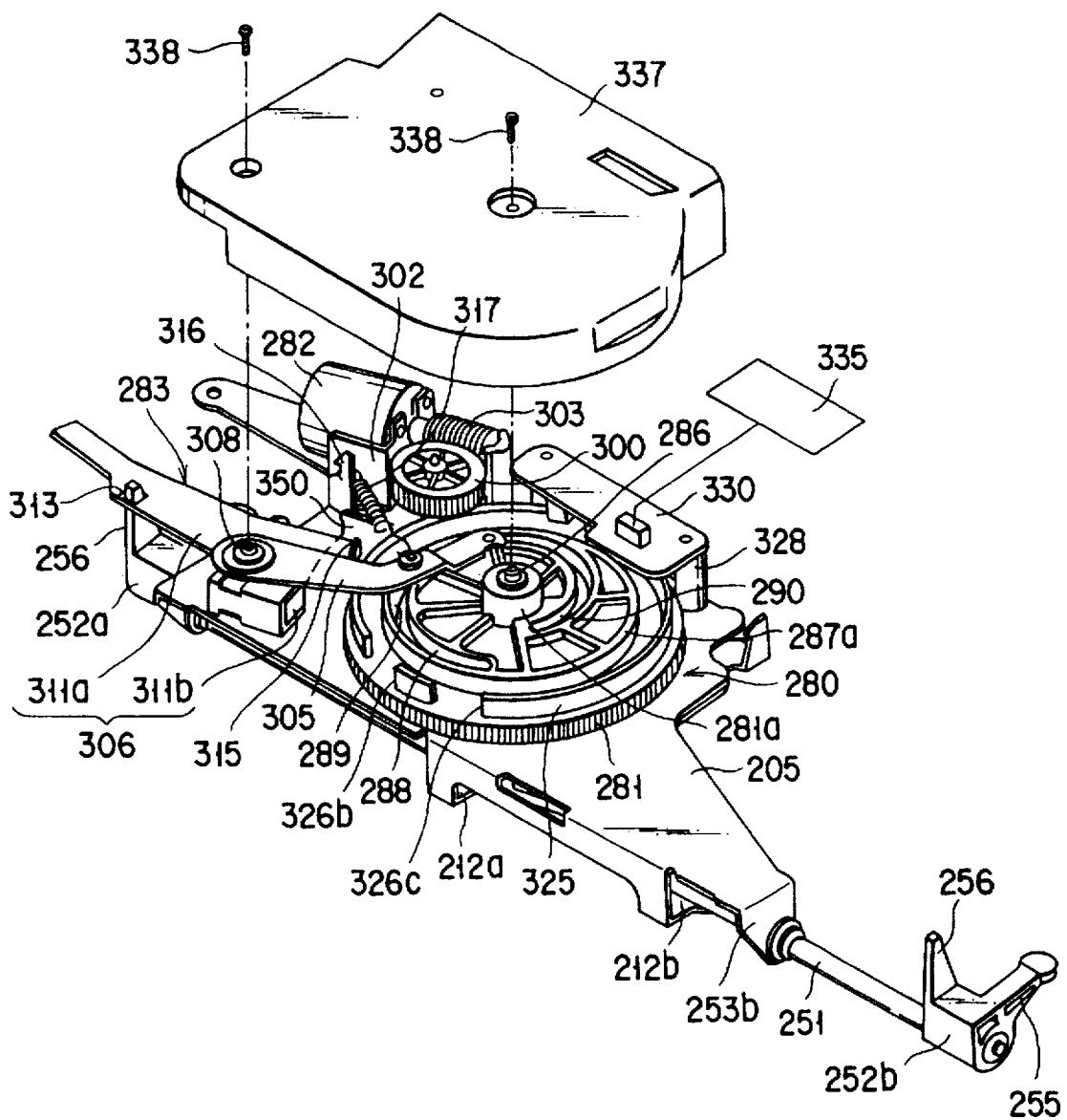
FIG. 29 is a perspective view of a drive mechanism for driving the lock lever.

As is shown in FIGS. 29 and 30, the first interlock mechanism 283 includes a first rotational lever 305 and a second rotational lever 306. The first rotational lever 305 is provided with a first end portion having a hollow cylindrical boss portion 307, and a second end portion having a columnar guide pin 309. The boss portion 307 is rotatably supported on the lower surface of bracket 205 by means of a support shaft 308. The support shaft 308 acts as center of rotation of the first rotational lever 305. The guide pin 309 is slidably engaged in the cam groove 288 of cam gear 281. Accordingly, if the cam gear 281 is rotated, the first rotational lever 305 is rotated in accordance with the shape of cam groove 288.

As is shown in FIGS. 29 to 31A, the second rotational lever 306 comprises a first lever portion 311a and a second lever portion 311b. The first lever portion 311a and second lever portion 311b have first end portions coupled to each other. The first end portions of the first and second lever portions 311a and 311b are spaced apart horizontally and situated in parallel to each other. The second rotational lever 306 is supported on the bracket 205, with the first end portions of first and second lever portions 311a and 311b engaged rotatably with the outer peripheral surface of the boss portion 307. Thus, the first end portion of first lever portion 311a is slidably superposed on the upper surface of the first rotational lever 305, and the second lever portion 311b is slidably superposed on the lower surface of bracket 205.

As is shown in FIGS. 29 and 30, the first lever portion 311a of second rotational lever 306 extends from the boss portion 307 of first rotational lever 305 in a direction away from the cam gear 281. A distal end portion of the first lever portion 311a is projected to the left side of bracket 205 and located below the left-hand lock lever 252a. An engagement hole 313 is opened at the distal end portion of first lever portion 311a. The engagement hole 313 is located below the lock lever 252a, and the lower end portion of the second arm portion 256 of lock lever 252a is engaged in the engagement hole 313. As is shown in FIG. 31A, a downwardly bent engaging portion 315 is formed on the first end portion of first lever portion 311a. The engaging portion 315 is engaged with a side edge portion of the first rotational lever 305.

The second lever portion 311b, as shown in FIG. 30, extends in a direction substantially perpendicular to the first lever portion 311a. A downwardly bent spring receiving portion 316 is formed at a distal end portion of the second lever portion 311b. A tension coil spring 317 is provided between the spring receiving portion 316 and an intermediate portion of the first rotational lever 305. The coil spring 317 urges the first rotational lever 305 and second rotational lever 306 so as to rotate in opposite directions with the support shaft 308 as center of rotation. Thereby, the engaging portion 315 of first lever portion 311a is engaged with the side edge portion of first rotational lever 305. Accordingly, if the first rotational lever 305 is rotated by the rotation of the cam gear 281, the second rotational lever 306 is then rotated by the first rotational lever 305.

Figure 32:
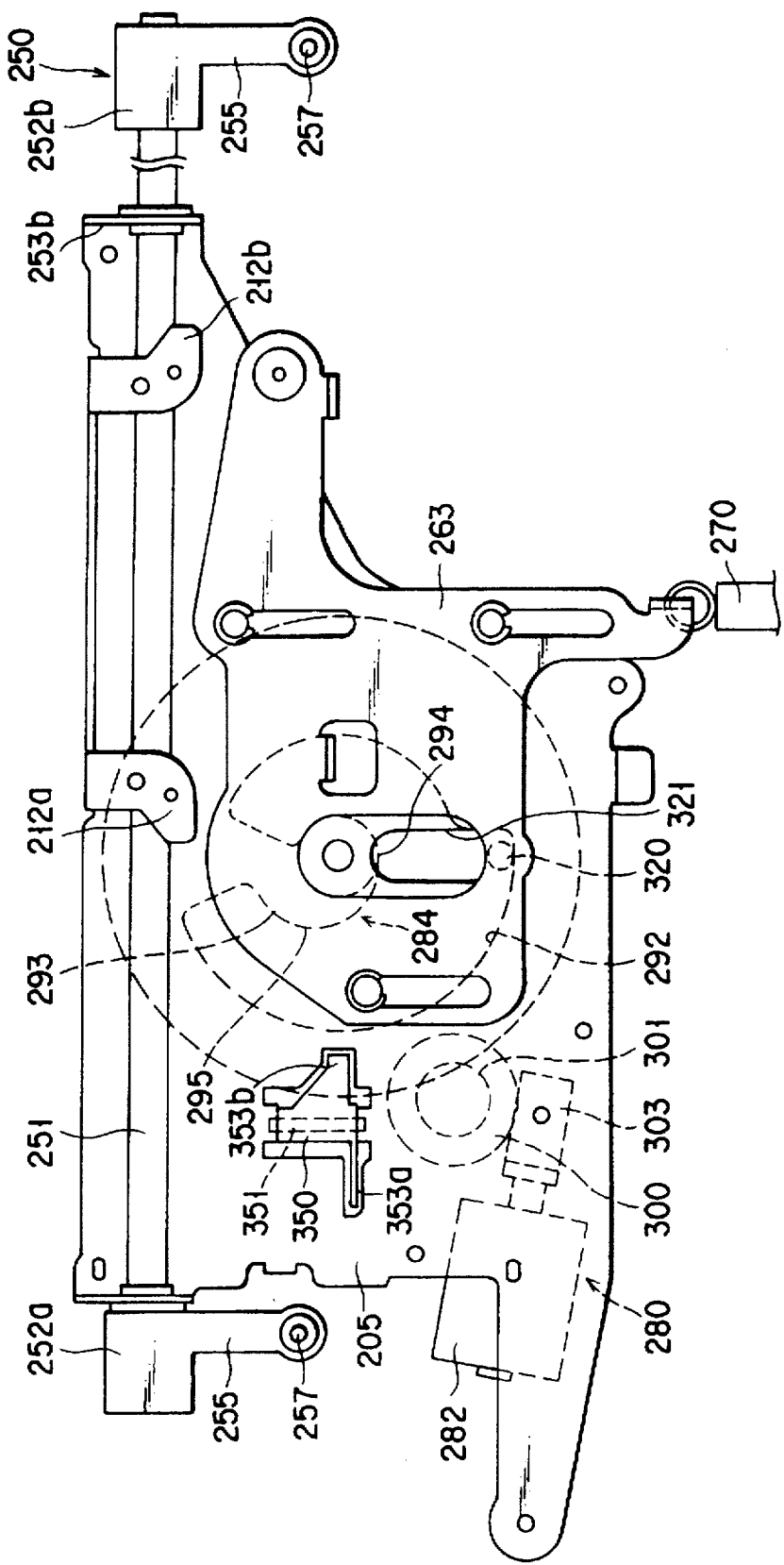
FIG. 32 is a plan view of the drive mechanism, showing the positional relationship between a slider and a cam gear.

As is shown in FIGS. 32 and 33, the second interlock mechanism 284 has a columnar guide pin 320 and a through-hole 321 formed in the bracket 205. The guide pin 320 is attached to the lower surface of slider 263. The guide pin 320 penetrates the through-hole 321 and is guided into the recess portion 292 of cam gear 281. The peripheral surface of the guide pin 320 faces the cam surface 293. The through-hole 321 is elongated in the direction of sliding of slider 263.

When the release member 264 is pushed in the first slide position by the computer 1, the guide pin 320 is put in slidable contact with the cam surface 293. If the cam gear 281 is rotated, the slider 263 is slid in accordance with the shape of cam surface 293.

The cam gear 281 is rotated among a neutral position shown in FIG. 30, a first operation position where the cam gear 281 is rotated from the neutral position by 150° counterclockwise, and a second operation position where the cam gear 281 is rotated from the neutral position by 150° clockwise. When the cam gear 281 is in the neutral position, the guide pin 309 of first rotational lever 305 is located in the first groove portion 289 of cam groove 288. At this time, the lock levers 252a and 252b of lock mechanism 250 are set in the unlocked position, as shown in FIG. 15.

If the cam gear 281 is rotated to the first operation position from the neutral position, the guide pin 309 is shifted from the first groove portion 289 to the second groove portion 290. Since the second groove portion 290 is curved toward the center of rotation of cam gear 281, the guide pin 309 is moved toward the center of rotation of cam gear 281. Thus, the first rotational lever 305 is rotated clockwise on the support shaft 308, as indicated by arrow A in FIG. 30, and the second rotational lever 306 is rotated in the same direction in accordance with the rotation of the first rotational lever 305.

Consequently, the first lever portion 311a of second rotational lever 306 advances forwardly with the support shaft 308 as center of rotation, as indicated by an arrow in FIG. 15. Accordingly, the second arm portion 256 of lock lever 252a engaged with the first lever portion 311a is pulled forward, and the first arm portion 255 is rotated upward. Thus, the lock lever 252a is rotated from the unlocked position toward the locked position, and the lock pin 257 projects above the mount surface 111 through the pin guide hole 259a. The movement of the lock lever 252a is transmitted to the other lock lever 252b by means of the support shaft 251. As a result, the lock lever 252b is also rotated from the unlocked position toward the locked position.

As is shown in FIG. 33, if the cam gear 281 is rotated from the neutral position toward the first operation position while the guide pin 320 of slider 263 is in contact with the cam surface 293, the cam surface 293 is rotated in the direction of arrow B in FIG. 33 and the guide pin 320 is put in slidable contact with the first portion 294 of cam surface 293. Since the first portion 294 of cam surface 293 is arcuated coaxially with the center of rotation of cam gear 281, the guide pin 320 remains in the same position without moving in the radial direction of cam gear 281. Thus, the release member 264 is held in the first slide position.

As is shown in FIG. 30, if the cam gear 281 is rotated from the neutral position toward the second operation position, the guide pin 309 moves along the first groove portion 289 of cam groove 288. Since the first groove portion 289 is arcuated coaxially with the center of rotation of cam gear 281, the guide pin 309 remains in the same position without moving in the radial direction of cam gear 281. Thus, neither first rotational lever 305 nor second rotational levers 306 rotates, and the lock levers 252a and 252b are held in the unlocked position.

On the other hand, the cam surface 293 located on the side opposite to the cam groove 288 is rotated in the direction of arrow C in FIG. 33. Thus, the second portion 295 of cam surface 293 begins to slide on the guide pin 320 of slider 263. Since the second portion 295 of cam surface 293 is projected radially outward of boss portion 281a to a greater degree than the first portion 294, the guide pin 320 is pushed toward the front side of bracket 205. As a result, the slider 263 is slid toward the front side of bracket 205 and the release member 264 is slid from the first slide position toward the second slide position.

As is shown in FIGS. 29 to 31A, a light shield wall 325 is formed on an outer peripheral portion of the lower surface 287a of cam gear 281. The light shield wall 325 extends in the circumferential direction of cam gear 281. First to third slits 326a to 326c are formed in the light shield wall 325. The width of the first slit 326a is very small, while the second and third slits 326b and 326c are much wider than the first slit 326a. The second slit 326b and third slit 326c are adjacent to each other in the circumferential direction of light shield wall 325. The first slit 326a is opposed to the second and third slits 326b and 326c in the diametrical direction of cam gear 281.

As is shown in FIG. 29, a sensor board 330 is supported on the lower surface of bracket 205, with a spacer 328 interposed therebetween. On the lower side of cam gear 281, the sensor board 330 faces the outer peripheral portion of cam gear 281. As is shown in FIGS. 30 and 31A, first to third photosensors 331a to 331c are supported on the upper surface of the sensor board 330. The first to third photosensors 331a to 331c detect the rotational position of the cam gear 281. The first to third photosensors 331a to 331c are arranged at intervals in the circumferential direction of cam gear 281. As is shown in FIG. 31C, each of the photosensors 331a to 331c is constituted by a photo-interrupter comprising a light emit portion 332 and a light receive portion 333. The light shield wall 325 is located between the light emit portion 332 and light receive portion 333. The sensor board 330 supporting the first to third photosensors 331a to 331c is connected to the circuit board 82 by means of a cable (not shown).

The light receive portion 333 detects light from the associated light emit portion 332 when the slit 326a, 326b, 326c is located between the light receive portion 333 and light emit portion 332, whereby the photosensor 331a, 331b, 331c detects the rotational position of cam gear 281. Specifically, when the cam gear 281 is rotated to the neutral position, as shown in FIG. 30, the first slit 326a is located between the light emit portion 332 and light receive portion 333 of the second photosensor 331b. At this time, the light shield wall 325 is interposed between the light emit portions 332 and light receive portions 333 of the first and third photosensors 331a and 331c. Accordingly, a signal is output from the second photosensor 331b and delivered to a controller 335 (shown in FIG. 29) on the circuit board 82 via the sensor board 330.

When the cam gear 281 is rotated to the first operation position, the third slit 326c, which is relatively wide, is located between the light emit portions 332 and light receive portions 333 of the second and third photosensors 331b and 331c. At this time, the light shield wall 325 is interposed between the light emit portion 332 and light receive portion 333 of the first photosensor 331a. Accordingly, signals are output from the second and third photosensors 331b and 331c and delivered to the controller 335 via the sensor board 330.

When the cam gear 281 is rotated to the second operation position, the second slit 326b, which is relatively wide, is located between the light emit portions 332 and light receive portions 333 of the first and second photosensors 331a and 331b. At this time, the light shield wall 325 is interposed between the light emit portion 332 and light receive portion 333 of the third photosensor 331c. Accordingly, signals are output from the first and second photosensors 331a and 331b and delivered to the controller 335 via the sensor board 330.

As a result, the controller 335 determines the rotational position of cam gear 281 on the basis of the output signal(s) from the first to third photosensors 331a to 331c.

As is shown in FIG. 29, a cover 337 is attached to the lower surface of bracket 205 by means of screws 338. The cover 337 covers the drive mechanism 280, sensor board 330 and first to third photosensors 331a to 331c. The first lever portion 311a of second rotational lever 306 is projected outward from the cover 337.

The drive mechanism 280 and the lock levers 252a and 252b and release member 264, which are all driven by the drive mechanism 280, are supported on the bracket 205. The drive mechanism 280, lock levers 252a and 252b and release member 264 are assembled as one unit, so that they can be easily built in, and removed from, the station body 52.

As is shown in FIG. 8, a distal end portion of the first lever portion 311a is situated close to the left-hand side cover 72a of station body 52. An emergency lever 345 is disposed on the side cover 72a. The emergency lever 345 is operated to detach the computer 1 from the extension station 51 in case of an emergency such as interruption of electric service. The emergency lever 345 is exposed to the left side surface of the station body 52, as shown in FIG. 12. The emergency lever 345 is supported on the side cover 72a so as to be slidable between a wait position where the emergency lever 345 faces the first lever portion 311a and an operation position where the lever 345 is pushed rearward of station body 52 from the wait position. The emergency lever 345 is normally held in the wait position by means of a return spring 346.

Figures 36A, 36B:
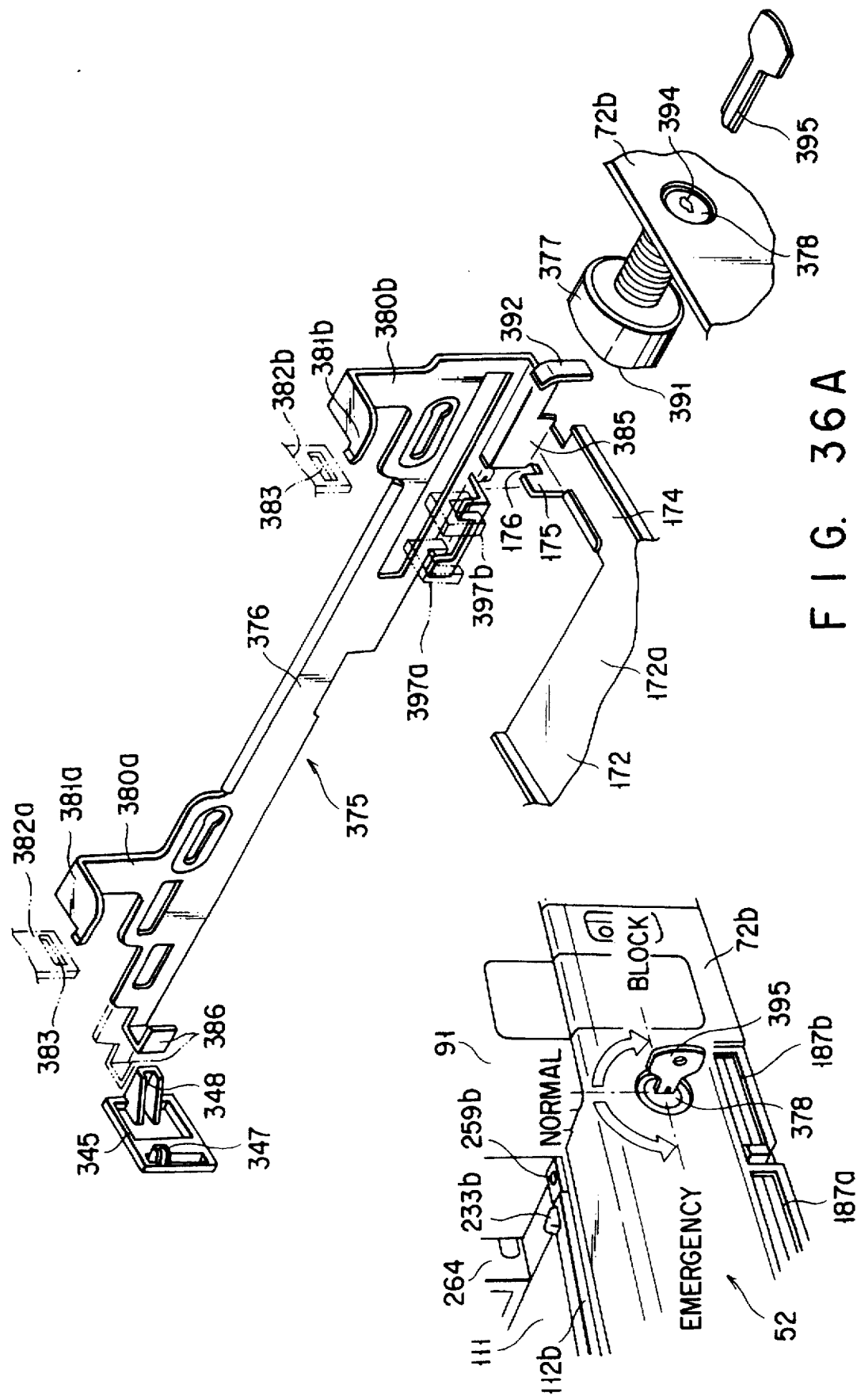
FIG. 36A is a perspective view showing the positional relationship between a lock plate and engagement holes in the top cover, an engagement groove of the tray, and a lock portion of an emergency lever.
FIG. 36B is a perspective view showing three operational positions of a key.

As is understood from FIG. 36A, the emergency lever 345 includes an engaging portion 347 and a lock portion 348. The engaging portion 347 and lock portion 348 project to the inside of the station body 52. The lock portion 348 is located immediately in front of the left-hand end portion of first partition plate 62. When the emergency lever 345 is held in the wait position, the engaging portion 347 is located just before the distal end portion of first lever portion 311a. Thus, if the emergency lever 345 is slid from the wait position to the operation position, the second rotational lever 306 is forcibly rotated against the force of the extension coil spring 317, as indicated by arrow D in FIG. 30. Then, as in the case where the cam gear 281 is rotated to the second operation position, the lock levers 252a and 252b are forcibly rotated to the unlocked position and the lock pins 257 retreat below the pin guide holes 259a and 259b. As a result, the lock pins 257 are pulled out of the lock holes 36a and 36b and the computer 1 is unlocked.

As is shown in FIGS. 34 and 35, an engaging lever 350 is supported on the bracket 205. When the second rotational lever 306 is rotated by the emergency lever 345, the engaging lever 350 holds the lock levers 252a and 252b in the unlocked position with use of the second rotational lever 306. The engaging lever 350 is rotatably supported on the bracket 205 by means of a support shaft 351.

The engaging lever 350 has a first engaging portion 353a and a second engaging portion 353b. The first and second engaging portions 353a and 353b extend in opposite directions with the support shaft 351 interposed. A distal end portion of the first engaging portion 353a is put in slidable contact with the lower surface of the second lever portion 311b of second rotational lever 306. A notch portion 354 is formed at the distal end portion of first engaging portion 353a. The notch portion 354 is engageable with an edge portion of the second lever portion 311b. A distal end portion of the second engaging portion 353b is bent downward. The distal end portion of second engaging portion 353b faces an outer peripheral portion of the upper surface 287b of cam gear 281.

An extension coil spring 355 is provided between the engaging lever 350 and bracket 205. The extension coil spring 355 rotationally urges the engaging lever 350 so that the first engaging portion 353a is pressed on the lower surface of second lever portion 311b.

If the second rotational lever 306 is rotated by the emergency lever 345, as indicated by arrow D in FIG. 30, the second lever portion 311b is rotated until it is disengaged from the first engaging portion 353a of engaging lever 350, as shown in FIG. 35. Since the engaging lever 350 is rotationally urged toward the second lever portion 311b, the notch portion 354 of first engaging portion 353a is engaged with the edge portion of second lever portion 311b, thereby preventing the second rotational lever 306 from rotating to the initial position. As a result, even if the application of pressure on the emergency lever 345 is stopped, the lock levers 252a and 252b are retained in the unlocked position.

As is shown in FIGS. 33 to 35, a pair of projections 357 are formed on the outer peripheral portion of upper surface 287b of cam gear 281. The projections 357 function to release the second rotational lever 306 which is locked by the engaging lever 350. The projections 357 are arranged in the circumferential direction of the cam gear 281. The projections 357 is so located as to face the distal end portion of second engaging portion 353b of engaging lever 350.

If the cam gear 281 is rotated and the projection 357 reaches the position of the distal end portion of second engaging portion 353b, the distal end portion of second engaging portion 353b moves over the projection 357. Then, the engaging lever 350 is rotated against the force of extension coil spring 355 and the notch portion 354 is disengaged from the edge portion of second lever portion 311b. Thereby, the second rotational lever 306 is forcibly rotated toward the first rotational lever 305 by the extension coil spring 317 and the distal end portion of first engaging portion 353a of engaging lever 350 is put in slidable contact with the lower surface of second lever portion 311b. Thus, the second rotational lever 306 is set free from the engaging lever 350.

Figure 37:
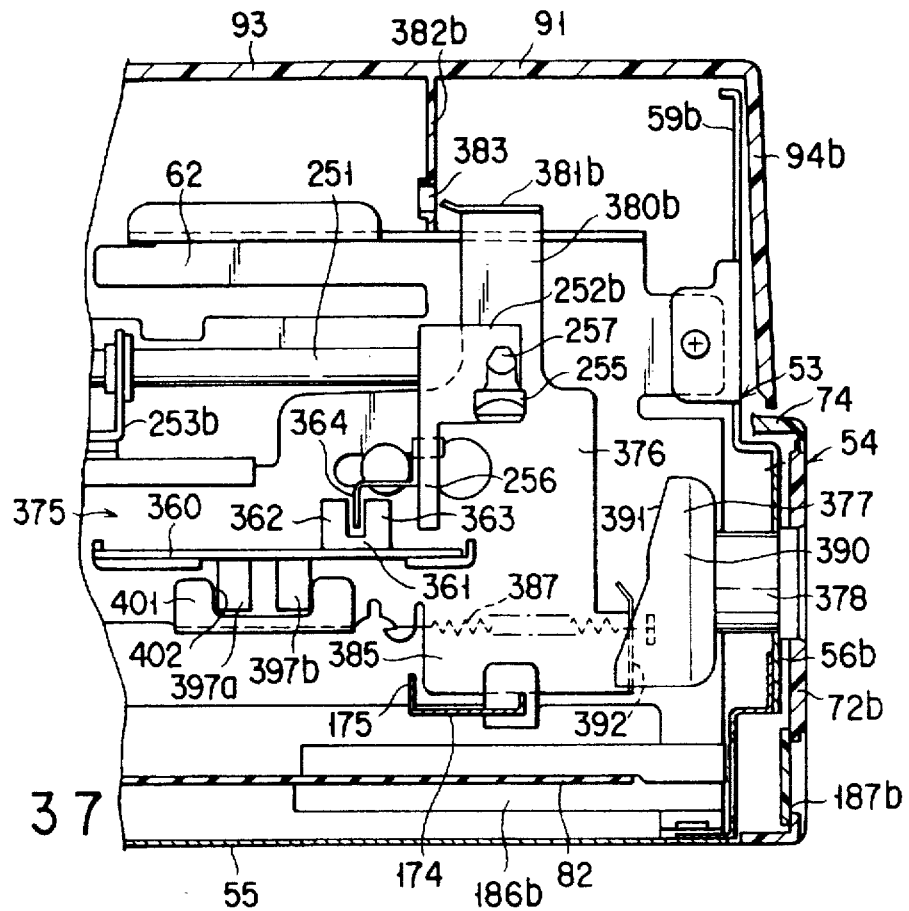
FIG. 37 is a cross-sectional view of the extension station, showing the state in which the lock plate is slid to a normal position.

As is shown in FIGS. 9, 13 and 37, a sensor board 360 is supported on the first partition plate 62. The sensor board 360 is located below the right-hand lock lever 252b at the terminal end portion of second section 67. A photosensor 361 is disposed on the upper surface of the sensor board 360. The photosensor 361 detects the rotational position of lock levers 252a and 252b. The photosensor 361 is constituted by a photo-interrupter having a light emit portion 362 and a light receive portion 363. The photosensor 361 is located adjacent to the second arm portion 256 of right-hand lock lever 252b. The photosensor 361 is connected to the controller 335 on the circuit board 82 by means of a cable (not shown) connected to the sensor board 360.

As is shown in FIGS. 13 and 37, a light shield plate 364 is supported on the second arm portion 256 of lock lever 252b. The light shield plate 364 extends toward a space between the light emit portion 362 and light receive portion 363 of photosensor 361. When the lock levers 252a and 252b are rotated to the lock position, the light shield plate 364 is interposed between the light emit portion 362 and light receive portion 363. When the lock levers 252a and 252b are rotated to the unlocked position, the light shield plate 364 moves out of the space between the light emit portion 362 and light receive portion 363. Accordingly, the photosensor 361 detects the rotational position of lock levers 252a and 252b on the basis of the position of light shield plate 364. An output signal from the photosensor 361 is delivered to the controller 335.

As is shown in FIG. 11, the station body 52 has a lock mechanism 375. The lock mechanism 375 locks and unlocks the top cover 91, tray 172 and emergency lever 345. The lock mechanism 375, as shown in FIG. 36A, comprises a metallic lock plate 376, a cam 377 associated with the lock plate 376, and a key cylinder 378 for moving the cam 377.

The lock plate 376 is supported on that surface of the first partition plate 62, which faces the device storage chamber 64. The lock plate 376 extends in the width direction of device storage chamber 64. The lock plate 376 has a pair of arm portions 380a and 380b. The arm portions 380a and 380b are spaced apart in the longitudinal direction of lock plate 376 and extend upward from the lock plate 376. As is clear from FIGS. 25 and 37, when the top cover 91 is rotated to the closed position, the arm portions 380a and 380b are located inside the top cover 91. Upper end portions of the arm portions 380a and 380b are located close to the inner surface of the upper wall 93 of top cover 91. As is shown in FIG. 36A, the arm portions 380a and 380b have first lock portions 381a and 381b at their upper end portions. The first lock portions 381a and 381b extend in parallel to the upper wall 93 of top cover 91. Distal end portions of the first lock portions 381a and 381b extend in the direction of sliding of lock plate 376.

A pair of inner walls 382a and 382b extending downward are formed on the inner surface of the upper wall 93 of top cover 91, as shown in FIG. 36A. The inner walls 382a and 382b are located in positions corresponding to the first lock portions 381a and 381b. Engagement holes 383, in which the distal end portions of first lock portions 381a and 381b are disengageably engaged, are formed in the lower parts of the inner walls 382a and 382b.

As is shown in FIG. 36A, a second lock portion 385 is formed at the lower end portion of the lock plate 376. The second lock portion 385 extends downward from the lock plate 376 and is located at the terminal end portion of the second section 67. The second lock portion 385 is removably inserted into the engagement groove 176 of tray 172. A third lock portion 386 is formed on the left-hand end portion of lock plate 376. The third lock portion 386 faces the lock portion 348 of emergency lever 345 and is disengageably engaged with the lock portion 348.

The lock plate 376 is supported on the first partition plate 62 so as to be slidable in the width direction of station body 52. The lock plate 376 has three slide positions: a normal position; a block position where the lock plate 376 is slid from the normal position to the left side of the station body 52; and an emergency position where the lock plate 376 is slid from the normal position to the right side of the station body 52. The lock plate 376 is normally urged to the normal position by means of an extension coil spring 387 shown in FIG. 37.

Figure 38:
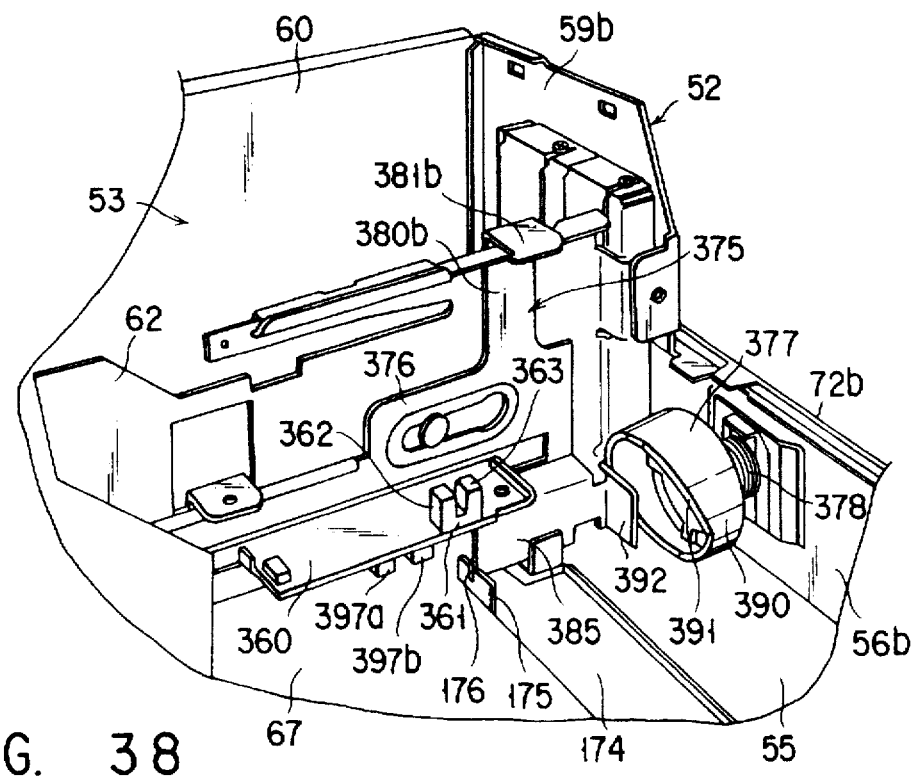
FIG. 38 is a perspective view of the extension station, showing the state in which the lock plate is slid to the normal position.

FIGS. 37 and 38 show the state in which the lock plate 376 is slid to the normal position. In the normal position, the first lock portions 381a and 381b of lock plate 376 are removed from the engagement holes 383 of top cover 91 and the second lock portion 385 is removed from the engagement groove 176 of tray 172. The third lock portion 386, as shown in FIG. 9, is put behind the lock portion 348 of emergency lever 345 and engaged with the lock portion 348. Thus, the top cover 91 and tray 172 are unlocked from the station body 52, and the emergency lever 345 is locked in the wait position.

Figure 39:
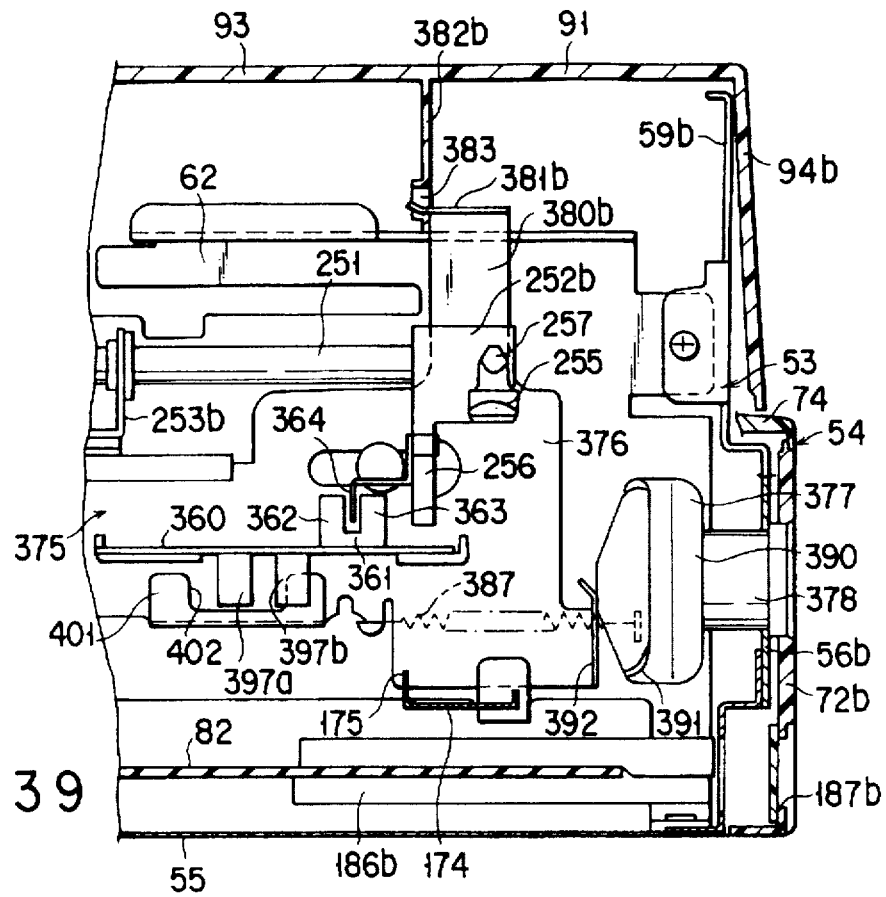
FIG. 39 is a cross-sectional view of the extension station, showing the state in which the lock plate is slid to a block position.
Figure 40:
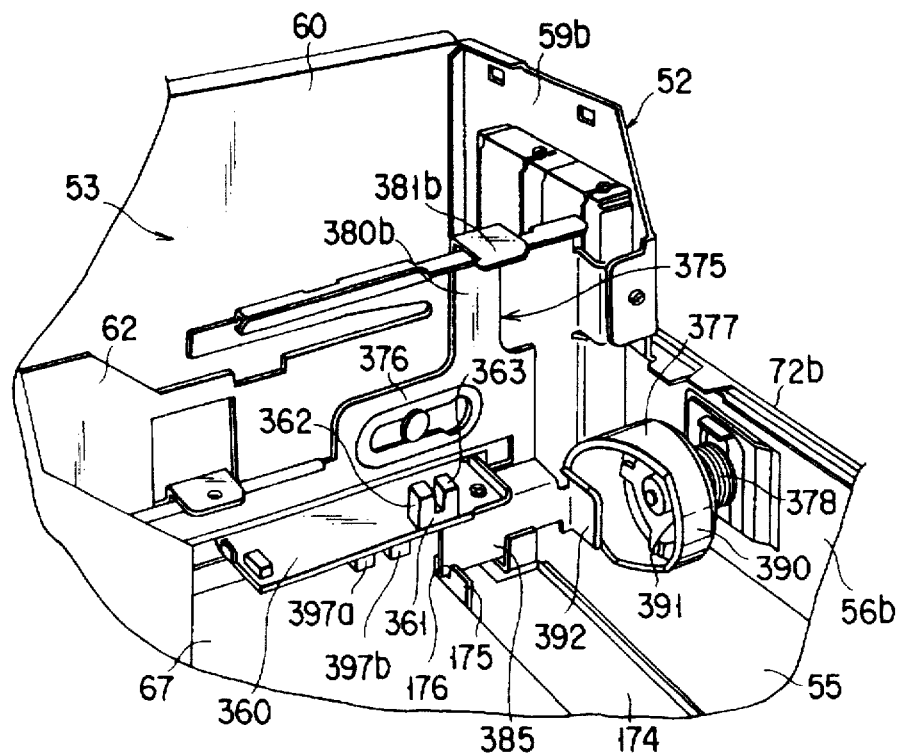
FIG. 40 is a perspective view of the extension station, showing the state in which the lock plate is slid to the block position.

FIGS. 39 and 40 show the state in which the lock plate 376 is slid to the block position. In the block position, the first lock portions 381a and 381b of lock plate 376 are inserted into the engagement holes 383 of top cover 91 and the second lock portion 385 is inserted into the engagement groove 176 of tray 172. The third lock portion 386 stays behind the lock portion 348 of emergency lever 345 and engaged with the lock portion 348. Thus, the tray 172 is irremovably locked in the station body 52, and the top cover 91 and emergency lever 345 are locked in the block position and the wait position.

Figure 41:
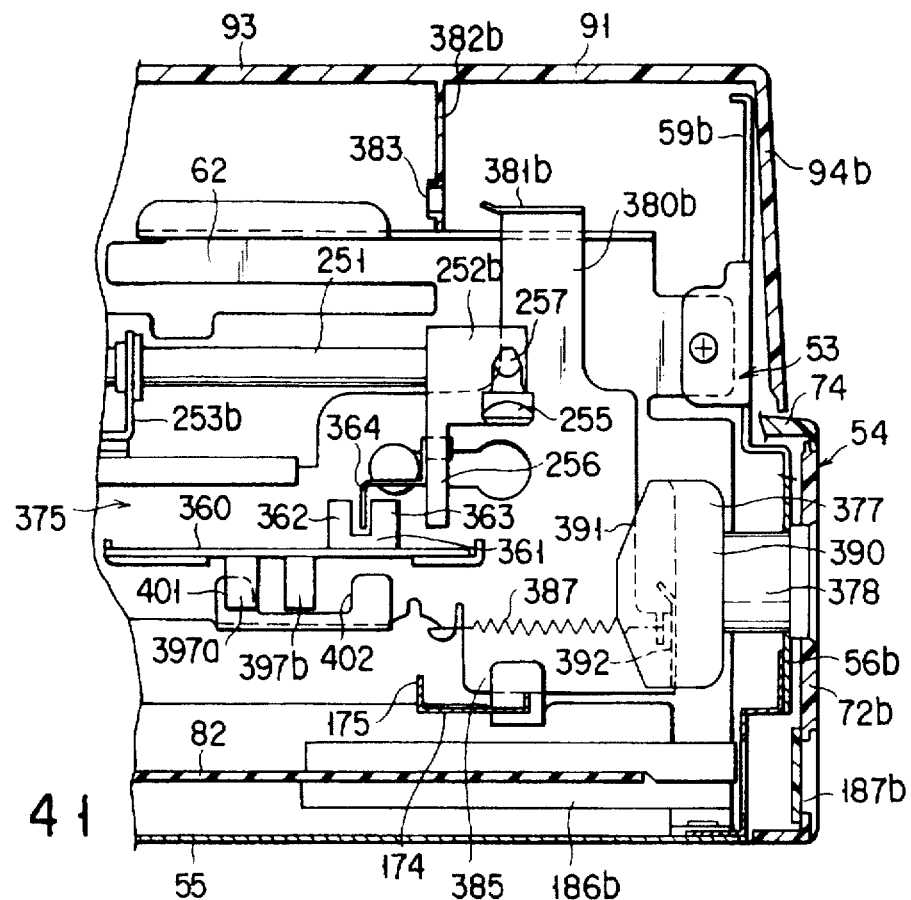
FIG. 41 is a cross-sectional view of the extension station, showing the state in which the lock plate is slid to an emergency position.
Figure 42:
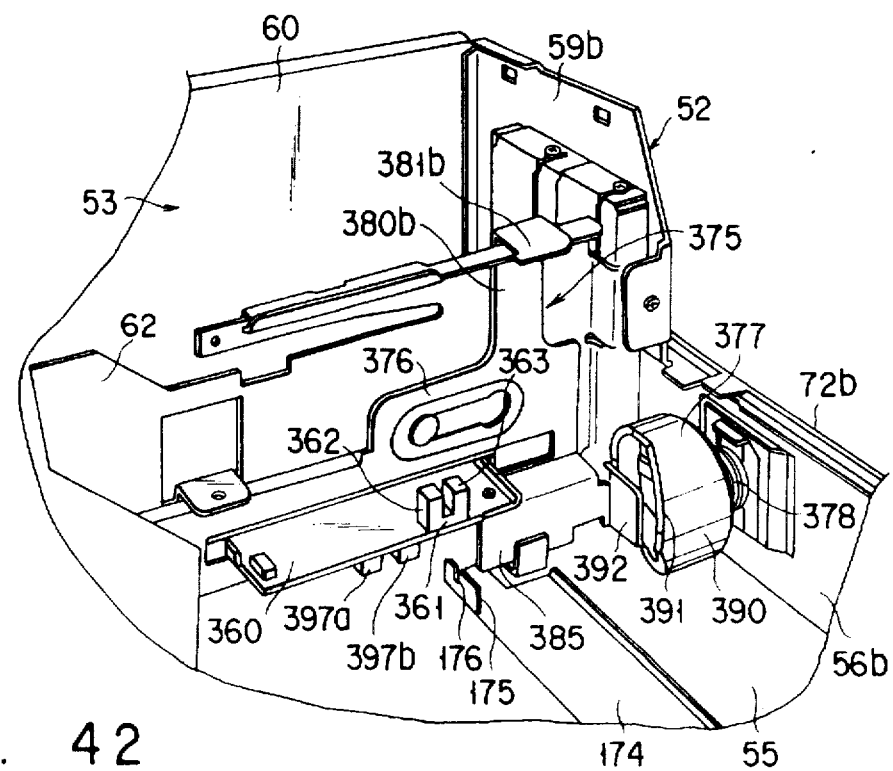
FIG. 42 is a perspective view of the extension station, showing the state in which the lock plate is slid to the emergency position.

FIGS. 41 and 42 show the state in which the lock plate 376 is slid to the emergency position. In the emergency position, the first lock portions 381a and 381b of lock plate 376 are removed from the engagement holes 383 of top cover 91 and the second lock portion 385 is removed from the engagement groove 176 of tray 172. The third lock portion 386, as shown in FIG. 36A, is disengaged from the lock portion 348 of emergency lever 345. Thus, the top cover 91, tray 172 and emergency lever 345 are unlocked from the station body 52.

As is shown in FIG. 37, the cam 377 is supported on the right-hand side panel 56b of frame 53 by means of the key cylinder 378. The cam 377 has a cylindrical cam body 390 rotatable along with the key cylinder 378. The end face of cam body 390 forms an irregular cam surface 391. The cam surface 391 faces a right-hand end portion of the lock plate 376. A cam receive portion 392 is formed at the right-hand end portion of lock plate 376. The cam receive portion 392 is urged into slidable contact with the cam surface 391 by means of the extension coil spring 387. If the cam 377 is rotated, the lock plate 376 is slid to one of the normal position, block position and emergency position in accordance with the shape of cam surface 391.

The key cylinder 378 is operated to rotate the cam 377 in a predetermined range of angles. As is shown in FIG. 36B, the key cylinder 378 has three operation positions: a normal position, a block position and an emergency position. These operation positions are associated with the three slide positions of the lock plate 376. The key cylinder 378 has a key hole 394, as shown in FIG. 36A. The key hole 394 is exposed to the right-hand side cover 72b of station body 52. A key 395 is inserted in the key hole 394 in order to rotate the key cylinder 378 to one of the three operation positions. In any of the three operation positions, the key 395 can be drawn out of the key hole 394. If the key cylinder 378 is rotated to any one of the normal position, block position and emergency position by means of the key 395, the cam 377 is rotated and the lock plate 376 is slid to one of the normal position, block position and emergency position by means of the cam 377.

First and second photosensors 397a and 397b are disposed on the lower surface of the sensor board 360, as shown in FIG. 37. The first and second photosensors 397a and 397b detect the slide position of the lock plate 376. The photosensors 397a and 397b are spaced apart in the direction of sliding of lock plate 376 in the lower side region of the lock plate 376. As is shown in FIG. 13, each of the first and second photosensors 397a and 397b is constituted by a photo-interrupter comprising a light emit portion 398 and a light receive portion 399. The photosensors 397a and 397b are connected to the controller 335 on circuit board 82 by means of a cable (not shown) connected to the sensor board 360.

A light shield portion 401 is formed at a lower part of lock plate 376, as shown in FIGS. 13 and 37. The light shield portion 401 extends in the direction of sliding of lock plate 376. A notch 402 for passing light is formed in an intermediate portion of light shield portion 401. The light shield portion 401 is interposed between the light emit portions 398 and light receive portions 399 of photosensors 397a and 397b. The positional relationship between the notch 402 of light shield portion 401 and the photosensors 397a and 397b varies in accordance with the slide position of lock plate 376.

FIG. 37 shows the positional relationship between the notch 402 and the photosensors 397a and 397b in the state in which the lock plate 376 is slid to the normal position. In the normal position, the notch 402 is located between the light emit portions 398 and light receive portions 399 of both photosensors 397a and 397b. Thus, the light receive portions 399 of photosensors 397a and 397b sense light from the light emit portions 398.

FIG. 39 shows the positional relationship between the notch 402 and the photosensors 397a and 397b in the state in which the lock plate 376 is slid to the block position. In the block position, the notch 402 is located between the light emit portion 398 and light receive portion 399 of first photosensor 397a and the light shield portion 401 is interposed between the light emit portion 398 and light receive portion 399 of second photosensor 397b. Thus, in the block position, the light receive portion 399 of first photosensor 397a alone senses light from the associated light emit portion 398.

FIG. 41 shows the positional relationship between the notch 402 and the photosensors 397a and 397b in the state in which the lock plate 376 is slid to the emergency position. In the emergency position, the notch 402 is located between the light emit portion 398 and light receive portion 399 of second photosensor 397b and the light shield portion 401 is interposed between the light emit portion 398 and light receive portion 399 of first photosensor 397a. Thus, in the emergency position, the light receive portion 399 of second photosensor 397b alone senses light from the associated light emit portion 398.

Accordingly, the first and second photosensors 397a and 397b detect the slide position of the lock plate 376 on the basis of the position of the notch 402. A signal representing the slide position of lock plate 376 is delivered to the controller 335. When the lock plate 376 is slid to one of the normal position and block position, the controller 335 outputs a signal to the power unit 116 in order to maintain the standby state. If the lock plate 376 is slid to the emergency position, the controller 335 turns off the power unit 16 and supplies to the computer 1 a signal to finish the currently run application.

As is shown in FIG. 5, the front cover 75 of extension station 51 is provided with a power switch 405, an eject switch 406 and first to third indicators 407a to 407c.

The power switch 405 turns on/off the CD-ROM drive 16 or floppy disk drive (FDD) 17 stored in the first section 66 of device storage chamber 64, and the peripheral device 171 stored in the second section 67 of device storage chamber 64.

The eject switch 406 is operated to remove the computer 1 connected to the extension station 51 from the mount portion 110. If the eject switch 406 is operated, an eject command is input to the controller 335. The controller 335 outputs a command to the computer 1 to finish the application and outputs a drive signal to drive the motor 282 of drive mechanism 280.

As FIGS. 15 and 16 show the first indicator 407a representatively, each of the first to third indicators 407a to 407c comprises a light emitting diode (LED) 409 supported on a diode board 408, and a lens 410 facing the LED 409. A distal end portion of the lens 410 is exposed to the front surface of the front cover 75. The first indicator 407a is turned on when the extension station 51 is connected to the power supply, thus indicating the standby state of the extension station 51. The second indicator 407b is turned on when the CD-ROM drive 16, FDD 17 and peripheral device 171 are operated, thus indicating the operation state of the drives 16 and 17 and peripheral device 171. The third indicator 407c indicates the connection state between the computer 1 and extension station 51. The third indicator 407c is intermittently turned on until the computer 1 is connected to the extension station 51. Once the computer 1 has been connected to the extension station 51, the third indicator 407c is turned on continuously, and not intermittently.

The procedure for connecting the computer 1 to the extension station 51 will now be described with reference to FIG. 43, as well as the previously mentioned figures.

In step S1, the power plug is inserted in the power connector 121 of extension station 51, thereby setting the extension station 51 in the standby state. In this state, the key cylinder 378 is set in one of the normal position and the block position by means of the key 395. In step S2, the power switch 405 of extension station 51 is turned on. Then, the controller 335 of extension station 51 delivers a command to the motor 282 in order to restore the cam gear 281 of drive mechanism 280 to the neutral position, and the cam gear 281 is set in the initial position in step S3. In step S3, signals representing the rotational position of cam gear 281 are input to the controller 335 from the first to third photosensors 331a to 331c. On the basis of the signals from the photosensors 331a to 331c, the controller 335 calculates the rotational position of cam gear 281. If the cam gear 281 is out of the neutral position, the controller 335 outputs a drive signal to the motor 282, thereby rotating the cam gear 281 until the first slit 326a of light shield wall 325 is located between the light emit portion 332 and light receive portion 333 of second photosensor 331b.

After the cam gear 281 has been set in the initial position, control goes to step S4. In step S4, the housing body 2 of computer 1 is placed on the mount surface 111 of extension station 51. At this time, the computer 1 is placed on the mount surface 111 such that the bottom wall 4a of lower housing 4 is placed along the guide rails 112a and 112b and the rear wall 4d of housing body 2 is directed to the second extension connector 200 of extension station 51.

Then, as is shown in FIG. 4, the computer 1 is slid towards the second extension connector 200. Thus, the rear end portion of lower housing 4 of computer 1 abuts on the engaging portions 235 of detection levers 233a and 233b, and the detection levers 233a and 233b are rotated from the first position toward the second position. The movement of detection levers 233a and 233b is transmitted to the latches 221 by means of rods 243, and the latches 221 begin to rotate from the disengaged position toward the engaged position. By this rotation, the claw portions 223 of latches 221 are urged to project from the slits 223.

At this time, however, the engagement holes 35a and 35b in the rear end portion of lower housing 4 have not reached the positions of slits 228. Thus, the claw portions 223 of latches 221 abut on the bottom wall 4a of lower housing 4, and the rotation of latches 221 is stopped. Even when the rotation of latches 221 is stopped, the detection levers 233a and 233b are pushed by the computer 1 and rotated toward the second position. Consequently, the resilient portions 245 of rods 243 extend. By virtue of this, the rotation of detection levers 233a and 233b is not prevented, and the computer 1 is smoothly slid to the second connector 200 beyond the detection levers 233a and 233b.

If the rear end portion of lower housing 4 abuts on the engaging portions 235 of detection levers 233a and 233b, the push lever 268 of release member 264 faces the lever insertion port 40 in connector cover 39. As the computer 1 is sliding, the push lever 268 is inserted into the lever insertion port 40 and the first and second covers 39a and 39b of connector cover 39 are rotated from the closed position to the open position. As a result, the first extension connector 38 of computer 1 is exposed and the first extension connector 38 faces the second extension connector 200.

If the computer 1 is further slid toward the second extension connector 200, the rear wall 4d of lower housing 4 comes into contact with the push face 267 of release member 264. The release member 264 is thus pushed from the second slide position to the first slide position against the force of the extension coil spring 270. When the first extension connector 38 of computer 1 has been brought immediately in front of the second extension connector 200, the engagement holes 35a and 35b of lower housing 4 face the slits 228 in mount surface 111. Accordingly, the claw portions 223 of latches 221, which have abutted on the bottom wall 4a of lower housing 4, are put in the engagement holes 35a and 35b.

If the computer 1 is slid to the terminal end portion of mount surface 111, as shown in FIG. 16, the release member 264 is pushed to the first slide position and the first extension connector 38 is connected to the second extension connector 200. At the same time, the claw portions 223 of latches 221 are hooked on the opening edges of engagement holes 35a and 35b. Thereby, the front end portion of computer 1 is locked on the mount surface 111, and the lock holes 36a and 36b in the rear end portion of lower housing 4 face the pin guide holes 259a and 259b in the mount surface 111.

When the first extension connector 38 has been connected to the second extension connector 200, the computer 1 is electrically connected to the extension station 51 and the control goes to step S5. In step S5, signals are transmitted between the extension station 51 and computer 1, whereby the connection state between the extension station 51 and computer 1 is determined. If the completion of connection between the extension station 51 and computer 1 is recognized, the computer 1 will be locked on the mount surface 111 in the next step S6.

In step S6, the controller 335 of extension station 51 delivers a command to the drive mechanism 280 to lock the computer 1. Then, the motor 282 of drive mechanism 280 is driven to rotate the cam gear 281 over 150° from the neutral position to the first operation position. Thereby, the first and second rotational levers 305 and 306 are rotated. The movement of the second rotational lever 306 is transmitted to one of lock levers, 252a, via the second lever portion 311b. Then, the lock lever 252a is rotated upward from the unlocked position toward the locked position, and the movement of the lock lever 252a is transmitted to the other lock lever 252b via the support shaft 251.

If the lock levers 252a and 252b are rotated to the locked position, the lock pins 257 thereof project from the pin guide holes 259a and 259b are engaged in the lock holes 36a and 36b in the computer 1. Accordingly, in the state in which the first extension connector 38 is connected to the second extension connector 200, the computer 1 is locked on the mount surface 111 and the disconnection between the first and second extension connectors 38 and 300 is prevented.

If the computer 1 is locked on the mount surface 111, the rear end portion of housing body 2 overlaps the tongue portions 106a and 106b of top cover 91, thereby holding the top cover 91 in the closed position. In addition, the housing body 2 overlaps and covers, from above, the recess portion 141 of eject lever 133 and the push portion 162 of lock lever 155 which are exposed to the mount surface 111.

When the cam gear 281 is rotated to the first operation position, the third slit 326c of light shield wall 325 is located between the light emit portions 332 and light receive portions 333 of second and third photosensors 331b and 331c and the light shield wall 325 is interposed between the light emit portion 332 and light receive portion 333 of first photosensor 331a. Thus, the first to third photosensors 331a to 331c output to the controller 335 a signal indicating that the cam gear 281 has been rotated to the first operation position.

If the lock levers 252a and 252b are rotated from the unlocked position to the locked position by the rotation of cam gear 281, the light shield plate 364 of lock lever 252b enters between the light emit portion 362 and light receive portion 363 of photosensor 361. Accordingly, the photosensor 361 outputs to the controller 335 a signal indicating that the lock levers 252a and 252b have been rotated to the locked position.

If the signals from the photosensors 331a to 331c and 361 are input to the controller 335, the control goes to step S7. In step S7, the controller 335 measures a time period from when the signal from the first to third photosensors 331a to 331c is received to when the signal from the photosensor 361 is received. On the basis of the measured time period, it is determined whether the lock levers 252a and 252b have been rotated from the unlocked position to the locked position within a predetermined time period.

If it is determined that the lock levers 252a and 252b have been rotated from the unlocked position to the locked position within the predetermined time period, the control goes to step S8. In step S8, the controller 335 determines that the computer 1 has been completely locked and connected to the extension station 51. Accordingly, the intermittent turn-on mode of the third indicator 407c is changed to the continuous turn-on mode, and the operator can notice the completion of connection between the computer 1 and extension station 51.

Following the completion of connection of computer 1, the power switch 47 of computer 1 is turned on in step S9, and the application of computer 1 is started in step S10. Thus, the series of steps for connecting the computer 1 and extension station 51 is completed.

If it is determined in step S7 that the lock levers 252a and 252b have not been rotated from the unlocked position to the locked position within the predetermined time period, the control goes to step S11. In step S11, the controller 335 determines that abnormality has occurred in the locking operation of computer 1. Specifically, if foreign matter is present in the lock hole 36a, 36b in computer 1 or the location of lock pin 257 is displaced from that of lock hole 36a, 36b, the lock pin 257 cannot completely be fitted in the lock hole 36a, 36b. As a result, even if the cam gear 281 has been rotated to the first operation position, the lock levers 252a and 252b are caught between the unlocked position and locked position and the light shield plate 364 cannot enter between the light emit portion 362 and light receive portion 263 of photosensor 361. As a result, the controller 335 receives a signal indicating that the lock levers 252a and 252b are still in the unlocked position, and the controller 335 determines that abnormality occurs in the locking operation of computer 1.

If the abnormality in the locking operation is detected in step S11, the control advances to step S12 to forcibly eject the computer 1 from the extension station 51. In step S12, the controller 335 delivers a command to the drive mechanism 280 to eject the computer 1. Thereby, the motor 282 of drive mechanism 280 is driven to rotate the cam gear 281 from the first operation position to the second operation position. The lock levers 252a and 252b are rotated from the locked position to the unlocked position by the rotation of cam gear 281, and the lock pins 257 of lock levers 252a and 252b are pulled out of the lock holes 36a and 36b.

If the cam gear 281 is rotated toward the second operation position while the release member 264 is slid to the first slide position, the second portion 295 of cam surface 293 begins to contact the guide pin 320 of slider 263. Thus, the release member 264 is forcibly pushed from the first slide position toward the second slide position and the first extension connector 38 is disengaged from the second extension connector 200. Once the first extension connector 38 is disengaged from the second extension connector 200, the release member 264 as well as slider 263 is pulled toward the second slide position by the extension coil spring 270. In this manner, the computer 1 is ejected from the extension station 51.

After the computer 1 is ejected, foreign matter is removed from the lock hole 36a, 36b or it is checked whether there is any foreign matter on the mount surface 111. Then, the procedure for connecting the computer 1 is performed from the beginning once again.

Figure 44:
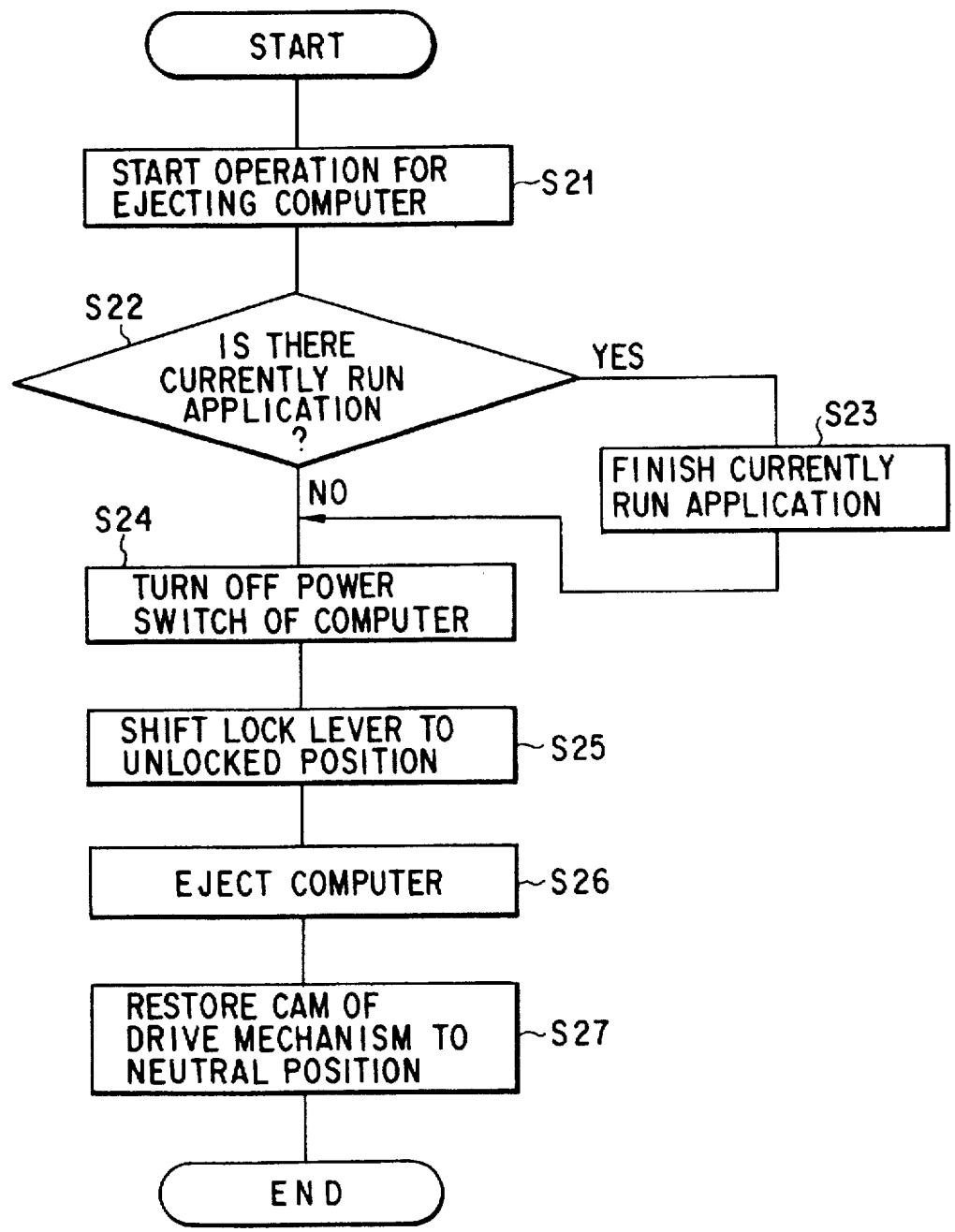
FIG. 44 is a flowchart illustrating the procedure for ejecting the portable computer from the extension station.

The procedure for removing the computer 1 from extension station 51 will now be described with reference to FIG. 44 as well as the already mentioned figures.

When the computer 1 is removed from the extension station 51, the keyboard 7 of computer 1 is first operated to input an eject command to the controller 335 of extension station 51 or the eject switch 406 of extension station 51 is pressed in step S21.

In step S22, signals are transmitted between the controller 335 of extension station 51 and the computer 1, and it is determined whether there is an application which is currently run. If the application is present, the control goes to step S23, and a process for finishing the application is performed.

After the currently run application is finished, the power switch 47 of computer 1 is turned off in step S24. Then, in step S25, the eject operation of computer 1 is started. Specifically, the controller 335 delivers a command to the drive mechanism 280 to eject the computer 1. Thus, the motor 282 of drive mechanism 280 is driven, and the cam gear 281 is rotated from the first operation position toward the second operation position. Thereby, the lock levers 252a and 252b are rotated from the locked position toward the unlocked position. As a result, the lock pins 257 of lock levers 252a and 252b are pulled out of the lock holes 36a and 36b of computer 1 and the rear end portion of computer 1 is unlocked from the lock pins 257.

If the lock levers 252a and 252b are rotated to the unlocked position, the second portion 295 of cam surface 293 begins to contact the guide pin 320 of slider 263. Thereby, the release member 264 is forcibly pushed from the first slide position toward the second position, and the first extension connector 38 is disengaged from the second extension connector 200.

After the first extension connector 38 is released from the second extension connector 200, the control goes to step S26. In step S26, the release member 264 along with the slider 263 is forcibly drawn to the second slide position by means of the extension coil spring 270, and the computer 1 is pushed away from the second extension connector 200. Thereby, the lower housing 4 of computer 1 is disengaged from the engaging portions 235 of detection levers 233a and 233b, and the detection levers 233a and 233b are released from the pushing force applied by lower housing 4. Consequently, the detection levers 233a and 233b are automatically rotated toward the first position by means of return spring 245. The latches 221, too, are automatically rotated toward the disengaged position by means of the return spring 229. The claw portions 223 of latches 221 are pulled out of the engaging holes 35a and 35b in lower housing 4. Thus, the front end portion of computer 1 is unlocked from the latches 221, and the computer 1 can be removed from the mount surface 111.

Once the computer 1 is ejected from the extension station 51, the control goes to step S27. In step S27, the motor 282 is driven once again after a predetermined time period and the cam gear 281 is restored to the neutral position. In this way, the series of steps for ejecting the computer 1 is completed.

If a need arises to remove the computer 1 from extension station 51 while the computer 1 is connected to the extension station 51 and is being used, owing to interruption of electric service or a fault of computer 1, the key 395 is rotated to the emergency position and the lock plate 376 is slid from the normal position or block position to the emergency position. Then, a signal indicating the slide position of lock plate 376 is delivered from the first and second photosensors 397a and 397b to the controller 335. The controller 335 thus turns off the power unit 116 and performs a process for finishing the currently run application.

If the lock plate 376 is slid to the emergency position, the third lock portion 386 is disengaged from the lock portion 348 of emergency lever 345 and the emergency lever 345 is unlocked. This enables the emergency lever 345 to be slid from the wait position toward the operation position. If the emergency lever 345 is slid, the second rotational lever 306 of drive mechanism 280 is rotated independently of the drive system of the cam gear 281. The lock levers 252a and 252b are forcibly rotated from the locked position toward the unlocked position. Thus, the lock pins 257 are pulled out of the lock holes 36a and 36b in computer 1 and the rear end portion of computer 1 is unlocked.

If the second rotational lever 306 is rotated by the emergency lever 345, the second lever portion 311b of second rotational lever 306 is disengaged from the first engaging portion 353a of engaging lever 350 and the notch portion 354 of first engaging portion 353a is hooked on the side edge portion of the second lever portion 311b. Thereby, the restoring movement of the second rotational lever 306 is prevented, the emergency lever 345 is held in the operation position, and the lock levers 252a and 252b are retained in the unlocked position.

At last, the computer 1 is pulled away from the second extension connector 200, and the first extension connector 38 is disengaged from the second extension connector 200. Thus, the computer 1 can be removed from the extension station 51.

In the embodiment of the present invention, as described above, when the computer 1 placed on the mount surface 111 is slid toward the second extension connector 200 and the first extension connector 38 has reached a position immediately before the second extension connector 200, the latches 221 project above the mount surface 111 and are engaged in the engagement holes 35a and 35b in the front end portion of computer 1. If the first extension connector 38 is coupled to the second extension connector 200, the lock levers 252a and 252b are rotated from the unlocked position toward the locked position by the driving force of the motor 282, and the lock pins 257 are engaged in the lock holes 36a and 36b in computer 1.

Accordingly, the computer 1 can be coupled to the extension station 51 simply by sliding the computer 1 toward the second extension connector 200, and the operator need not consider the presence of latches 221 or lock pins 257. As compared to the conventional extension station which requires sliding the computer 1 while confirming the position of the lock pins, the connecting procedure for computer 1 is easier.

When the computer 1 is removed from the extension station 51, the lock pins 257 are automatically pulled out of the computer 1. Then, the release member 264 pushes the computer 1 in a direction away from the second extension connector 200. Thus, it is possible to automatically perform, with no time-consuming manual operation, the series of steps from pulling out lock pins 257 to decoupling the first and second extension connectors 38 and 200. Therefore, the computer 1 can be easily removed from extension station 51.

After the first extension connector 38 is connected to the second extension connector 200, the lock pins 257 project above the mount surface 111 and are engaged in the lock holes 36a and 36b in computer 1. Thus, a sufficient degree of engagement between the lock pins 257 and lock holes 36a and 36b can be achieved, and the rear end portion of computer 1 can be surely locked on the mount surface 111.

Since the lock levers 252a and 252b are rotated between the unlocked position and locked position by means of the motor 282, the lock pins 257 can be engaged with and disengaged from the computer 1 with no time-consuming manual operation. In addition, there is no possibility that a reaction force acts on the operator's hand at the time of engaging and disengaging the lock pins.

Since the computer 1 is slid along the guide rails 112a and 112b on the mount surface 111, the area of contact between the computer 1 and mount surface 111 can be reduced. Accordingly, the computer 1 can easily be slid with less sliding resistance and less sliding force. Furthermore, since the latches 221 and lock pins 257 for locking computer 1 are located at or near the areas of sliding contact between the computer 1 and guide rails 112a and 112b, the computer 1 can be surely engaged.

According the extension station 51 having the above structure, the release member 264 for pushing the computer 1 out of the mount surface 111 is forcibly slid by means of the cam surface 293 of cam gear 281 until the position where the first extension connector 38 is disengaged from the second extension connector 200. Subsequently, the release member 264 is pulled to the second slide position by means of the extension coil spring 270. Therefore, the cam surface 293 of cam gear 281 does not need to push the guide pin 320 over the entire stroke of release member 264, and the shape of the cam surface 293 can be simplified.

Since the release member 264 is constantly urged to the second slide position by means of extension coil spring 270, the drive force of motor 282 is combined with the urging force of extension coil spring 270 when the first extension connector 38 is disengaged from the second extension connector 200. This reduces the load on the motor 282 at the time of disengaging the first extension connector 38 from the second extension connector 200.

When the first extension connector 38 is disengaged from the second extension connector 200, the push face 267 of release member 264 for pushing computer 1 is so located as to surround the second extension connector 200. The push face 267 thus pushes the computer 1 in the position near the coupling portions between the connectors 38 and 200. As a result, when the computer 1 is pushed away from the second extension connector 200, an undesirable bending force does not act on the coupling portions between the first and second extension connectors 38 and 200. Therefore, the connectors 38 and 200 can be disengaged smoothly and with no damage.

In the extension station 51 having the above structure, if the key cylinder 378 is rotated to the block position, the rotation of key cylinder 378 is transmitted to the lock plate 376 via cam 377 and the lock plate 376 is slid to the block position. In the state in which the lock plate 376 is slid to the block position, the first lock portions 381a and 381b are hooked in the engagement holes 383 in top cover 91, and the second lock portion 385 is hooked in the engagement groove 176 in tray 172. The third lock portion 386 of lock plate 376 is engaged with the lock portion 348 of emergency lever 345. Thus, the top cover 91, tray 172 and emergency lever 345 can be locked and unlocked by the single lock plate 376. There is no need to provide a structure for individually locking the top cover 91, tray 172 and emergency lever 345.

Since the extension station 51 has first and second photosensors 397a and 397b for detecting the slide position of lock plate 376, the rotational position of lock levers 252a and 252b can be electrically controlled by using signals from the photosensors 397a and 397b.

If the computer 1 is coupled to the extension station 51 when the top cover 91 of extension station 51 is rotated to the closed position, the computer 1 is locked on the mount surface 111 such that the computer 1 overlap the tongue portions 106a and 106b of top cover 91. Thus, the computer 1 prevents the top cover 91 from moving to the open position. The top cover 91 can be held in the closed position by using the computer 1. Unless the computer 1 is removed from the mount surface 111 by effecting the eject operation, the extension board chamber 63 cannot be opened or the extension board 84 cannot be removed from the extension board chamber 63. Therefore, the extension board 84 can be protected against theft or mischief.

In the extension station 51 with the above structure, the adapter 117 for mounting the CD-ROM drive 16 or FDD 17 is provided below the mount surface 111. The adapter 117 has the ejector 131 on the upper surface thereof, and the recess portion 141 of eject lever 133 for operating the ejector 131 and the push portion 162 of lock lever 155 are exposed to the mount surface 111. When the computer 1 is placed on the mount surface 111, the computer 1 covers the recess portion 141 of eject lever 133 and the push portion 162 of lock lever 155. If the computer 1 is locked on the mount surface 111, the eject lever 133 and lock lever 155 can be kept covered by the computer 1.

In order to remove the CD-ROM drive 16 or FDD 17 from the adapter 117 by operating the eject lever 133 or lock lever 155, it is necessary to intentionally remove the computer 1 from the mount surface 111 by effecting the eject operation of computer 1. Therefore, the CD-ROM drive 16 or FDD 17 can be prevented from being removed unintentionally and can be surely protected against theft or mischief.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic apparatus system comprising:
   an electronic apparatus body; and
   an extension station having a mount portion on which said electronic apparatus body is detachably mounted, and a device storage section in which an extension device for extending functions of said electronic apparatus body is removably stored,
   wherein said extension station has an ejector for discharging said extension device from said device storage section, said ejector having an eject lever manually operable at the time of discharging the extension device, said eject lever having an operation section exposed to the mount portion.

2. The electronic apparatus system according to claim 1, wherein said extension station includes means for locking said electronic apparatus body on said mount portion.

3. The electronic apparatus system according to claim 1, wherein said device storage section has a first connector, and said extension device has a second connector to be detachably coupled to said first connector when the extension device is stored in said device storage section.

4. The electronic apparatus system according to claim 3, wherein said ejector has a slide plate including an engaging portion to be engaged with the extension device, said slide plate being interlocked with the eject lever and being slidable between a first position where the slide plate is pushed toward the first connector when the extension device is stored in the device storage section and the first connector is connected to the second connector, and a second position where the extension device is pushed away from the first connector and the first connector is disengaged from the second connector.

5. The electronic apparatus system according to claim 4, wherein said eject lever is movable between a first slide position where the slide plate is slid to the first position, and a second slide position where the slide plate is slid to the second position.

6. The electronic apparatus system according to claim 5, further comprising a relay lever for interlocking said eject lever and slide lever with each other, said relay lever increasing an operating force of the eject lever and transmitting the increased operating force to the slide plate.

7. The electronic apparatus system according to claim 4, wherein said ejector includes a lock lever, the lock lever being movable between a locked position where the lock lever is engaged with the slide plate shifted to the first position, and an unlocked position where the lock lever is disengaged from the slide plate, said lock lever being constantly urged toward the locked position by means of a spring.

8. The electronic apparatus system according to claim 7, wherein said lock lever includes a push portion exposed to the mount portion, said push portion being located adjacent to said operation section of the eject lever.

9. The electronic apparatus system according to claim 7, wherein said lock lever has an engaging projection and said slide plate has an engagement hole in which said engaging projection is removably engaged when the slide plate is set in said first position, said engagement hole facing said extension device stored in the device storage section.

10. The electronic apparatus system according to claim 9, wherein said extension device has a recess portion in which the engaging projection of the lock lever is removably engaged.

11. The electronic apparatus system according to claim 9, wherein said slide plate has a guide portion continuous with said engagement hole, said guide portion coming into slidable contact with the engaging projection when the eject lever is moved from the first position to the second position in the state in which the lock lever is shifted to the unlocked position, thereby holding the lock lever in the unlocked position.

12. The electronic apparatus system according to claim 7, wherein said device storage section has a box-shaped casing in which said extension device is detachably inserted, said casing being detachably stored within the extension station and having an upper surface opposed to the mount portion, and said ejector, said slider and said lock lever being disposed on the upper surface of the casing.

13. The electronic apparatus system according to claim 1, wherein said device storage section of the extension device comprises a first section in which said extension device is stored and a second section having an opening portion opening to the mount portion, said opening portion of the second section being covered by a removable cover located below the electronic apparatus body placed on the mount portion.

14. An electronic apparatus system comprising:
    an electronic apparatus body; and
    an extension station having a mount portion on which said electronic apparatus body is detachably mounted, said extension station extending functions of the electronic apparatus body,
    wherein said extension station comprises:
      a first device storage section for removably storing a first extension device for extending the functions of the electronic apparatus body;
      a second device storage section for removably storing a second extension device for extending the functions of the electronic apparatus body;
      a cover supported on the extension station, said cover being rotatable between a closed position where the first device storage section is closed and an open position where the first device storage section is opened, said cover having an extension portion extending toward the mount portion when the cover is rotated to the closed position, said extension portion being located below the electronic apparatus body placed on the mount portion; and
      an ejector for discharging said second extension device from said second device storage section, said ejector having an eject lever including an operation section exposed to the mount portion.

15. The electronic apparatus system according to claim 14, wherein said extension station includes means for locking said electronic apparatus body on said mount portion.

16. The electronic apparatus system according to claim 14, wherein said electronic apparatus body has a rear wall on which a motor fan is disposed, said rear wall facing said cover when the electronic apparatus body is placed on the mount portion, said cover having a recess portion facing said motor fan, said recess portion cooperating with said rear wall in defining a cooling air passage communicating with the motor fan.

17. The electronic apparatus system according to claim 14, wherein said cover has a support leg and a projection formed on a side face of the support leg and having a relatively long axis and a relatively short axis, and said extension station has a bearing portion for rotatable engagement with the projection, said bearing portion having a notch portion with an opening width slightly greater than the dimension of the relatively short axis of the projection, said notch portion being located in the same direction as the relatively long axis of the projection when the cover is rotated in a position between the closed position and the open position.

18. An electronic apparatus system comprising:
an electronic apparatus body; and
an extension station having a mount portion on which said electronic apparatus body is detachably mounted, and a device storage section in which an extension device for extending functions of said electronic apparatus body is removably stored,
wherein said extension station has an operating member operated in discharging said extension device from said device storage section, said operating member having a portion located below the electronic apparatus body placed on the mount portion.

19. The electronic apparatus system according to claim 18, wherein said extension station includes means for locking said electronic apparatus body on said mount portion.

20. An extension station for extending functions of an electronic apparatus, said extension station comprising:
a station body having a mount portion on which said electronic apparatus is detachably mounted, and a device storage section in which an extension device for extending functions of said electronic apparatus is removably stored; and
an ejector for discharging said extension device from said device storage section, said ejector having an eject lever manually operable at the time of discharging the extension device, said eject lever having an operation section exposed to the mount portion.

21. The extension station according to claim 20, further comprising:
means for locking said electronic apparatus on said mount portion.

22. The extension station according to claim 20, wherein said device storage section has a first connector, and said extension device has a second connector to be detachably coupled to said first connector when the extension device is stored in said device storage section.

23. The extension station according to claim 22, wherein said ejector has a slide plate including an engaging portion to be engaged with the extension device, said slide plate being interlocked with the eject lever and being slidable between a first position where the slide plate is pushed toward the first connector when the extension device is stored in the device storage section and the first connector is connected to the second connector, and a second position where the extension device is pushed away from the first connector and the first connector is disengaged from the second connector.

24. The extension station according to claim 23, wherein said eject lever is movable between a first slide position where the slide plate is slid to the first position, and a second slide position where the slide plate is slid to the second position.

25. The extension station according to claim 23, wherein said ejector includes a lock lever, the lock lever being movable between a locked position where the lock lever is engaged with the slide plate shifted to the first position, and an unlocked position where the lock lever is disengaged from the slide plate, said lock lever being constantly urged toward the locked position by means of a spring.

26. The extension station according to claim 25, wherein said lock lever includes a push portion exposed to the mount portion, said push portion being located adjacent to said operation section of the eject lever.

27. The extension station according to claim 25, wherein said lock lever has an engaging projection and said slide plate has an engagement hole in which said engaging projection is removably engaged when the slide plate is set in said first position, said engagement hole facing said extension device stored in the device storage section.

28. The extension station according to claim 27, wherein said slide plate has a guide portion continuous with said engagement hole, said guide portion coming into slidable contact with the engaging projection when the eject lever is moved from the first position to the second position in the state in which the lock lever is shifted to the unlocked position, thereby holding the lock lever in the unlocked position.

29. The extension station according to claim 25, wherein said device storage section has a box-shaped casing in which said extension device is detachably inserted, said casing being detachably stored within the extension station and having an upper surface opposed to the mount portion, and said ejector, said slider and said lock lever being disposed on the upper surface of the casing.

30. The extension station according to claim 20, wherein said device storage section of the extension device comprises a first section in which said extension device is stored and a second section having an opening portion opening to the mount portion, said opening portion of the second section being covered by a removable cover located below the electronic apparatus placed on the mount portion.

31. An extension station for extending functions of an electronic apparatus, said extension station comprising:
a station body including a mount portion on which said electronic apparatus is detachably mounted, a first device storage section for removably storing a first extension device for extending the functions of the electronic apparatus, and a second device storage section for removably storing a second extension device for extending the functions of the electronic apparatus;
a cover supported on the station body, said cover being rotatable between a closed position where the first device storage section is closed and an open position where the first device storage section is opened, said cover having an extension portion extending toward the mount portion when the cover is rotated to the closed position, said extension portion being located below the electronic apparatus placed on the mount portion; and an ejector for discharging said second extension device from said second device storage section, said ejector having an eject lever including an operation section exposed to the mount portion.

32. The extension station according to claim 31, wherein said station body includes means for locking said electronic apparatus on said mount portion.

33. The extension station according to claim 31, wherein said cover has a support leg and a projection formed on a side face of the support leg and having a relatively long axis and a relatively short axis, and said extension station has a bearing portion for rotatable engagement with the projection, said bearing portion having a notch portion with an opening width slightly greater than the dimension of the relatively short axis of the projection, said notch portion being located in the same direction as the relatively long axis of the projection when the cover is rotated in a position between the closed position and the open position.

34. An extension station for extending functions of an electronic apparatus, said extension station comprising:

a station body having a mount portion on which said electronic apparatus is detachably mounted, and a device storage section in which an extension device for extending functions of said electronic apparatus is removably stored; and an operating member operated in discharging said extension device from said device storage section, said operating member having a portion located below the electronic apparatus placed on the mount portion.

* * * * *